(12) United States Patent
Nishida et al.

(10) Patent No.: US 6,307,963 B1
(45) Date of Patent: Oct. 23, 2001

(54) IMAGE DETECTION METHOD, IMAGE DETECTION APPARATUS, IMAGE PROCESSING METHOD, IMAGE PROCESSING APPARATUS, AND MEDIUM

(75) Inventors: Yukihiro Nishida, Yamatokoriyama; Taro Imagawa, Hirakata; Tsuyoshi Mekata, Katano, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/088,943

(22) Filed: Jun. 2, 1998

(30) Foreign Application Priority Data

| Jun. 2, 1997 | (JP) | ................................................. 9-143598 |
| Aug. 20, 1997 | (JP) | ................................................. 9-223866 |
| May 25, 1998 | (JP) | ............................................... 10-143513 |

(51) Int. Cl.[7] ............................... G06K 9/00; G06K 9/34; G06K 9/46; G06K 9/62; G06K 9/68
(52) U.S. Cl. ...................... 382/190; 382/170; 382/173; 382/209; 382/218; 382/219
(58) Field of Search ................................. 382/181, 190, 382/135, 218, 219, 162, 165, 171, 173, 195, 209

(56) References Cited

U.S. PATENT DOCUMENTS

| 5,131,648 | * | 7/1992 | Ito ........................................ 271/262 |
| 5,479,570 | | 12/1995 | Imagawa et al. ....................... 706/20 |
| 5,604,596 | * | 2/1997 | Ukai et al. ............................ 358/296 |
| 5,606,538 | | 2/1997 | Maruno et al. ......................... 369/48 |
| 5,621,810 | * | 4/1997 | Suzuki et al. ......................... 382/135 |
| 5,652,802 | * | 7/1997 | Graves et al. ......................... 382/135 |
| 5,652,803 | * | 7/1997 | Tachikawa et al. ................... 382/135 |
| 5,754,709 | | 5/1998 | Moriya et al. ......................... 382/274 |
| 5,790,245 | * | 8/1998 | Kanesashi ............................... 356/71 |
| 5,960,112 | * | 9/1999 | Lin et al. ............................... 382/218 |
| 6,014,453 | * | 1/2000 | Sonoda et al. ......................... 382/137 |
| 6,091,844 | * | 7/2000 | Fujii et al. ............................ 382/135 |

FOREIGN PATENT DOCUMENTS

| 4-207465 | 7/1992 | (JP) . |
| 6-268859 | 9/1994 | (JP) . |
| 7-131636 | 5/1995 | (JP) . |
| 7-177349 | 7/1995 | (JP) . |
| 8-115022 | 5/1996 | (JP) . |
| 8-287258 | 11/1996 | (JP) . |

* cited by examiner

*Primary Examiner*—Leo Boudreau
*Assistant Examiner*—Daniel G. Mariam
(74) *Attorney, Agent, or Firm*—Ratner & Prestia

(57) ABSTRACT

To provide an image detection method for judging whether a specific image is present in an input image by temporarily holding the input image signal, obtaining data from the held data like a circle having a radius r, calculating the characteristic value of the circular data, judging whether the characteristic value is included in a specific pattern in accordance with the similarity between the characteristic value and a reference characteristic value, obtaining data like a circle having a radius r' different from the radius r when judging that the characteristic value is included in the specific pattern, calculating a new characteristic value, and repeating the operation of judging whether the new characteristic value is included in a specific pattern over circular data having a plurality of radiuses. Thereby, it is possible to efficiently detect the presence or absence of a specific image whose arrangement conditions such as the angle and position in an input image are unknown.

28 Claims, 39 Drawing Sheets

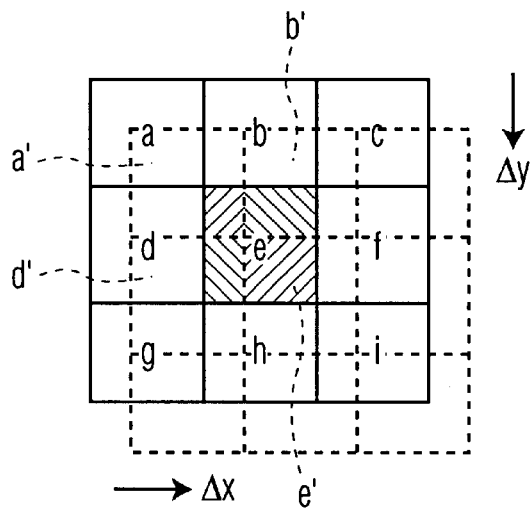
FIG. 10(a)
FIG. 10(b)
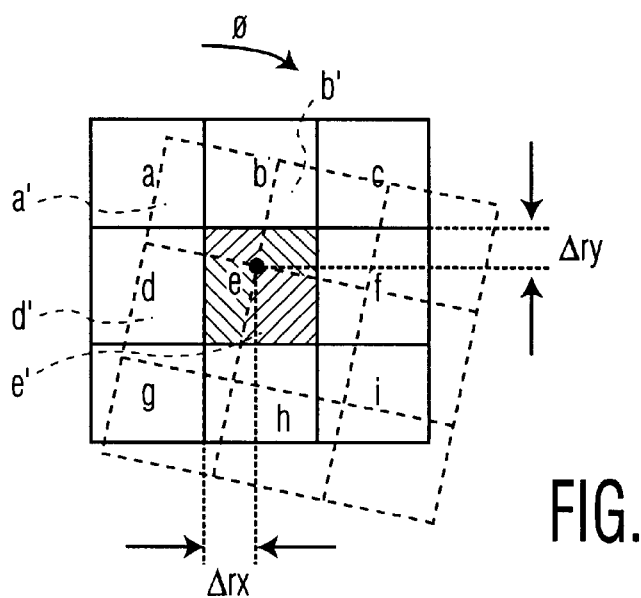
FIG. 10(c)

| C0 (1) | C1 (1) | C2 (1) |
|--------|--------|--------|
| C0 (2) | C1 (2) | C2 (2) |
| C0 (3) | C1 (3) | C2 (3) |
| ⋮ | ⋮ | ⋮ |
| C0 (n) | C1 (n) | C2 (n) |
| ⋮ | ⋮ | ⋮ |
|  |  |  |

FIG. 13

| | |
|---|---|
| Tnum(1) | D(1) |
| Tnum(2) | D(2) |
| Tnum(3) | D(3) |
| ⋮ | ⋮ |
| Tnum(n) | D(n) |
| ⋮ | ⋮ |

| Block number | Number of reference data values | Reference data numbers 1 2 3 4 5 ... |
|---|---|---|
| 1 | 3 | 30 31 56 |
| 2 | 2 | 30 31 |
| 3 | 5 | 7 8 30 31 46 |
| 4 | 10 | 7 8 46 48 53 ... |
| 5 | 9 | 20 48 53 59 64 ... |
| ⋮ | ⋮ | ⋮ ⋮ ⋮ |

FIG. 35

| Region name | Characteristic value 1 (Sum of pixel values of R) | Characteristic value 2 (Sum of pixel values of G) | Characteristic value 3 (Sum of pixel values of B) | x-coordinate | y-coordinate |
|---|---|---|---|---|---|
| R1 | 120 | 10 | 55 | 0 | 0 |
| R2 | 100 | 72 | 13 | 120 | 10 |
| R3 | 44 | 69 | 28 | 5 | 115 |
| R4 | 150 | 12 | 99 | 122 | 110 |

IMAGE DETECTION METHOD, IMAGE DETECTION APPARATUS, IMAGE PROCESSING METHOD, IMAGE PROCESSING APPARATUS, AND MEDIUM

BACKGROUND OF THE INVENTION

1. Field of the Invention

The present invention relates to an image detection method, image detection apparatus, image processing method, image processing apparatus, and medium.

2. Description of the Related Art

Because performances of a color copying machine, a color scanner serving as an input/output unit of a personal computer, and a color printer have been remarkably improved in recent years, it has been possible to obtain a high-accuracy color copy easily. Therefore, because bills and securities may be forged by abusing the above high-accuracy units, the necessity for taking actions for the above abuse has been raised.

That is, it is detected whether a specific image printed on these bills and securities is included in an image to be copied in a copying machine. When a specific image is detected, it is necessary to stop image reading or inhibit normal printing to prevent a forgery from being produced. Moreover, it is necessary to prevent the above forgery from occurring by for example, using means such as a network and thereby notifying the forgery to a supervisor.

The position and direction of a specific image included in an input image are unknown.

As a conventional method for detecting a specific image from a color image under the above condition, there is a method using the matching of spread of the entire image in a color space, which is disclosed in the official gazette of Japanese Patent Application Laid-Open No.Hei 4-207465. However, in such method, unrelated image having a color tone which is generally similar to that of the specific imgae may be detected by mistake. Then in the case of this method, it is effective to verify a specific mark in an image. As the specific mark, a read seal on a bill can be listed.

To verify the specific mark in an image, a method disclosed in the official gazette of Japanese Patent Application Laid-Open No.Hei 8-115022 is used which finds a specific-color circular image and verifies the frequency pattern and the tone in the image. However, the above method may not be used because a specific-color figure such as a red seal is not always included in a manuscript which must be prevented from being forged.

In this case, the case of detecting a region in any circle on an image is shown in the official gazette of Japanese Patent Application Laid-Open No.Hei 6-268859 as a method capable of detecting the presence or absence of a specific image whose arrangement is unknown from an input image even if there is no specific-color pattern.

Moreover, as a conventional method for detecting a specific image from a color image, there is a method of narrowing down a range to a small region in which a specific image may be included and noticing only color information disclosed in the official gazette of Japanese Patent Application Laid-Open No.Hei 7-131636 in addition to the above method disclosed in the official gazette of Japanese Patent Application Laid-Open No.Hei 4-207465.

Moreover, as a method for detecting a specific image, an image processing apparatus is disclosed in Japanese Patent Application Laid-Open No.Hei 7-177349 separately from the above method. This conventional example is described below by referring to FIGS. 38 to 40.

In FIG. 38, symbol 101 denotes a position state detection section, 102 denotes a rotation processing section, 103 denotes a blocking section, and 104 denotes a block matching judgment section. FIG. 39 shows a purposed image and a specific image 201 (rectangle at whose center a character B1 is drawn) included in the purposed image. The position state detection section 101 detects the position of the specific image 201 in the purposed image in FIG. 39. For detection, an edge of the rectangle is detected and the rectangular is calculated in accordance with the position and angle of the edge. The rotation processing section 102 rotates the image so that the specific image 201 so that it matches up to the horizontal direction in accordance with the positional information detected by the position state detection section 101. FIG. 40 shows an image obtained by rotating the specific image 201 shown in FIG. 39. The blocking section 103 divides the image obtained by rotation (see FIG. 40) into blocks. The block matching judgment section 104 compares the average density of each of the blocks obtained by division with a predetermined value to judge whether the specific image 201 is included in the purposed image or not.

However, in the case of the above conventional method of using an optional portion of an image as purposed data, it is necessary to repeat obtainment of purposed data, extraction of a characteristic value, and judgment on the characteristic value while repeating the shift for each pixel and therefore, a lot of throughput is required. Particularly, to obtain the data of a region in a circle, it is necessary to sequentially perform the processing such as address calculation of data to be obtained, causing the throughput to further increase. Because the throughput increases proportionally to the square of the radius of a circle, it is better to use a circle as small as possible in order to decrease the throughput. However, because of the narrow range of characteristic values obtained from a circular region having a small radius, there is a problem that the accuracy for detection of a specific pattern is deteriorated.

Moreover, in the case of the above conventional method of noticing only the color information necessary for detection but using no positional information such as color arrangement, if an image having a tone similar to that of a specific image to be detected is input, the image may be erroneously detected as the specific image at a high probability. Moreover, in the case of the method of narrowing down a range to only a part of an image and observing only the point, if there is a similar image on the portion, an image whose entire image is completely different may be erroneously detected as a specific image. Therefore, there is a problem that the accuracy for detecting a specific image is low.

In the case of the conventional method described for FIGS. 38 and 40, it is a premise to accurately detect the position of the specific image 201. Therefore, when other images including an edge are present around a specific image, there are problems that it is difficult to accurately detect the edge of the specific image, it is impossible to accurately detect the position of the specific image, and resultingly the accuracy for detecting the specific image is deteriorated. Moreover, to handle not an image having a simple shape comprising straight lines such as a rectangle but an image having a complex shape comprising curves, it is necessary to newly prepare a technique for detecting the position and tilt of the image having a complex shape. Furthermore, though it is possible to use a specific-color mark (e.g. red mark) to specify a position, there is also a disadvantage that images other than an image including a specific-color mark cannot be detected.

The present invention is made to solve the above problems and its object is to provide an image detection method, image detection apparatus, image processing method, image processing apparatus, and medium capable of more efficiently processing data to detect a specific image and preventing a detection accuracy from deteriorating.

SUMMARY OF THE INVENTION

To achieve the above objects, an aspect of the prevent invention is an image detection method comprising the steps of:

holding image data including image to be detected;

scanning said held image data, extracting data from image in a substantially-circumferential region having a radius r around said scanning position by data extraction means;

calculating an extracted-data characteristic value in accordance with said extracted data;

accumulating reference characteristic value which is obtained based on each image in (1) a substantially-circumferential region having a radius corresponding to said radius r on said image to be detected and in (2) a substantially-circumferential region having a radius corresponding to a radius larger than said radius r on said image to be detected;

obtaining said accuumulated reference characteristic value in a substantially-circumferential region having a radius corresponding to the radius of the substantially-circumferential region from which said calculated extracted-data characteristic value is obtained and obtaining the similarity between said obtained reference characteristic value and said calculated extracted-data characteristic value based on the both characteristic values;

judging whether said obtained similarity meets a predetermined criterion and, when judging that the similarity meets the criterion, setting the substantially-circumferential region having a radius larger than said radius r as a new region instead of the substantially-circumferential region having said radius r, and extracting new data from images in said new region; and determining presence or absence of said image to be detected in said held image data based on said extacted new data.

According to the above structure, for example, it possible to detect an image while decreasing throughput and keeping a high accuracy by using the above structure.

A further aspect of the present invention is an image detection method according to the first invention, further comprising a step of changing a detection mode for detecting said images to be detected and an entry mode for accumulating said reference characteristic value; wherein (1) when said mode is said entry mode;

all or some of said images to be detected are converted in accordance with a predetermined criterion, a plurality of types of converted image data obtained in accordance with said converted image are stored, data in one or more of said circumferential region or regions is obtained about said held converted image data for each converted data, a basic characteristic value is calculated in accordance with each obtained data, and said reference characteristic value is calculated in accordance with all of said calculated basic characteristic values and these calculated reference characteristic values are accumulated; and (2) when said mode is said detection mode, said determining peresence or absence of said image to be detected is performed.

According to the above structure, for example, it possible to detect an image while decreasing throughput and keeping a high accuracy by using the above structure.

And according to the above structure, for example, by automatically setting a proper characteristic value corresponding to an image, it possible to enter a novel manuscript as an image to be detected using the simple method.

Another aspect of the present invention is an image detection apparatus comprising:

image data holding means for holding image data including images to be detected;

data extraction means for scanning said held image data and extracting data from images in a substantially-circumferential region having a radius r around said scanning position;

calculation means for calculating an extracted-data characteristic value in accordance with said extracted data;

accumulation means for accumulating reference characteristic value which is obtained based on each image in (1) a substantially-circumferential region having a radius corresponding to said radius r on the image to be detected and in (2) a substantially-circumferential region having a radius corresponding to a radius larger than said radius r on the image to be detected;

similarity calculation means for obtaining said accumulated reference characteristic value in a substantially-circumferential region having a radius corresponding to the radius of the substantially-circumferential region from which said extracted-data characteristic value is obtained and obtaining the similarity between said obtained reference characteristic value and said calculated extracted-data characteristic value based on said both characteristic values; and judgment and control means for judging whether said obtained similarity meets a predetermined criterion and when it is judged that said obtained similarity meets the criterion, a substantially-circumferential region having a radius larger than said radius r is used as a new region instead of said substantially-circumferential region having the radius r to extract new data from an image in the new region; wherein presence or absence of said image to be detected in said held image data is detected on basis of said extracted new data.

According to the above structure, for example, it possible to detect an image while decreasing throughput and keeping a high accuracy by using the above structure.

A still further aspect of the present invention is the image detection apparatus according to the first invention, wherein mode change and control means for changing a detection mode for detecting said images to be detected and an entry mode for accumulating said reference characteristic values, image conversion means for converting all or some of said images to be detected in accordance with a predetermined criterion, converted image storage means for storing the data for said converted images, and reference characteristic value calculation means for calculating said reference characteristic values in accordance with the data for the images before and after converted are included, and said mode change and control means;

(1) when said mode is said entry mode, makes said image conversion means convert said images, makes said converted image storage means store a plurality of types of converted image data obtained in accordance with said converted images, makes said data extraction means obtain the data in one or more of said circumferential region or regions for each of said converted image data held in said converted image storage means, makes said calculation means calculate each basic characteristic value in accordance with said obtained data, makes said reference characteristic value calculation means calculate said reference characteristic values in accordance with all of said calculated basic characteristic values, and makes said accumulation means accumulate these calculated reference characteristic values, and moreover (2) when said mode is said detection mode, said determining peresence or absence of said image to be detected is perfoemed.

According to the above structure, for example, by automatically setting a proper characteristic value corresponding to an image, it possible to enter a novel manuscript as an image to be detected using the simple method.

Still another aspect of the present invention is an image processing apparatus comprising:

extraction means for obtaining a characteristic value in blocks in accordance with an input image signal, storage means for storing said characteristic data, accumulation means for accumulating a plurality of previously-obtained reference data values, comparison means for comparing said characteristic data with said reference data to obtain the similarity between them, storage means for storing said similarity, and judgment means for judging the presence or absence of a special image in input images in accordance with said similarity over a plurality of adjacent blocks.

According to the above structure, for example, it is possible to provide an image processing apparatus capable of detecting the presence or absence of a specific image whose arrangement is unknown from input images without erroneous detection even if images have a similar tone or only a part of each of images is similar.

An additional aspect of the present invention is an image processing method comprising the steps of:

calculating a first characteristic value in accordance with a local image in a first local region at a predetermined position in a search region;

comparing each second characteristic value previously obtained in accordance with each local image in a plurality of second local regions at a predetermined position in the region of a target image to be detected with said calculated first characteristic value;

checking whether a second characteristic value meeting a predetermined relation with said first characteristic value is present in said second characteristic values on basis of the result of the comparison;

obtaining a new position in said search region on basis of a positional information for wholl or a part of said second local regions when a second characteristic value meeting said relation is present and calculating a new first characteristic value in accordance with local image in a first local region at said new position;

judging whether said calculated new first characteristic value meets a predetermined relation with a predetermined second characteristic value among said second characteristic values; and determining whether said target image is present in said search region on basis of the judgment result.

A still addition aspect of the present invention is an image processing method comprising the steps of:

calculating each first characteristic value in accordance with each local image in a plurality of first local regions in a search region;

comparing each second characteristic value previously obtained from each local image in a plurality of second local regions at a predetermined position in the region of a target image to be detected with each of said calculated first characteristic values;

searching a first characteristic value meeting a predetermined relation with said second characteristic values out of said calculated first characteristic values on baisi of the result of the comparison and storing the searched first characteristic value and the positional information for the local region; and detecting a target image on basis of said previously obtained second characteristic values and the relative positional relation between local regions of the second characteristic values by using the stored first characteristic value and the positional information for its local region as processing objects.

A further aspect of the present invention is an image processing apparatus comprising:

local information obtainment means, local characteristic value calculation means, local characteristic information storage means, search coordinate generation means, and evaluation means, wherein said local information obtainment means obtains local region information in an image, said local characteristic value calculation means calculates a characteristic value in accordance with local region image obtained by said local information obtainment means, said local information storage means stores a characteristic value calculated by said local characteristic value calculation means and the positional information of its local region image or a characteristic value obtained from an external unit and the positional information of its local region image, said search coordinate generation means generates a new positional coordinates in an image by using the information to be stored in said local characteristic information storage means, the characteristic value obtained by said local characteristic value calculation means, and the positional information for said local region image, said local characteristic information obtainment means newly obtains the information for a local region in an image in accordance with the coordinates generated by said search coordinate generation means, and said evaluation means calculates an evaluated value by using the information stored in said local characteristic information storage means, the characteristic value obtained by local characteristic value calculation means, and the positional information for a local region image.

A still further aspect of the present invention is an image processing apparatus comprising:

local information obtainment means, local characteristic value calculation means, local characteristic information storage means, search coordinate generation means, and evaluation means, wherein said local information obtainment means obtains local region information in an image, said local characteristic value calculation means obtains a characteristic value from a local region image obtained by said local information obtainment means, said local characteristic information storage means stores the characteristic value obtained by said local characteristic value calculation means and the positional information for said local region image or a characteristic value obtained from an external unit and the positional information of its local region image, said search coordinate generation means generates new positional coordinates in an image by using the information stored in said local characteristic information storage means, the characteristic value obtained by said local characteristic value calculation means, and the positional information for said local region image, and said evaluation means calculates an evaluated value on basis of the information stored in said local characteristic information storage means and the coordinates generated by said search coordinate generation means.

BRIEF DESCRIPTION OF THE DRAWINGS

FIG. 10(a) is an illustration obtained by enlarging a part of an image to be entered;

FIG. 10(b) is an illustration obtained by enlarging an image to be entered when shifting the image;

FIG. 10(c) is an illustration of an image to be entered when rotating the image;

FIG. 13 is an illustration of the internal structure of the characteristic data storage means of the embodiment A1 of the present invention;

FIG. 22 is an illustration of the internal structure of the comparison result storage means of the embodiment A2 of the present invention;

FIG. 25 is an illustration for explaining the block number of a non-mask block of the embodiment A2 of the present invention;

FIG. 26 is an illustration of the reference-data arrangement dictionary of the embodiment A2 of the present invention;

FIG. 35 is an illustration showing information to be stored in the local characteristic information storage means of an image processing apparatus of the present invention;

DETAILED DESCRIPTION OF THE PREFERRED EMBODIMENTS

Embodiments of the present invention are described below by referring to the accompanying drawings.

[Embodiment 1]

An embodiment of an image defection apparatus of the present invention is described below.

Figure 1:
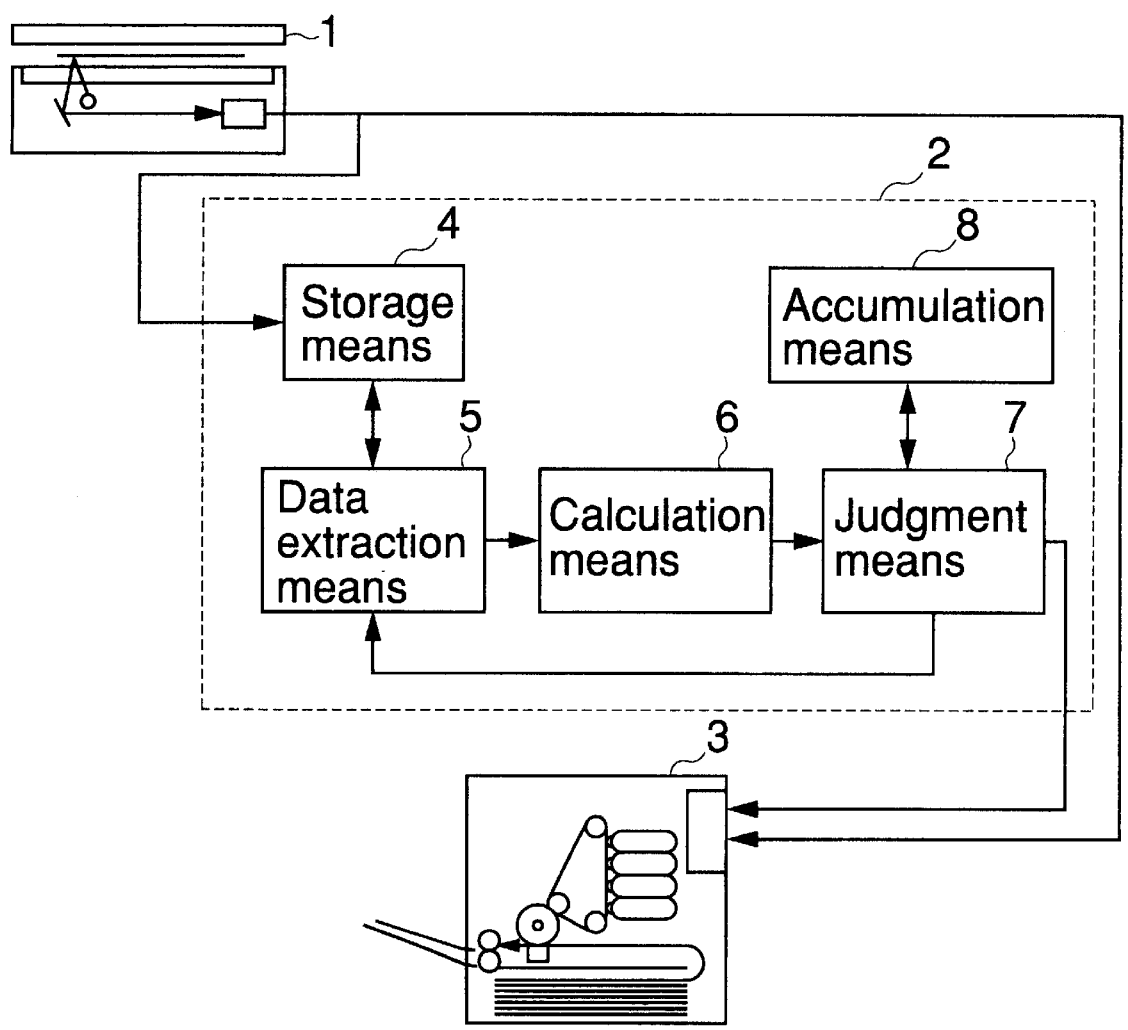
FIG. 1 is a schematic block diagram of an image reader using the image detection apparatus of embodiment 1 of the present invention.

FIG. 1 is a schematic block diagram of a copying machine using the image detection apparatus of embodiment 1 of the present invention.

In FIG. 1, symbol 1 denotes an image read section for optically reading a manuscript and outputting it as an image signal of RGB. Symbol 2 denotes an image detection apparatus of the present invention for detecting a specific pattern in an image. Symbol 3 denotes an image output section for obtaining a copied image by receiving read RGB signals, converting the signals into four colors of CMYK (cyanogen, magenta, yellow, and black), and forming a color image on a form in accordance with the theory of electrophotography.

The copying machine of the embodiment 1 judges whether a specific image is included or not in a read image by the image detection apparatus 2 while outputting the image data read by the image read section 1. When the copying machine judges that no specific image is included, it performs the normal copying operation. However, when the copying machine judges that an specific image is included, it does not perform the normal copying operation by stopping the operation of the image output section 3.

By entering some images on a bill in the copying machine as specific images, the machine serves as a copying machine having a function for preventing a bill from being copied.

Then, the structure of the image detection apparatus 2 is described below in detail while referring to FIG. 1.

That is, symbol 4 denotes storage means for temporarily holding an image signal. Symbol 5 denotes data extraction means for obtaining data like a circle having a radius r from the data stored in the storage means 4, 6 denotes calculation means for calculating the circular data obtained by the data extraction means 5, 7 denotes judgment means for judging whether marks are matched each other by comparing the characteristic value obtained by the calculation means 6 with a reference value, and 8 denotes accumulation means for accumulating the above reference value. In this case, the extracted-data characteristic value of the present invention corresponds to the above characteristic value and the reference characteristic value of the present invention corresponds to the above reference value. Images to be calculated of the present invention correspond to the specific images. The judgment means 7 includes similarity calculation means and judge/control means of the present invention.

Operations of the image detection apparatus 2 of this embodiment thus constituted are described below by referring to FIGS. 1 to 6 while describing one embodiment of an image detection method of the present invention.

Figure 2:
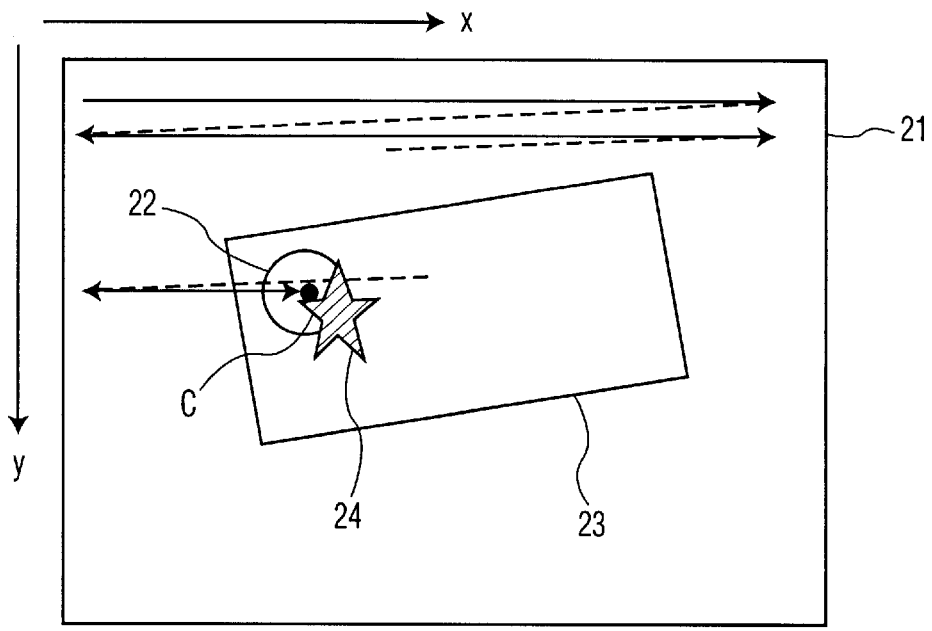
FIG. 2 is an illustration showing the movement of a circle center C of the present invention.

That is, as shown in FIG. 1, an image captured by the image read section 1 is captured by the image detection means 2 as a RGB image signal. The image detection means 2 temporarily stores the image signal in the storage means 4. Because the storage means 4 is a RAM, it is possible to obtain the data at any position by designating an address. When data is stored in the storage means 4, the data extraction means 5 obtains pixel data present in a circumferential region 22 in a search region 21 (see FIG. 2) from the stored data. In this case, FIG. 2 is an illustration schematically showing a state in which the center C of the circumferential region 22 moves in accordance with scanning. In FIG. 2, a rectangular pattern 23 denotes a bill and a stellar pattern 24 denotes a specific image.

Figure 3:
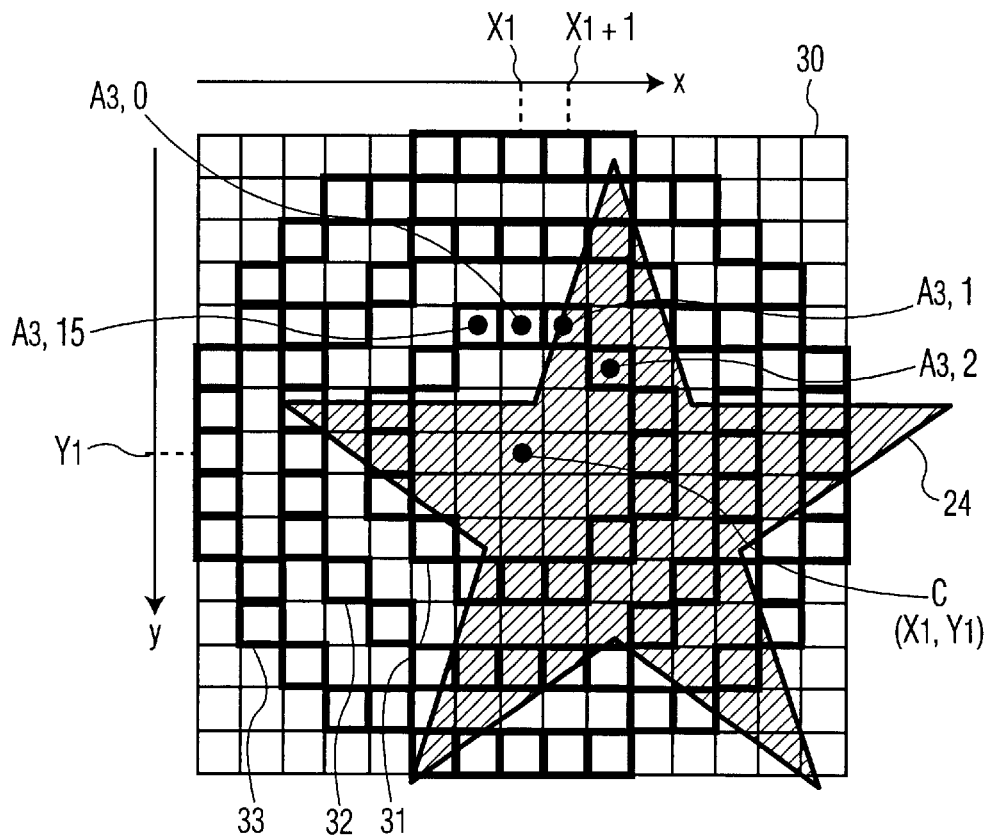
FIG. 3 is an enlarged view of circular data of the present invention.

FIG. 3 is an enlarged view showing the positional relation between circumferential regions 31 to 33 for calculating characteristic values and pixels of images including a specific image 24 when a scanning position moves up to a point (x1, y1) due to the above scanning. Three types of the circumferential regions 31 to 33 are used in accordance with a situation from the region having a smaller radius to the region having a larger region successively. This is further described later. In this case, (x1, y1) shows coordinate values using the left top angle of the search region 21 shown in FIG. 2 as an origin. In FIG. 3, three concentric regions 31, 32, and 33 having radiuses of 3, 5, and 7 pixels are shown as three types of usable regions using the pixel at the position of coordinate values (x1, y1) as the center C. In FIG. 3, these regions are shown by a thick line. Moreover, in FIG. 3, a block 30 of one square shows one pixel. In FIG. 3, the number of pixels showing a radius is equal to a number excluding the pixel of the center C. Moreover, these three types of concentric circumferential regions 31 to 33 are determined correspondingly to regions used to obtain the reference characteristic values previously accumulated in accumulation means 8 to be described later.

The data extraction means 5, as shown in FIG. 2, moves at the center C of the circumferential region 22 in the main scanning direction (corresponding to x-axis direction in FIG. 3) of an image for each pixel string to successively obtain data for pixels in the search region 21.

In this case, at the first stage of search, the scanning described for FIG. 2 is performed by using the circumferential region 31 having the smallest radius (see FIG. 3). Obtaining of data in this case is described below by referring to FIG. 3. That is, in the circumferential region 31 having a radius of 3 pixels located at the innermost side, each level value of RGB is obtained as data for a total of 16 pixels clockwise in the sequence from a pixel $A_{3,0}$ to a pixel $A_{3,1}$, pixel $A_{3,2}$, . . . , and pixel $A_{3,15}$.

Figure 4:
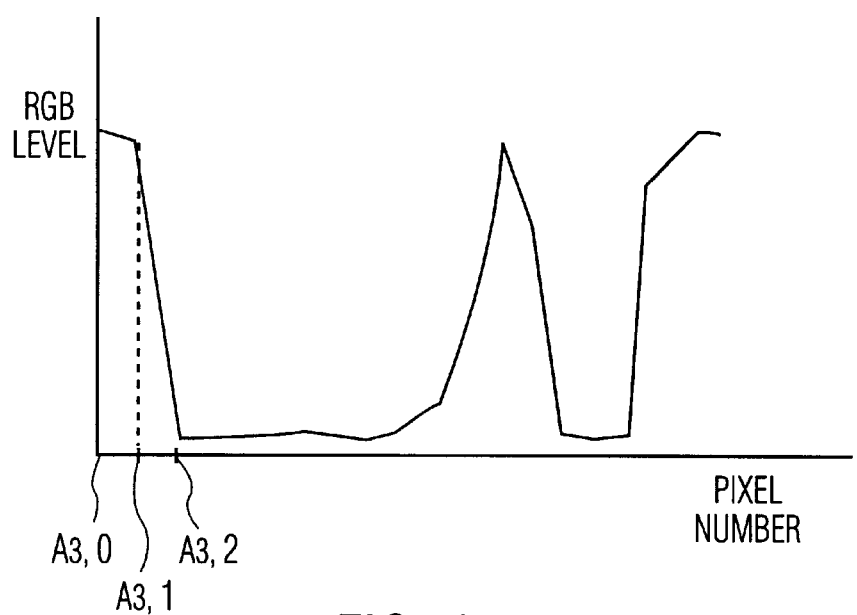
FIG. 4 is a one-dimensional layout drawing of circular data of the present invention.

FIG. 4 is an illustration showing RGB level values obtained from each pixel in these circumferential regions every pixel. Y-axis shows one type of level of R, G, or B of a pixel and X-axis shows the difference between pixels.

Then, the data is sent to the calculation means 6 in which the characteristic value of the data (this may be referred to as circular data) in a circumferential region is obtained. In this case, statistical characteristic values of the circular data such as the average value M and variance value V of the circular data, and the absolute value sum S of primary differences are obtained. These values are invariant to rotational movement.

Then, these characteristic values are sent to the judgment means 7 and compared with corresponding reference characteristic values accumulated in the accumulation means 8.

Figure 5:
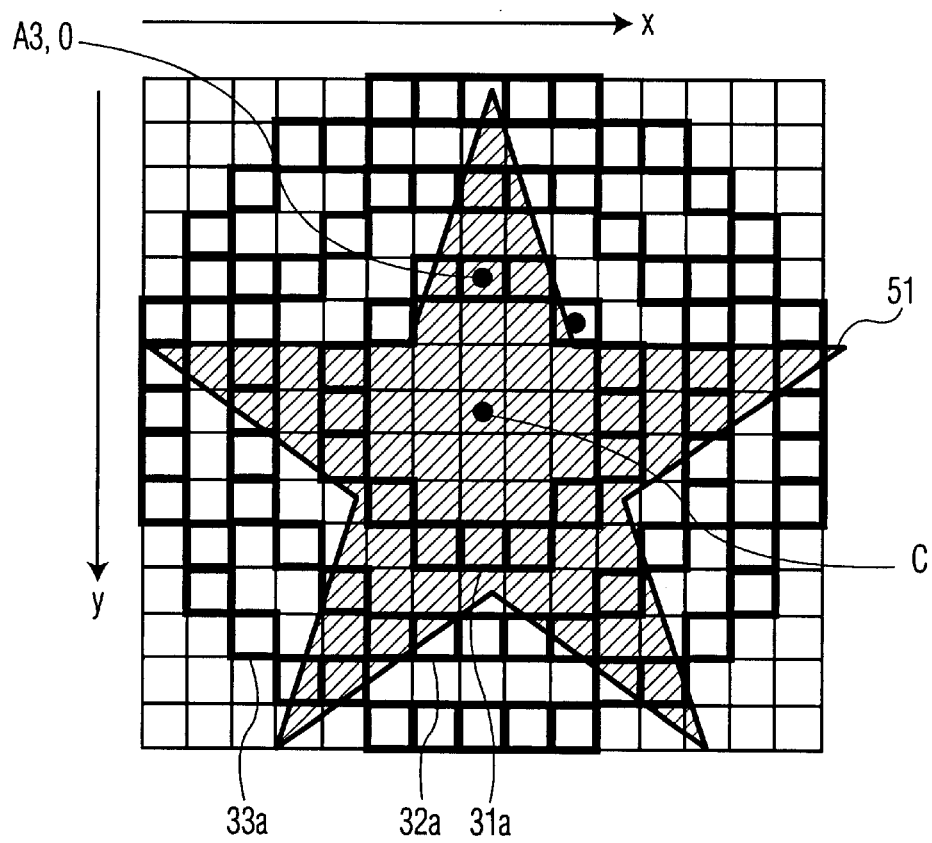
FIG. 5 is an illustration for explaining circles arranged on an image to be detected of the present invention.

That is, an average value Mt and variance value Vt and the absolute value average St of primary differences are previously accumulated in the accumulation means 8 as reference characteristic values related to an image to be detected (hereafter referred to as target image). These are reference characteristic values obtained from the data for pixels in three types of circumferential regions 31a to 33a different from each other in radius as shown in FIG. 5 and these circumferential regions 31a to 33a are designated on an image 51 to be detected. In addition, these circumferential regions 31a to 33a correspond to the circumferential regions 31 to 33 described for FIG. 3 and have the same shape. Moreover, thresholds THm, THv, and THs showing allowable ranges of fluctuations of Mt, Vt, and St serving as reference characteristic values are accumulated in the accumulation means 8 together with these reference characteristic values in the form of the table shown in FIG. 6.

The judgment means 7 obtains a reference characteristic value corresponding to the radius of the circumferential region currently detected and its threshold out of the accumulation means 8 and calculates a score (similarity) for performing the judgment to be described later from [Equation 1] in accordance with the characteristic value currently detected obtained from the calculation means 6. That is, specifically, the characteristic values in the circumferential region 31 about the scanning position (x1, y1) are compared with the reference characteristic values in the circumferential region 31a (see FIG. 5) corresponding to the circumferential region 31.

In the case of the following Equations, scores for an average value, variance value, and average value of absolute values of primary differences are shown by Pm, Pv, and Ps. Moreover, by unifying these values, the similarity showing the similarity between a characteristic value and a reference characteristic value in the same circumferential region are shown by P or P(n) (see Equations 1 and 2). The Pm, Pv, and Ps can be also respectively regarded as the similarity between characteristic values about each value in a circumferential region. Therefore, the reference characteristic values Mt, Vt, and St and the thresholds THm, THv, and THs are referred to as a similarity calculation criterion en bloc.

$Pm = 1.0 - |M-Mt|/THm$ $Pv = 1.0 - |V-Vt|/THv$ $Ps = 1.0 - |S-St|/THS$ $P = (Pm+Pv+Ps)/3$ [Equation 1]

These Pm, Pv, Ps, and P approach 1.0 when a circular pattern is similar to the circular pattern of a target image and show negative values when the former is different from the latter.

Therefore, when the value of P is positive, it is judged that the circumferential pattern (characteristic of pixel data in circumferential region) is similar to the circumferential pattern of the target image 51, that is, the similarity is high. When the value of P is negative, it is judged that the similarity between the both circumferential patterns is low. The criterion of the present invention corresponds to the above criterion for judging the level of a similarity depending on whether the value of P is positive or negative.

Moreover, when the judgment means 7 judges that a similarity is high, it instructs the data extraction means 5 to obtain data by using the circumferential region 32 having the second-largest radius instead of the circumferential region 31 having been used so far.

The data extraction means 5 instructed to obtain the data for pixels in the circumferential region 32 obtains the data in the circumferential region 32 having a radius larger than the data obtained last time without moving the central pixel C of a circle from the last position. In this case, a circumferential region having a radius of 5 pixels is used which is one rank larger than the first circle having a radius of 3 pixels.

Thereafter, similarly to the above-described procedure, a characteristic value is calculated from the data in the circumferential region 32 by the calculation means 5 and the above judgment is performed again by the judgment means 7. However, this judgment is performed in accordance with the score P(n) including a score P(n-1) calculate before as shown by [Equation 2].

$$P(n) = ((1-\alpha) \cdot (Pm+Pv+Ps)/3 + \alpha \cdot (n-1) \cdot P(n-1))/n \quad \text{[Equation 2]}$$

However, n (n=1,2, . . . , N-1) denotes a circumferential region number added to a circumferential region to be used. In this case, "1" is added to a circumferential region having the smallest radius among set circumferential regions and numbers are added to larger circumferential regions in an ascending order. P(n-1) is a score used for the judgment corresponding to a circumferential region number n-1 and $\alpha(0.0<\alpha<1.0)$ is a weight for previous data. Moreover, Pm(n), Pv(n), and Ps(n) are scores related to the average value and variance value of a circumference number n, and the average value of absolute values of primary differences of a circumference number n. In this case, P(0) is equal to P.

It is judged whether P(n) calculated in accordance with the Equation 2 is positive or negative in the same manner as the above. When P(n) is positive, the circumferential region 33 having a larger radius is used instead of the circumferential region 32. However, when P(n) is negative, an instruction is sent to the data extraction means 5 so as to move the scanning position (x1, y1) by one pixel. A new scanning position is (x1+one pixel, y1). In this case, the data extraction means 5 starts extraction of new data by using the smallest circumferential region 31.

Thus, the above judgment is repeated and the radius of a circumferential region is gradually increased whenever it is judged that a similarity is high. Moreover, when a condition that a similarity is high is satisfied for every preset circumferential region, the result of detecting the target image 51 is sent to the image output section 3 to complete detection.

For example, it is assumed that the radiuses of circumferential preset regions are 3, 5, 10, 15, and 20 pixels. In this case, when P is positive in the judgment of the circumferential region having the maximum radius of 20 pixels, detection is completed by assuming that the target image 51 is detected.

However, when the score P is negative, the central pixel C is shifted one pixel by one pixel in accordance with FIG. 2. When P is kept negative until an image is completed for the pixels in the search region 21, it is decided that the target image 51 is not present in the image and this decision is sent to the image output section 3 to complete the judgment.

As described above, by repeating judgment of a specific image with a small circumferential region until it is judged that the similarity is high, it is possible to generally decrease the number of pixels to be obtained necessary for detection. Therefore, it is possible to accelerate the detection processing of a target image. Moreover, when it is judged that the specific image is similar to the target image, it is possible to improve the detection accuracy by changing the small circumferential region to a larger circumferential region.

[Embodiment 2]

Embodiment 2 of an image detection apparatus of the present invention is described below.

Figure 7:
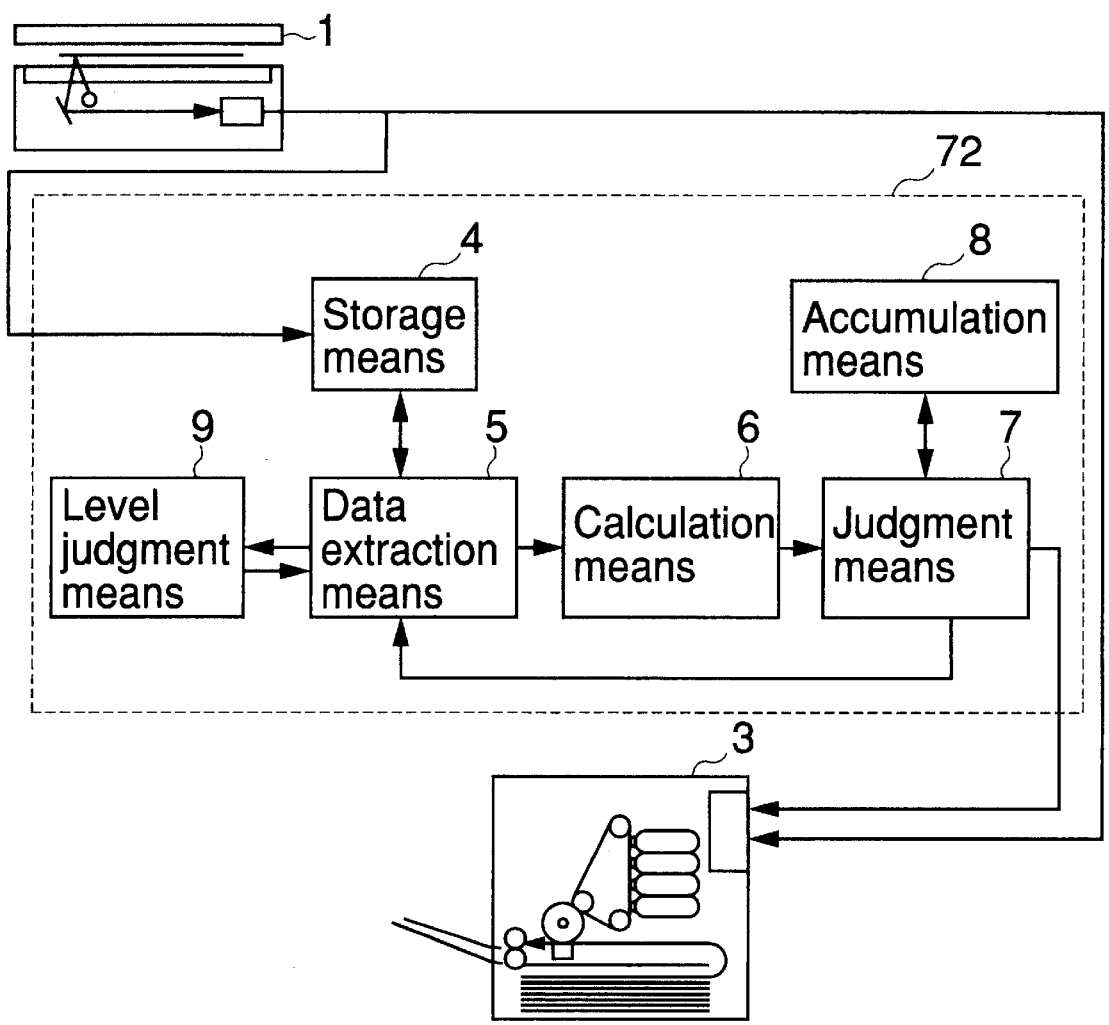
FIG. 7 is a schematic block diagram of an image reader using the image detection apparatus of embodiment 2 of the present invention.

FIG. 7 is a schematic block diagram of a copying machine using the image detection apparatus of the embodiment 2.

In FIG. 7, symbol 1 denotes an image read section for optically reading a manuscript and outputting it as image signals of RGB. Symbol 2 denotes an image detection apparatus of the present invention for detecting a specific image in an image. Symbol 3 denotes an image output section capable for obtaining a copied image by receiving read RGB signals, converting the signal into four colors of CMYK, and forming a color image on a form in accordance with the theory of electrophotography.

The copying machine of the embodiment 1 judges whether a specific image is included or not in a read image by an image detection apparatus 72 while outputting the image data read by the image read section 1. When the copying machine judges that no specific image is included, it perform the normal copying operation. When the copying machine judges that a specific image is included, it does not perform the normal copying operation by stopping the operation of the image output section 3. By entering some images on a bill in the copying machine as specific images, the copying machine serves as a copying machine having a function for preventing a bill from being copied.

Then, the structure of the image detection apparatus 72 is described below in detail while referring to FIG. 7.

That is, symbol 4 denotes storage means for temporarily storing an image signal, 5 denotes data extraction means for obtaining data from the data stored in the storage means 4 like a circle having a radius r, 6 denotes calculation means for calculating the characteristic value of the circular data obtained by the data extraction means 5, 7 denotes judgment means for judging whether marks are matched each other by comparing the characteristic value obtained by the calculation means 6 with a reference value, and 8 denotes accumulation means for accumulating the then reference value. Moreover, symbol 9 denotes level judgment means for checking the level of the data obtained from the storage means 4 by the data extraction means 5.

Operations of the image detection apparatus 2 of this embodiment thus constituted are described below referring to the FIGS. 7 and 8, while describing an embodiment of an image detection method of the present invention. In this case, a contrivance for reducing data throughput as a whole is mainly described. Other operations are basically the same as those of the embodiment 1.

That is, as shown in FIG. 7, an image captured by the image read section 1 is captured by the image detection means 2 as image signals of RGB. The image detection means 2 temporarily stores the image signals in the storage means 4. The storage means 4 is a RAM which can obtain any position data by designating an address. The storage means 4 stores the image and simultaneously, the data extraction means 5 first obtains the data for one pixel from the stored data.

In this case, the purposed pixel is a pixel (see FIG. 3) at the center C in the circumferential region from which data is obtained described for the embodiment 1.

The data extraction means 4 obtains RGB information from the pixel and sends it to the level judgment means 9.

Figure 8:
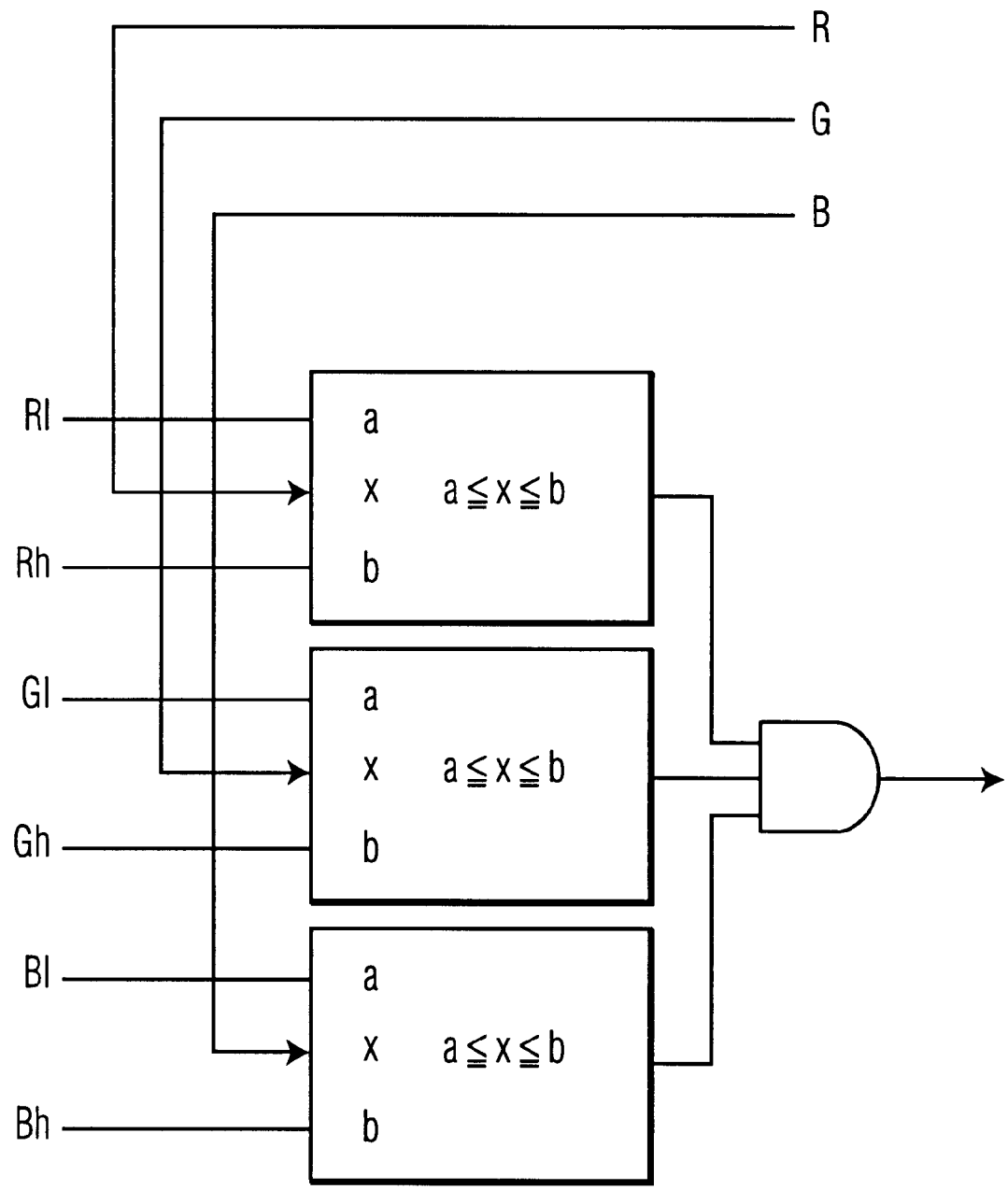
FIG. 8 is a block diagram of level judgment means of the present invention.

FIG. 8 is a block diagram of the level judgment means 9 which is constituted with a wind comparator for comparing values of RGB with set values. As shown in FIG. 8, an allowable fluctuation-range of the pixel color of the central position (pixel position provided with symbol C in FIG. 8) of the image 51 to be detected is previously set to R, G, and B respectively. These set allowable fluctuation ranges are compared with pixel values sent from the data extraction means 5. When every color value of a pixel is kept in a set color allowable range, "1" is output to the data extraction means 5. When every color value of the pixel is out of the allowable range, "0" is output to the data extraction means 5.

When the data extraction means 5 receives "0" from the level judgment means 9, it does not obtain data at this position but it scans the center C of the circumferential region 31 as described in FIG. 2 and moves to the next pixel position.

Moreover, when the data extraction means 5 receives "1" from the level judgment means 9, it obtains the data in the circumferential region 31 from the storage means 4 as described for the embodiment 1.

Hereafter, descriptions of the calculation of characteristic values by the calculation means 6 and the judgment by the judgment means 7 are omitted because they the calculation and the judgment are the same as the case of the embodiment 1.

However, when the center of the target image 51 is white, it is necessary to set all the allowable ranges of the colors shown in FIG. 8 so as to be a<x. However, when the center is black, it is necessary to set the allowable ranges so as to be x<b.

Thus, because the level of data related to the central pixel in a circumferential region is judged by the level judgment means 9 before obtaining of the data in the circumferential region is started, it is possible to further reduce the entire throughput.

[Embodiment 3]

The embodiment 3 of an image detection apparatus of the present invention is described below.

Figure 9:
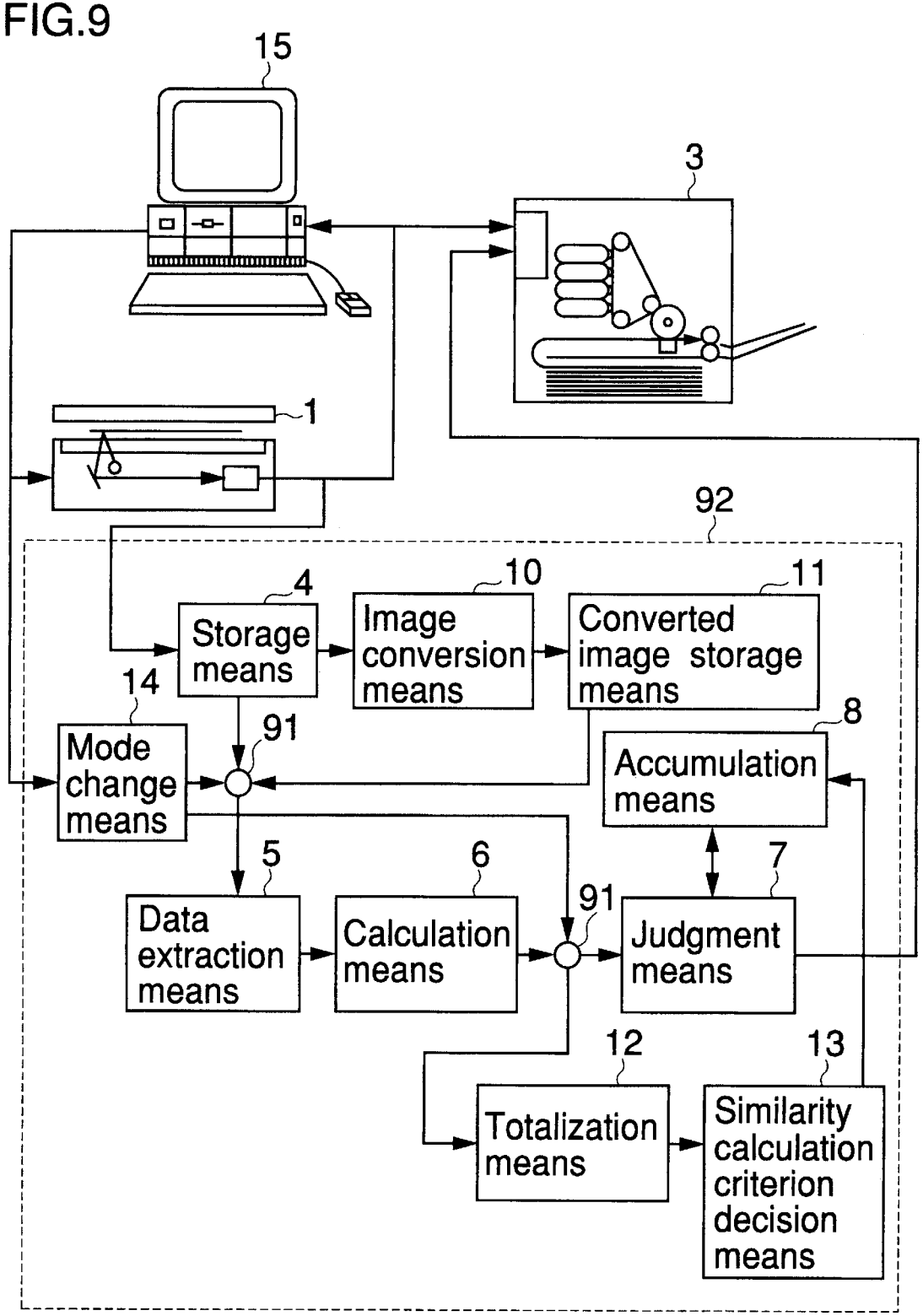
FIG. 9 is a schematic block diagram of an image reader using the image detection apparatus of embodiment 3 of the present invention.

FIG. 9 is a schematic block diagram of an image copying machine using the image detection apparatus of the embodiment 3.

Hereafter, a reference characteristic value and a method for determining the allowable range of the reference characteristic value are mainly described.

That is, it is already described that a characteristic value obtained from a circumferential region in each of the above-described embodiments is a characteristic value not subject to the position or direction of a manuscript. However, the relative positional relation between pixels in a target image previously read to obtain a reference characteristic value may cause a shift of up to one pixel from the relative positional relation between pixels in an image to be read for search even if using the same pixel size for the both cases. That is, in the case of a scanning method of moving in a circumferential region one pixel by one pixel under search, mismatching within one pixel may occur between the central position of a circumferential region from which a reference characteristic value is obtained and the central position of a circumferential region under search on the same target image. This represents that two characteristic values obtained by using circumferential regions having the same radius, that is, a reference characteristic value and a characteristic value calculated under search may not be matched each other though the same target image is used as an object. The mismatching degree between both characteristic values due to the shift within one pixel at the central position may show a considerably large value depending on the shape of a target image. Therefore, it is necessary to previously set the mismatching degree between the both characteristic values in accordance with the shape of the target image.

In other words, the above characteristic values are slightly fluctuated depending on the size of pixels to be read or the shift degree of the relative positions between an actual image and pixels. Particularly, when setting large pixels in order to reduce the entire throughput and detecting them in a rough image, the fluctuation of the characteristic values increases. Moreover, the fluctuation of the characteristic values depends on the shape of an image to be detected and the set size or position of a circle. Therefore, to perform accurate detection, it is necessary to previously set a characteristic value corresponding to an image to be detected and an allowable range of the characteristic value.

In the case of this embodiment, an image detection apparatus is described which allows a novel manuscript for preventing a forgery to be entered by automatically setting a proper characteristic value corresponding to a target image without using the above troublesome setting operation.

That is, in FIG. 9, symbol 1 denotes an image read section for optically reading a manuscript and outputting it as image signals of RGB. Symbol 2 denotes an image detection apparatus of the present invention for detecting a specific pattern in an image. Symbol 3 denotes an image output section for receiving the read RGB signals, converting the signals into four colors of CMYK, forming a color image on a form by means of electrophotography, and obtaining a copied image. Symbol 16 denotes a computer capable of controlling the operation of the image read section, confirming a read image, and designating an image read range.

The copying machine of the embodiment 3 judges by an image detection apparatus 92 whether a specific image is included or not in a read image while outputting the image data read by the image read section 1. Moreover, when the copying machine judges that no specific image is included in the read image, it performs the normal copying operation. When the copying machine judges that a specific image is included in the read image, it does not perform the normal copying operation by stopping the operation of the image output section 3. By entering some images on a bill in the copying machine as specific images, the machine serves as a copying machine having a function for preventing a bill from being copied. Moreover, it is possible to designate some specific images in an image by the computer 15 and enter the specific images as new images to be detected.

Then, the structure of the image detection apparatus 92 is described below in detail while referring to FIG. 9.

That is, symbol 4 denotes storage means for temporarily storing an image signal, 5 denotes data extraction means for obtaining data from the data stored in the storage means 4 like a circle having a radius r, 6 denotes calculation means for calculating the characteristic value of the circular data obtained by the data extraction means 5, 7 denotes judgment means for judging whether marks are matched each other by comparing the characteristic value obtained by the calculation means 6 with a reference value, and 8 denotes accumulation means for accumulating the then reference value. Symbol 10 denotes image conversion means for converting an image in storage means and 11 denotes storage means for storing an image converted by the image conversion means 10. Symbol 12 denotes totalization means for totalizing the results by calculation means and 13 denotes similarity calculation criterion decision means for deciding the calculation criterion of a similarity in accordance with the result by the totalization means 12. Symbol 14 denotes mode change means for changing the mark detection mode and the mark entry mode by receiving an instruction from the computer 15 to control the flow of data in the image detection apparatus 92. Moreover, changeover switch means 91 is a means for changing the flows of data from various means in accordance with a mode. Reference characteristic value calculation means of the present invention corresponds to the similarity calculation criterion decision means 13.

Operations of the image detection apparatus 92 of this embodiment thus constituted are described below by referring to FIGS. 9 and 10 while describing an embodiment of an image detection method of the present invention.

The image copying machine of this embodiment makes it possible to enter an optional image as an image to be detected when the mode change means 14 receives an instruction from the computer 15 and changes the image entry mode and image detection mode.

First, the operation when the mode change means 14 shows the image entry mode is described below.

An image captured by the image read section 1 is captured by the image detection means 2 as image signals of RGB. However, an image to be read in the image entry mode is read by designating only an image portion to be entered by the computer 15. The image detection means 2 temporarily stores the image signals in the storage means 4.

The image conversion means 10 converts the original image stored in the storage means 4 into a shifted and rotated image and calculates new pixel values when viewing the converted image from pixel positions of the original image. Therefore, the converted image in this case is an image comprising the new pixel values thus calculated. The new pixel values are calculated by applying the pixel positions of the above original image in order to reduce the influence of relative shifts from pixel positions under search. Therefore, a plurality of converted images considering a shift within one pixel are previously generated at the target image side by the image conversion means 10.

The above conversion operation is described below.

FIG. 10(a) is an illustration obtained by enlarging the portion of 3×3 pixels as a part of an image to be entered and also a part of the original image read by the image read section 1 and stored in the storage means 3. In FIG. 10(a), one block corresponds to one pixel.

The image conversion means 10 converts the original image in FIG. 10(a) into an image shifted by one pixel or less vertically and transversely. Pixel values of the converted image are obtained by using the interpolation of each pixel. For example, as shown in FIG. 10(b), when shift values are $\Delta x$ and $\Delta y$ ($0<\Delta x<1$, $0<\Delta y<1$) in the main scanning direction and the auxiliary scanning direction, pixels a, b, d, and e of an original image move to positions of pixels a', b', d', and e'. Therefore, when assuming that these moved pixel values are Ga', Gb', Gd', and Ge', these are, of course, the same as the pixel values of corresponding pixel positions of the original image.

As described above, because the pixel values of the shifted image necessarily use the pixel positions of the original image, the new pixel value Ge ($\Delta x$, $\Delta y$) at the pixel e of the converted image can be shown by a Equation 3. In this case, a part of each of the pixels a', b', d', and e' (hatched portion in FIG. 10(b)) moves into the region of the pixel position e of the converted image. It depends on a shift value how much each of these pixels enters the pixel position e. Therefore, these shift values are used as coefficients of the pixel values Ga', Gb', Gd', and Ge' after moved.

[Equation 3]

$$Ge(\Delta x, \Delta y) = \Delta x \cdot \Delta y \cdot Ga' + (1 - \Delta x) \cdot \Delta y \cdot Gb' + \\ \Delta x \cdot (1 - \Delta y) \cdot Gd' + \\ (1 - \Delta x) \cdot (1 - \Delta y) \cdot Ge'$$

[Equation 3]

Moreover, a rotational operation about a certain pixel in an entered image is performed. When an image rotated by $\theta°$ is shown by dotted lines in FIG. 10(c) and it is assumed that pixels entering the region of the pixel e at the center of nine pixels are a', b', d', and e' and values of these pixels are Ga', Gb', Gd', and Ge', the value Ge of the pixel e is obtained from $\Delta rx$ and $\Delta ry$ in FIG. 10(c) in accordance with the following [Equation 4].

$$Ge(\Delta rx, \Delta ry) = \Delta rx \cdot \Delta ry \cdot Ga' + \\ (1 - \Delta rx) \cdot \Delta ry \cdot Gb' + \\ \Delta rx \cdot (1 - \Delta ry) \cdot Gd' + \\ (1 - \Delta rx) \cdot (1 - \Delta ry) \cdot Ge'$$

[Equation 4]

Provided, $$\Delta rx(\Delta\theta) = \text{modf}(x_e \cos(\Delta\theta) - Y_e \cos(\Delta\theta))$$
$$\Delta ry(\Delta\theta) = \text{modf}(x_e \sin(\Delta\theta) + Y_e \sin(\Delta\theta))$$

In this case, $(x_e, y_e)$ denotes position coordinates of the original pixel when the rotation center is replaced with the origin (0, 0) and modf(x) denotes a function for obtaining the fraction part of x.

For example, when assuming shift values $\Delta x=0.1 \times n$ and $\Delta y=0.1 \times m$ (in this case, n and m are integers respectively ranging between −10 and 10) and a rotation angle $\Delta\theta=0.1 \times L$ (in this case, L is an integer of $0 \leq L$ and the maximum pixel shift is kept within one pixel by the rotational operation of $\Delta\theta$), image conversion is applied to each of combinations (n, m, L) (hereafter, these values are referred to as conversion parameters).

As described above, the image conversion means 10 calculates new pixel values of the converted image in accordance with the Equations 3 and 4 respectively. The new pixels thus obtained are stored in converted image storage means 11 as pixel data. Converted image data of the present invention corresponds to the pixel data of the converted image.

Then, the data extraction means 5 obtains circular data. However, because the mode change means 14 is set to the image entry mode, the data extraction means 5 obtains circular data from the converted image storage means 11 and sends the data to the calculation means 6. The data extraction means 5 obtains the circular data starting with the smallest circle while changing radiuses similarly to the case of radiuses used for detection. The calculation means 6 obtains characteristic values such as the average value M and variance value V of circular data and the absolute value sum S of primary differences of circular data same as those used for detection. The characteristic values obtained here correspond to basic characteristic values of the present invention and they are obtained for each type of data for the above types of converted images. These basic characteristic values are sent to the totalization means because the mode change means 14 is set to the image entry mode. The totalization means 12 totalizes a basic characteristic value for each radius of a circle obtained by the data extraction means 5.

When totalization of basic characteristic values for each circumferential region is completed for one converted image, the image conversion means 10 changes shift values and rotation values again and performs image conversion to store the pixel value data in the converted image storage means 11. Then, the data extraction means 5 obtains a circular pattern for each radius and performs a series of operations such as characteristic value calculation by the calculation means 5 and totalization by the totalization means 11 for all combinations of conversion parameters.

When the totalization of the above basic characteristic values obtained for all conversion parameters is completed, the totalization means 12 calculates Mm, Mv, and Ms serving as reference characteristic values. The each of Mm, Mv, and Ms is average vaslue which is calculated from the each totalization result of average value M, variance value V and absolute value sum S of primary differences for each circumferential region. Moreover, the totalization means 12 calculates standard deviations σm, σv, and σs and sends them to the similarity calculation criterion decision means 13.

Figure 6:
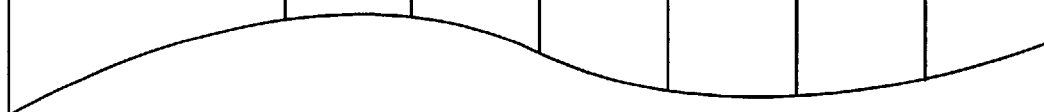
FIG. 6 is a table in accumulation means.

The similarity calculation criterion decision means 13 sets the average values Mm, Mv, and Ms to the positions Mt, Vt, and St of the table shown in FIG. 6 in the accumulation means 8 as reference characteristic values of an image to be detected and sets values obtained by multiplying the standard deviations m, v, and s by a constant value as the thresholds THm, THv, and THs respectively showing a fluctuation allowable range. That is, as described for the embodiment 1, the reference characteristic values Mt, Vt, and St and the thresholds THm, THv, and THs thus set serve as similarity calculation criteria.

The above described is the operation when the mode change means 14 shows the image entry mode.

Then, the operation when the image entry mode is changed to the image detection mode by the mode change means 14 is described below.

In this case, the mode change means 14 sets the changeover switch means 91 so that the data flow in the image detection apparatus 92 becomes the following.

That is, the data extraction means 5 obtains data from the storage means 4 and the changeover switch means 91 is set so that the characteristic value in each circumferential region output by the calculation means 6 can be sent to the judgment means 7. The structure in this case is the same as that of the image detection apparatus 2 of the image copying machine described for the embodiment 1. Therefore, detailed description of the structure is omitted.

An image detection apparatus of the present invention is not restricted to the purpose for only copying machines. It is also possible to realize the image detection apparatus as a part of a color image input unit such as a color scanner or a part of a color image output unit such as a color printer or a single unit using a input as a color image signal and an output as a judgment result.

For the above embodiment, a case is described in which the radius of a circumferential region is successively increased. However, the present invention is not restricted to the above case. By separating a case in which it is judged that there is an extremely high similarity from a case in which it is judged that there is a high similarity, it is also possible to use a structure using a large circumferential region at a stroke by skipping one radius or two radiuses for the former case. Thereby, it is possible to further improve the processing speed.

Moreover, for the above embodiment, a case is described in which an annular region having a width of one pixel is used as a circumferential region. However, the present invention is not restricted to the above case. It is also possible to use a ring width of one pixel or more.

As described above, the present invention makes it possible to detect an image by keeping a high accuracy while reducing the throughput. Therefore, the present invention has an advantage that a target image is efficiently detected compared to the conventional case.

Moreover, it is possible to automatically set a proper characteristic value corresponding to an image and to further improve the detection accuracy.

Furthermore, even if a novel manuscript appears as a manuscript to be detected, it is possible to enter the novel manuscript by a simple method.

An embodiment of an image detection apparatus of the present invention is described below by referring to the accompanying drawings.

The 25th invention of the present invention is an image processing apparatus comprising extraction means for obtaining characteristic values from an input image signal in blocks, storage means for storing the characteristic data, accumulation means for accumulating a plurality of reference data values previously obtained, comparison means for comparing the characteristic data with the reference data to obtain the similarity between them, storage means for storing the similarity, and judgment means for judging the presence or absence of a specific image in an input image in accordance with the similarity for a plurality of nearby blocks. Therefore, the 25th invention makes it possible to provide an image processing apparatus capable of detecting the presence or absence of a specific image whose arrangement is unknown from an input image.

The 26th invention of the present invention uses the image processing apparatus described in the 25th invention, in which the judgment means judges the presence or absence of a specific image whose arrangement is unknown in an input image by comparing the average similarity or accumulated similarity between regularly arranged blocks with a threshold. The 26th invention makes it possible to detect the presence or absence and the arrangement of a specific image whose arrangement is unknown from an input image.

The 27th invention of the present invention uses the image processing apparatus described in the 25th invention, provided with storage means storing the arrangement of reference data for a specific image, in which the judgment means judges the presence or absence of a specific image in an input image by comparing the arrengement of the reference data for regularly arranged blocks with the arrangement of the reference data for the specific image stored in the storage means. Therefore, the 27th invention can provide an image processing apparatus capable of detecting the presence or absence of a specific image whose arrangement is unknown from an input image at a higher accuracy.

The 28th invention of the present invention uses the image processing apparatus described in the 25th invention, provided with storage means storing the arrangement of reference data for a specific image, in which the judgment means judges the presence or absence of the specific image in an input image by comparing the arrangement of the reference data with the arrangement of the reference data only for a higher arrangement of similarities between regularly arranged blocks with the reference data for the specific image stored in the data sequence storage means. That is, the judgment means (1) searches an arrangement of the blocks having high similarities out of a plurality of arrengements of the blocks, and (2) judges the presence or absence of a special image in input images by comparing the arrengement of reference data for the blocks which are disposed in said arrengement with the arrangement of the reference data to said special image stored in said storage means. Therefore, the 28th invention makes it possible to provide an image processing apparatus capable of detecting the presence or absence of a specific image whose arrangement is unknown from an input image at a high accuracy.

The 29th invention of the present invention uses the image processing apparatus described in the 25th invention, in which the judgment means inputs the arrangement of regularly arranged blocks into a neural network previously learning the arrangement of blocks of a specific image and detects the specific image in accordance with the output of the neural network. Therefore, the 29th invention makes it possible to provide an image processing apparatus capable of detecting the presence or absence of a specific image whose arrangement is unknown from an input image at a high accuracy.

The 30th invention of the present invention uses the image processing apparatus described in the 25th invention, in which the comparison means for comparing the characteristic data with the reference data to obtain the similarity between these data compares the characteristic data with the reference data when the characteristic data meets a certain condition. Therefore, the 30th invention makes it possible to provide an image processing apparatus capable of detecting the presence or absence of a specific image whose arrangement is unknown from an input image in a short time.

The 31st invention of the present invention uses the image processing apparatus described in the 25th invention, in which the judgment means uses a mask pattern for specifying the arrangement of blocks by masking one block or more in a frame to be processed. Therefore, the 31st invention makes it possible to easily detect the presence or absence and the arrangement of a specific image whose arrangement is unknown from an input image.

The 32nd invention of the present invention uses the image processing apparatus described in the 27th or 28th invention, in which the storage means storing the arrengement of the reference data for the specific image stores the arrangement of reference data numbers. Therefore, the 32nd invention makes it possible to provide an image processing apparatus capable of detecting a specific image whose arrangement is unknown from an input image at a high accuracy.

The 33rd invention of the present invention uses the image processing apparatus described in the 27th or 28th invention, in which the storage means storing the arrengement of the reference data for the specific image stores the arrangement of characteristic value data. Therefore, the 33rd invention makes it possible to detect the presence or absence of a specific image whose arrangement is unknown from an input image at a high accuracy.

The 34th invention of the present invention uses the image processing apparatus described in the 25th invention, in which the extraction means for obtaining the characteristic values extracts the number of pixels in a characteristic color range of one color or more used for a specific image as a characteristic value. Therefore, the 34th invention makes it possible to detect a characteristic value independent of the direction of an image and moreover, detect whether a specific image is included in or not an input image.

The 35th invention of the present invention uses the image processing apparatus described in the 25th invention, in which the extraction means for obtaining the characteristic value uses the information for density change in a block. Therefore, the 35th invention makes it possible to detect a characteristic value independently of the direction of an image and moreover, detect whether a specific image is included in or not an input image.

The 36th invention of the present invention uses the image processing apparatus described in the 25th invention, in which the extraction means for obtaining the characteristic value extracts the number of pixels in a characteristic color range of one color or more used for a specific image in a block and the information for density change together as characteristic values. Therefore, the 36th invention makes it possible to detect whether a specific image is included in or not an input image at a high accuracy.

The 37th invention of the present invention uses the image processing apparatus described in the 25th invention, in which the specific image is an image for securities. Therefore, the 37th invention makes it possible to detect whether a bill or securities is included in or not an input image.

[Embodiment A1]

An embodiment of an image processing apparatus of the present invention is described below.

Figure 11:
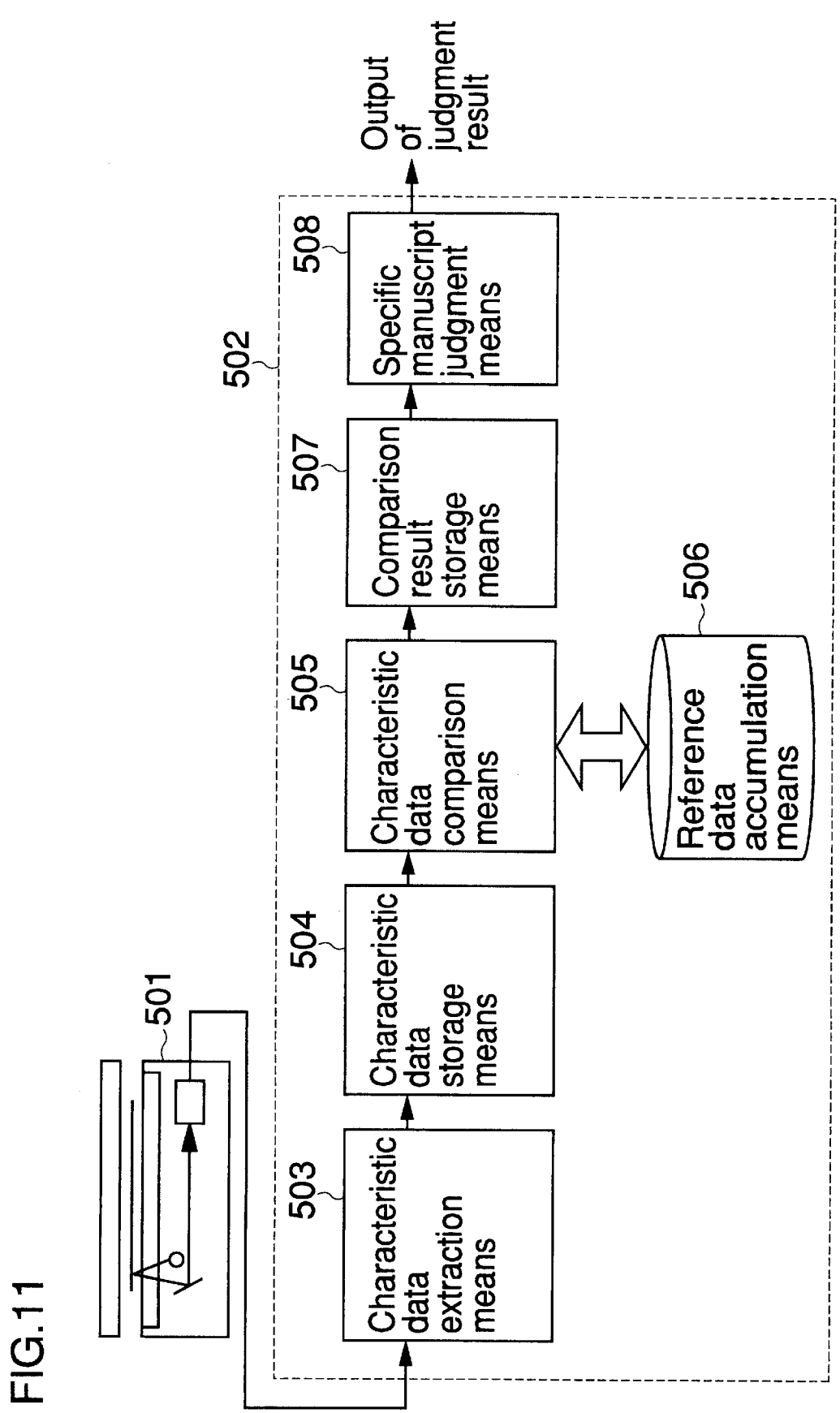
FIG. 11 is a schematic block diagram of the specific image detection apparatus of embodiment A1 of the present invention.

FIG. 11 is a schematic block diagram of the specific image detection apparatus of the embodiment A1.

In FIG. 11, symbol 501 denotes a scanner for optically reading a color manuscript and outputting the manuscript as three-signal digital data of red R, green G, and blue B and 502 denotes a specific image detection apparatus of the present invention.

The specific image detection apparatus 502 operates as described below. That is, read RGB signals are sent to characteristic extraction means 503 for detecting a specific color and the characteristic extraction means 503 extracts one characteristic or more. In this case, the characteristic extraction means 503 detects pixels corresponding to characteristic colors of specific images of three different colors, counts the number of characteristic color pixels detected out of each block of an image, and records the counted result in the characteristic data storage means 504 for each block as block characteristic data. Characteristic data comparison means 505 captures the block characteristic data in blocks recorded in the characteristic data storage means 504, compares the block characteristic data with the reference data stored in the reference data accumulation means 506, selects the nearest reference data, and stores the then similarity in the following comparison result storage means 507. The specific manuscript judgment means 508 selects the similarities stored in the comparison result storage means 507 corresponding to a plurality of blocks in accordance with a certain rule, calculates the sum of the similarities, and outputs a judgment result correspondingly to the sum.

Operations of the specific image detection apparatus 502 of this embodiment thus constituted are described below more minutely.

Figure 12:
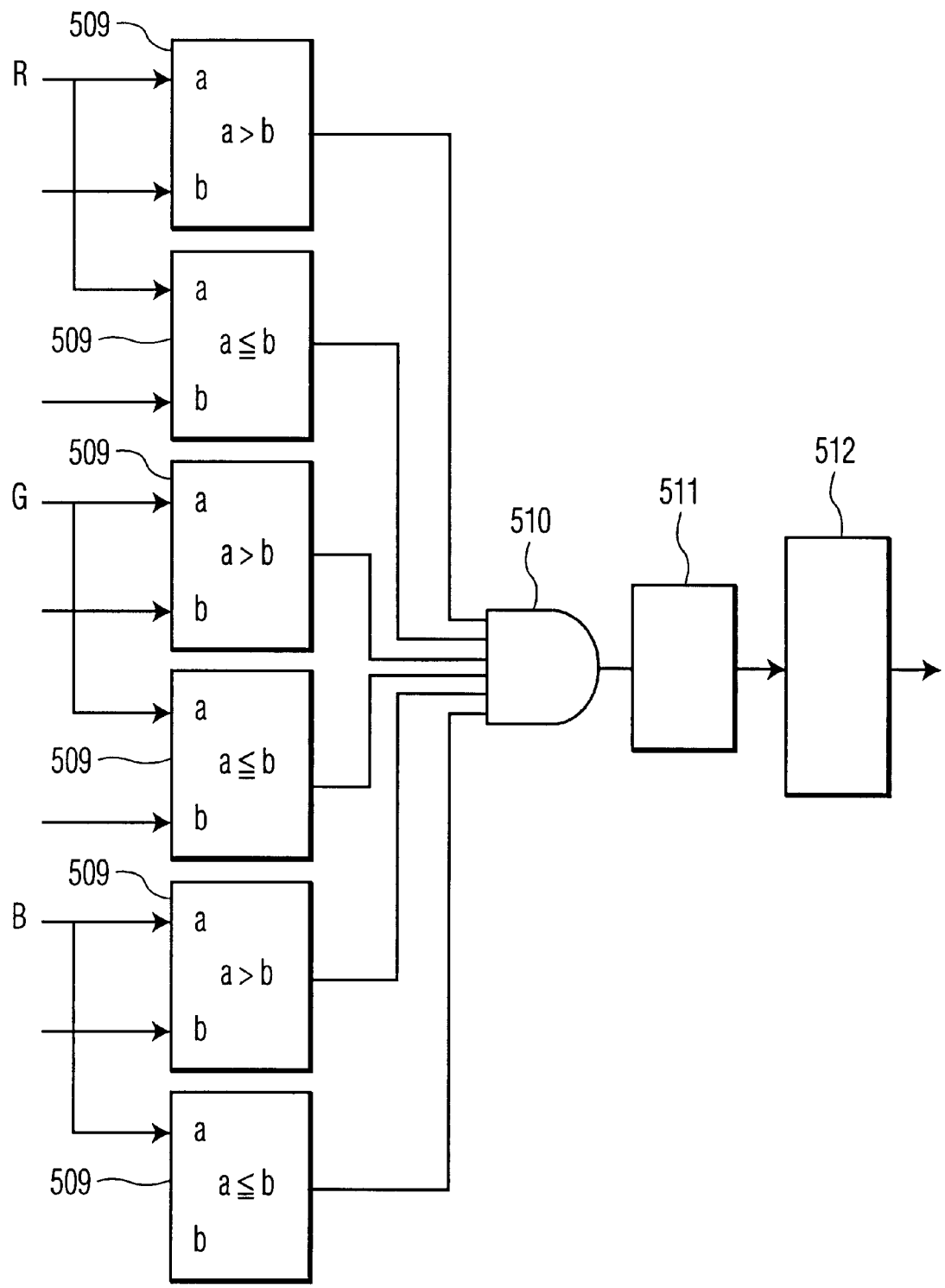
FIG. 12 is an illustration of the structure of the characteristic data extraction means of the embodiment A1 of the present invention.

First, the RGB digital signals captured from the scanner are input to the characteristic data extraction means 503. The characteristic data extraction means 503 detects specific colors included in a specific image and it is constituted with a comparator 509 for comparing the RGB signals with designated color signals as shown in FIG. 12. A designated color signal designates a color included in a specific image. Colors included in a purposed specific image are previously obtained by statistically processing them each of which generally uses a color showing a large range used for the natural color or pattern of a specific image or the vermilion of a stamp. When designating a color, the upper and lower limit values of each of RGB are designated in order to provide a width for the designated color and pixels in these ranges are handled as specific color pixels. Outputs of the comparator 509 are collected by an AND gate 510. When an input image signal shows a specific color, outputs of the AND gate 510 are set to 1 because every output of the comparator 509 becomes 1. The number of pixels of the specific color thus detected is counted by a counter 511 in blocks. In this case, a block includes read images equivalent to a plurality of pixel units in the main and auxiliary scanning directions. Therefore, a rectangle including 200 200 pixels is assumed as one block by using 200 pixels as a unit for pixels of 300 dpi. Thus, the counter stores a count result in a buffer 512 every input of 200 and it is reset. Buffers 512 equal to the number of blocks in the main scanning direction are used and the data for one block is recorded in the auxiliary scanning direction. When data is recorded from the counter 511 into the buffers 512, the number of characteristic color pixels of one block in the auxiliary scanning direction is counted by writing a data addition result already written on the buffers 512. When input of the data for one block is completed in the auxiliary scanning direction, the contents in the buffers 512 are recorded in characteristic data storage means 504.

The characteristic data storage means 504 is constituted with a random access memory (RAM). FIG. 13 shows the internal structure of the characteristic data storage means 504. In FIG. 13, a thick continuous line shows a boundary between blocks, in which C0(n), C1(n), and C2(n) respectively show the number of characteristic color pixels counted at n-th block and shows that one block characteristic data value is constituted with three specific color pixels.

Figure 14:
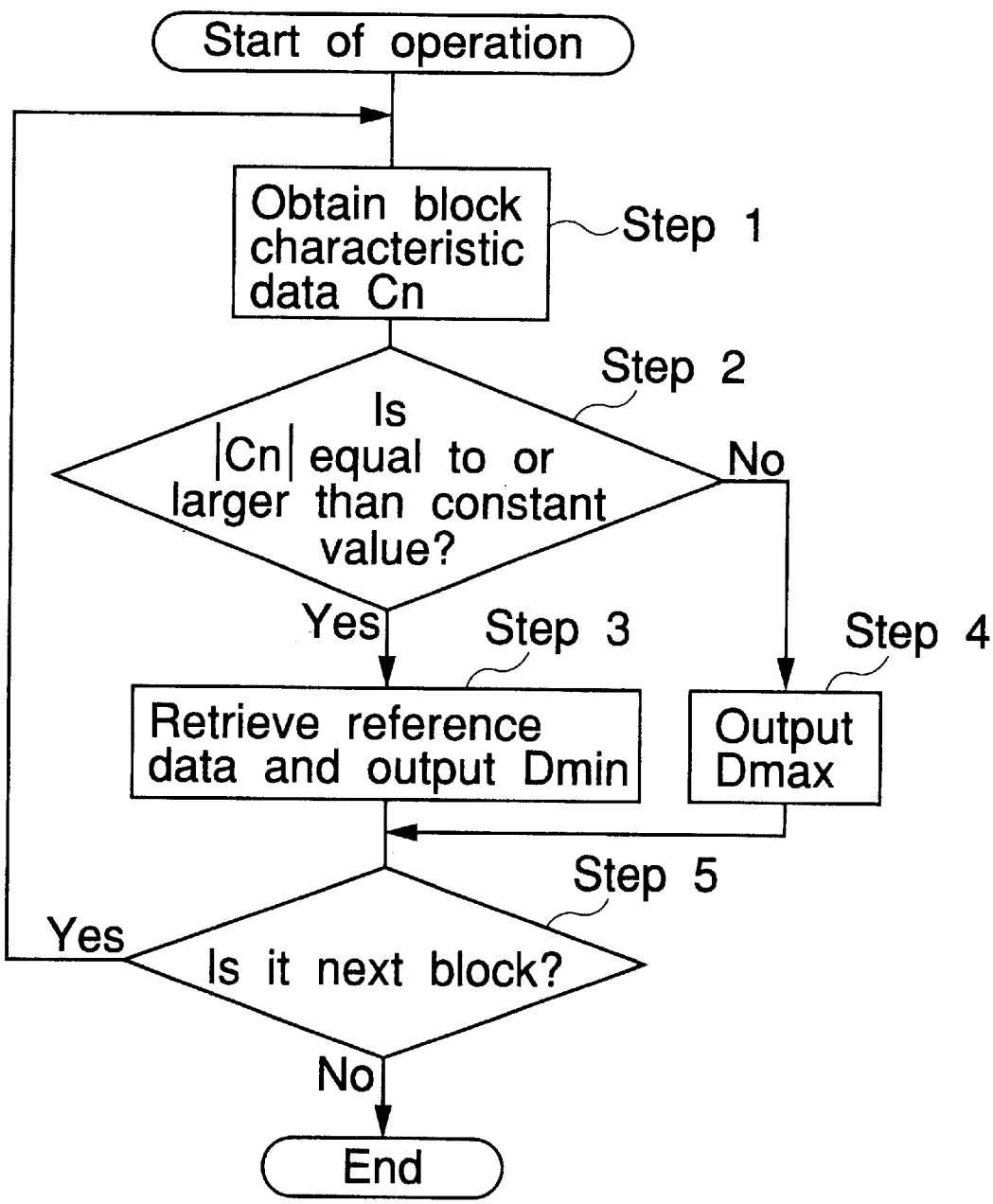
FIG. 14 is a flow chart showing the CPU operation of the characteristic data comparison means of the embodiment A1 of the present invention.
Figure 15A:
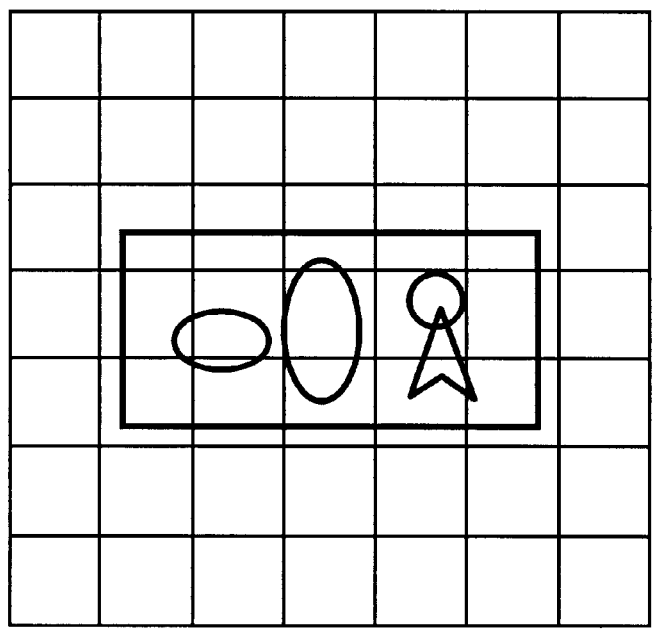
FIG. 15(a) is an illustration of reference data when horizontally arranging a specific manuscript in the embodiment A1.
Figure 15B:
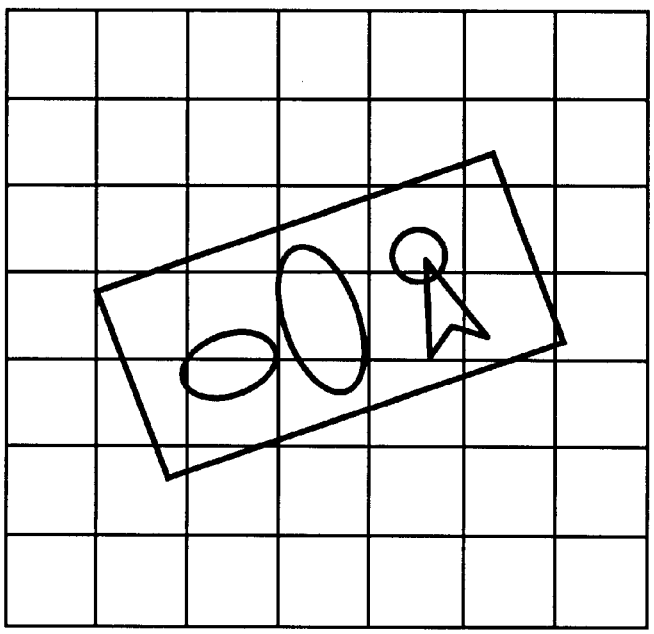
FIG. 15(b) is an illustration of reference data when shifting a specific manuscript from horizontal arrangement in the embodiment A1.
Figure 15C:
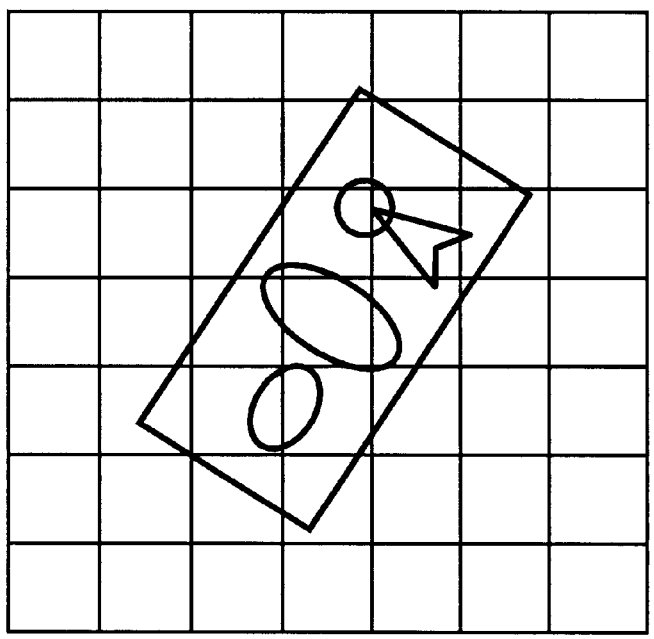
FIG. 15(c) is an illustration of reference data when shifting a manuscript from horizontal arrangement in the embodiment A1.
Figure 15D:
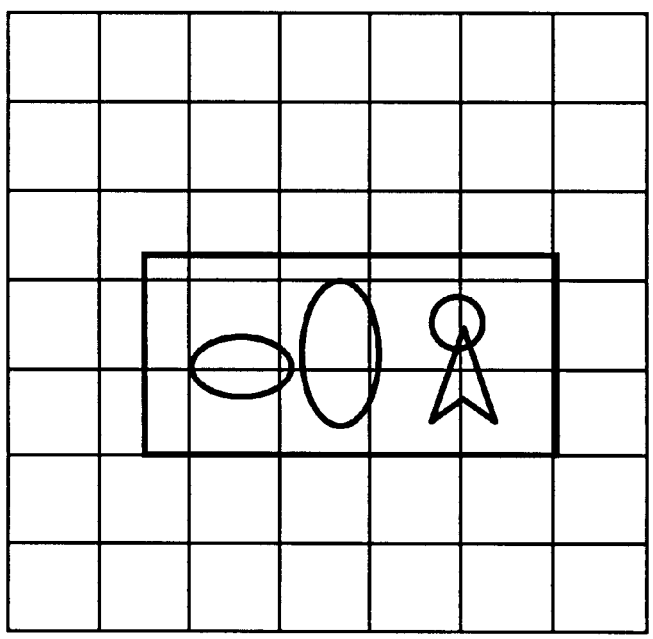
FIG. 15(d) is an illustration of reference data when shifting a manuscript from horizontal arrangement in the embodiment A1.

When block characteristic data is stored in the characteristic data storage means 504, the characteristic data comparison means 505 compares the characteristic data with reference data. The characteristic data comparison means 505 is constituted with a CPU and a ROM storing a program and operations of the means 505 are described below by referring to FIG. 14. FIG. 14 is a flow chart showing CPU operations of the characteristic data comparison means 505.

First, stored block characteristic data is obtained (step 1). The obtained data is shown by Cn=(C0(n), C1(n), C2(n), (in this case, n denotes a block number)) as three-dimensional vector data. It is judged whether the Cn magnitude |Cn| is a certain value or more (step 2). When the magnitude |Cn| is a certain value or more, a value closest to Cn is retrieved out of the reference data stored in reference data accumulation means 506. The reference data in the reference data accumulation means 506 is shown by Tm=(TC0(m), TC1(m), TC2(m)) (in this case, m denotes a reference data number, m=1 to M), in which Dnm when a distance Dnm=|Cn−Tm| (Euclidean distance of three-dimensional vector) is minimized is detected and output as Dmin (step 3). Moreover, when |Cn| does not exceed a certain value in step 2, reference data is not retrieved in step 3 but a value Dmax which can be taken by Dnm or more is output (step 4). The above operations are applied to every block (step 5).

Then, the reference data stored in the reference data accumulation means 506 is described below. The reference data accumulation means 506 is constituted with a read only memory (ROM) and reference data is previously obtained from a purposed specific image and accumulated. As shown in FIGS. 15(a)–15(d), the reference data is obtained from the number of pixels corresponding to each characteristic color for each block when placing a purposed specific image horizontally (FIG. 15(a)), rotating a purposed specific image from the horizontal position in small angles (FIGS. 15(b) and 15(c)) or shifting the positional relation between a block and the specific image every number of pixels in the horizontal and vertical directions (FIG. 15(d)) on the basis of the time when setting the purposed specific image to the horizontal position as shown in FIG. 15. However, because the number of reference data values obtained as described above is tremendous, only typical reference data values are extracted and stored in the reference data accumulation means 506 as reference data.

Figure 16:
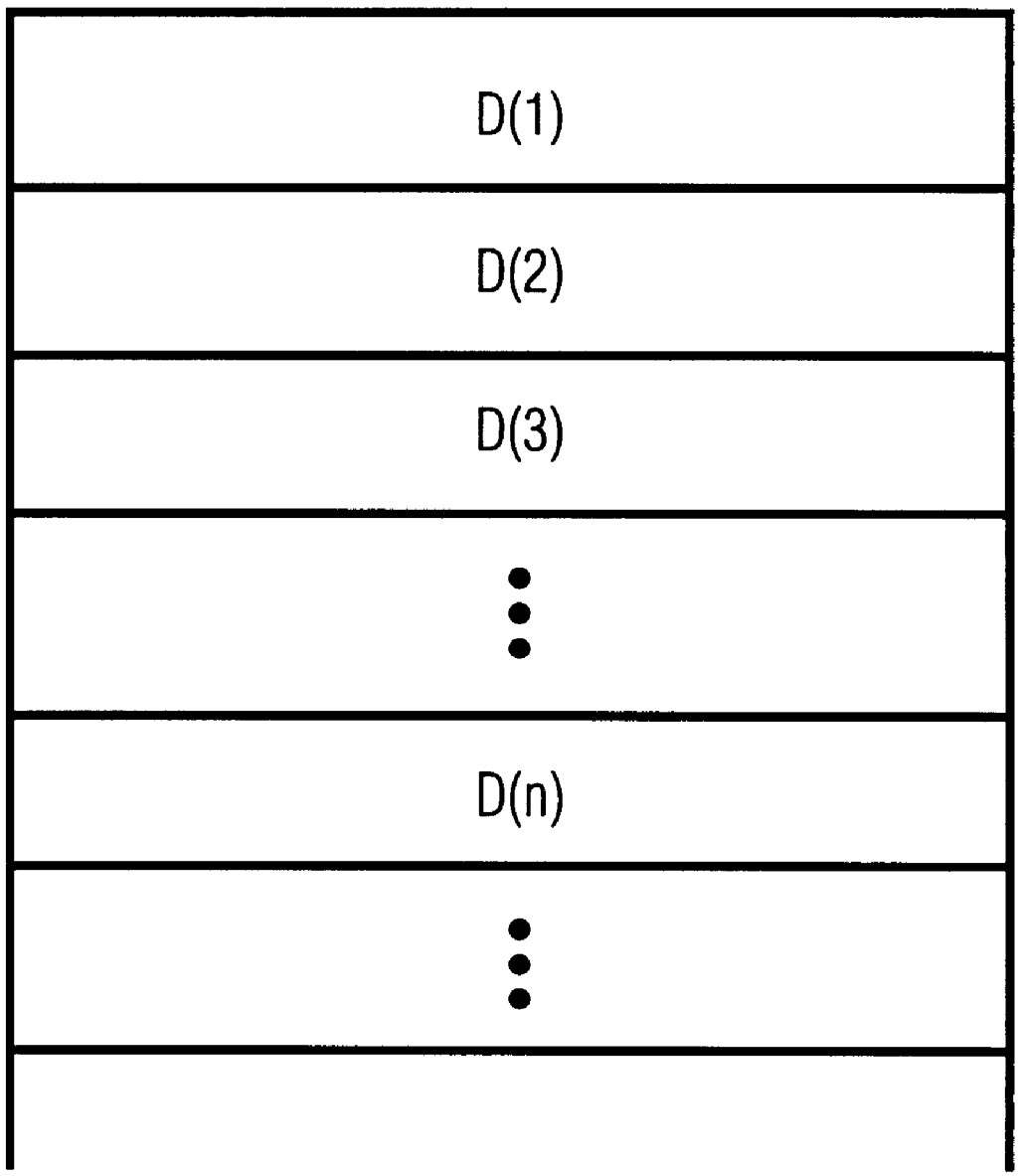
FIG. 16 is an illustration of the internal structure of the comparison result storage means of the embodiment A1 of the present invention.
Figure 17A:
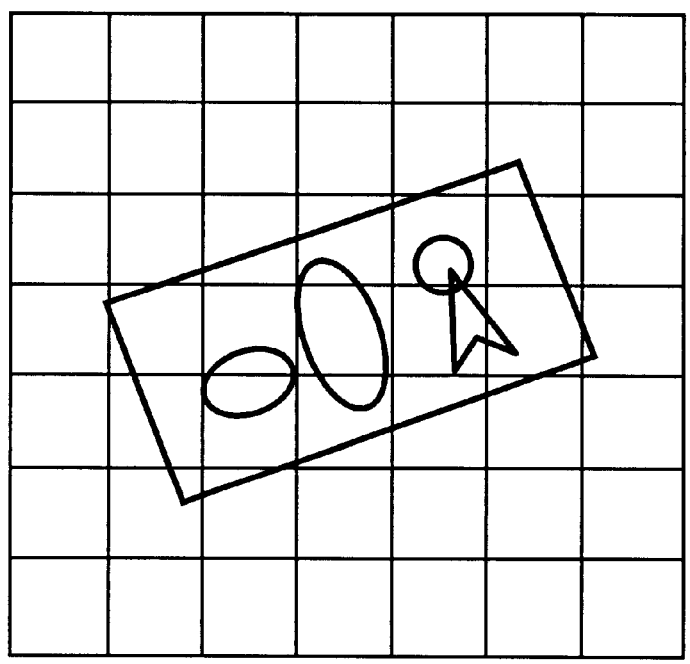
FIG. 17(a) is an illustration for explaining the result of comparison between specific image arrangement and reference data in the embodiment A1 of the present invention, showing images including a specific image.
Figure 17B:
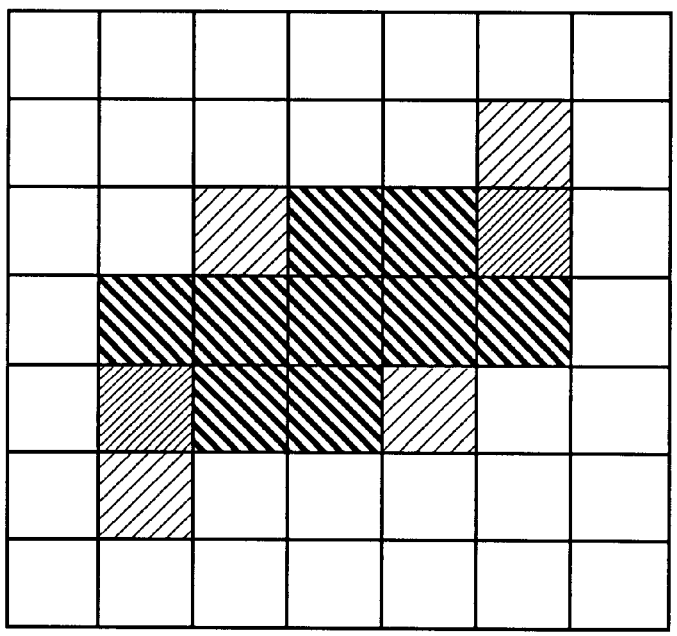
FIG. 17(b) is an illustration for explaining the result of comparison between specific image arrangement and reference data in the embodiment A1 of the present invention, showing an illustration of a reference data comparison result.
Figure 18A:
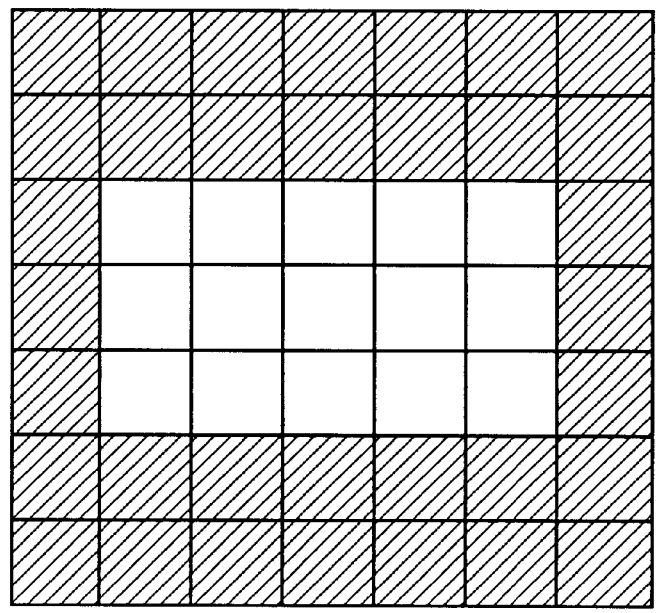
FIG. 18(a) is an illustration of a horizontally-arranged frame mask in the embodiment A1 of the present invention.
Figure 18B:
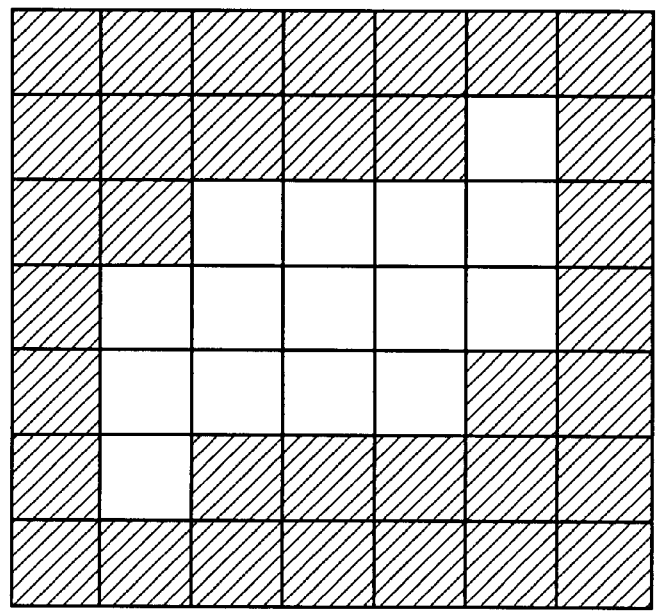
FIG. 18(b) is an illustration of a frame mask shifted from horizontal arrangement in the embodiment A1 of the present invention.
Figure 18C:
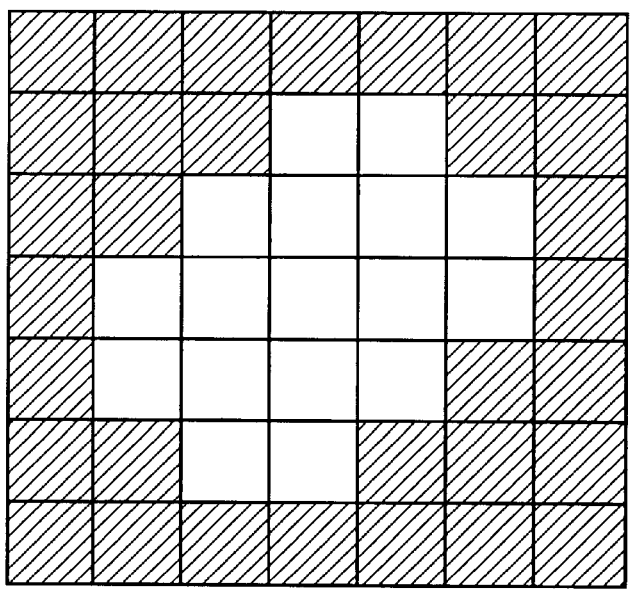
FIG. 18(c) is an illustration of a frame mask shifted from horizontal arrangement in the embodiment A1 of the present invention.
Figure 18D:
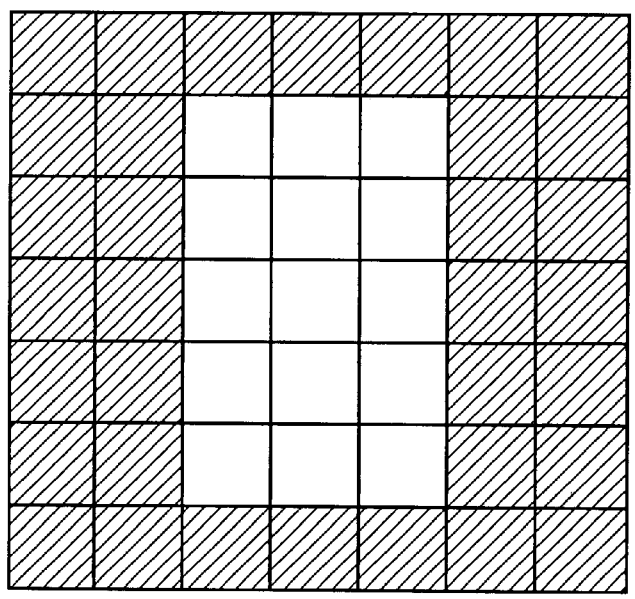
FIG. 18(d) is an illustration of a vertically-arranged frame mask in the embodiment A1 of the present invention.

Outputs of the characteristic data comparison means 505 are stored in comparison result storage means 507 constituted with a RAM. FIG. 16 shows the internal structure of the comparison result storage means 507. In FIG. 16, symbol D(n) denotes a distance Dmin the nearest reference data obtained for each block or a maximum distance Dmax. FIGS. 17(a) and 17(b) show the image of D(n) provided for each block of an actual specific image. FIG. 17(a) shows an image including a specific image and FIG. 17(b) shows the value of D(n) for each block. In FIG. 17(b), the white portion denotes Dmax or a value closed to Dmax and the black portion denotes Dmin which is 0 or a value close to 0 and the hatched portion denotes the middle value between Dmin and Dmax.

When a reference data comparison result is stored in the comparison result storage means 507, specific manuscript judgment means 508 judges the presence or absence of a specific image in accordance with the above comparison result and a frame mask to be mentioned later. The specific manuscript judgment means is constituted with a CPU and a ROM. By uniting a plurality of adjacent blocks into one frame, the comparison result storage means 507 performs processing for each frame. A frame performs processing so that the central position of the frame shifts one block by one block from the top left of an input image in the horizontal and vertical directions. Moreover, a frame mask masks a block constituting a frame. As shown in FIGS. 18(i a) to 18(d), a plurality of masks having different mask angles are prepared. Hatched quadrangles in FIGS. 18(a) to 18(d) show mask blocks and white quadrangles show non-mask blocks and codes showing the mask and non-mask blocks by two values of 0 for the former and 1 for the latter are stored in the ROM as a part of a program.

Figure 19:
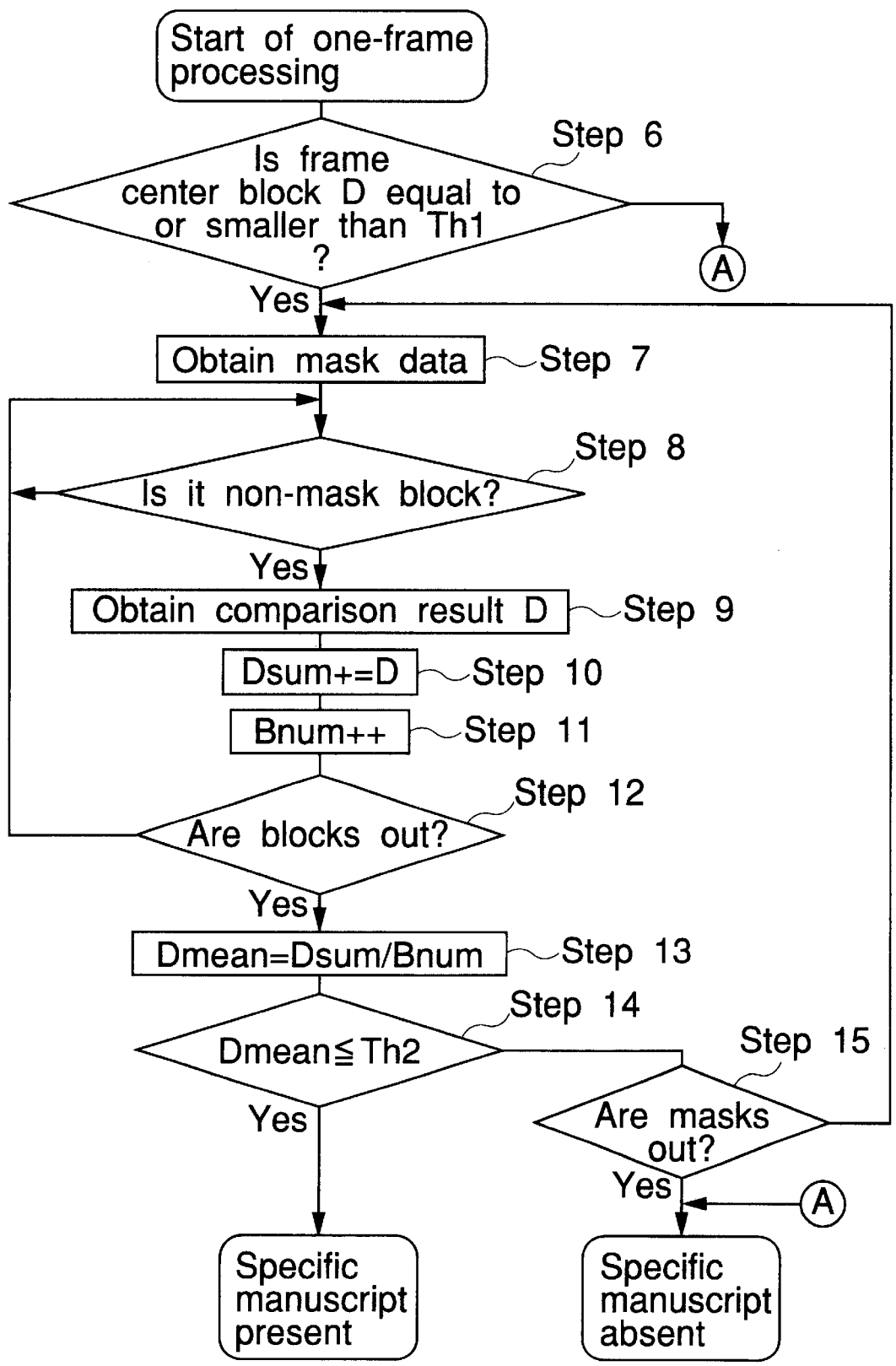
FIG. 19 is a flow chart showing the CPU operation for one frame of the specific manuscript judgment means of the embodiment A1 of the present invention.

FIG. 19 is a flow chart for explaining the processing contents by the comparison result storage means 507 for one frame.

First, the reference data comparison result of the block at the center of a frame is read and compared with a threshold Th1. When the comparison result is larger than the threshold Th1, it is judged that no specific image is present in the frame and step moves to the next frame. When the comparison result is equal to less than the threshold Th1, one frame mask is obtained from the ROM (steps 6 and 7). Obtained frame masks are successively checked every block, the following processing is skipped for mask blocks, and the reference comparison result values D(n) of blocks corresponding to non-mask blocks are obtained from the comparison result storage means 507 (steps 8 and 9). Obtained reference comparison result values D(n) are sequentially added to Dsum (step 10) and moreover, a counter value Bnum for counting the added number of blocks is incremented (step 11). The processings from step 8 to step 11 are performed until blocks constituting a frame come to zero (step 12). An average value Dmean for each block is obtained in accordance with a number-of-blocks counter value Bnum and a reference comparison result sum Dsum (step 13) and compared with a threshold Th2. When Dmean is equal to or less than Th2, it is judged that a specific image is present (step 14). Moreover, when Dmean is larger than Th2, it is judged that no specific image is present and frame masks are changed to repeat steps 7 to 14 (step 15).

The above operations make it possible to detect a specific image.

[Embodiment A2]

An embodiment of an image processing apparatus of the present invention is described below.

Figure 20:
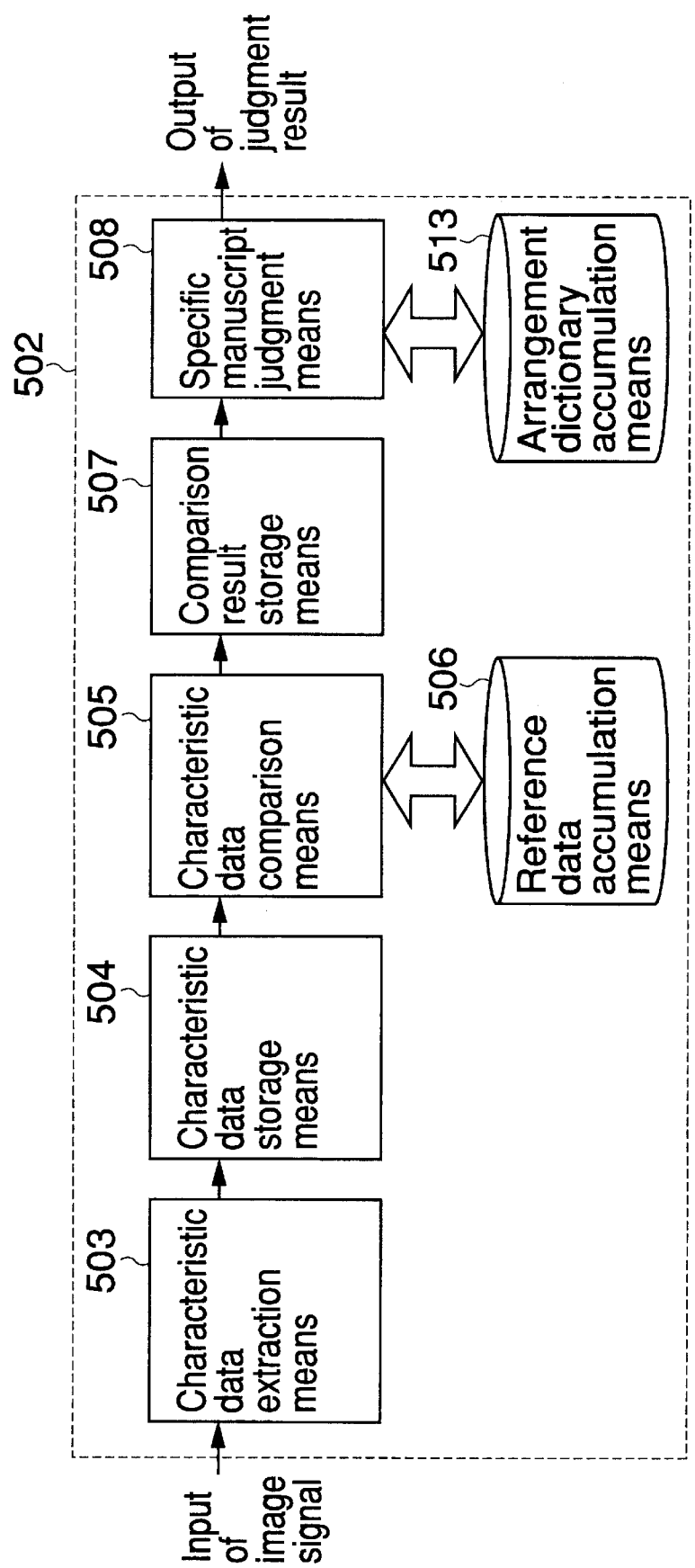
FIG. 20 is a schematic block diagram of the specific image detection apparatus of embodiment A2 of the present invention.

FIG. 20 is a schematic block diagram of the specific image detection apparatus 502 of the embodiment A2.

In FIG. 20, structures of characteristic extraction means 503 for detecting a specific color from RGB signals serving as inputs, characteristic data storage means 504 for temporarily storing block characteristic data, and characteristic data comparison means 505 for comparing the block characteristic data in blocks recorded in the characteristic data storage means 504 with the reference data stored in reference data accumulation means 506 are the same as those of the specific image detection apparatus of the embodiment A1. However, the specific image detection apparatus 502 of the embodiment A1 is different from the specific image detection apparatus 502 of the embodiment A2 in that the characteristic extracted data comparison means 505 of the embodiment A1 compares block characteristic data with reference data, selects the nearest reference data, and stores the then similarity in the following comparison result storage means 507 but the apparatus 502 of the embodiment A2 stores also the number of the reference data selected simultaneously with a similarity in the comparison result storage means 507. Moreover, the apparatuses 502 of the embodiments A1 and A2 are different from each other in that the specific manuscript judgment means 508 of the embodiment A2 judges the presence or absence of a specific image in accordance with the similarity, selected reference data number, and characteristic data arrangement dictionary stored in arrangement dictionary accumulation means 513.

Operations of the specific image detection apparatus 502 of this embodiment thus constituted are described below mainly on the characteristic data comparison means 505, comparison result storage means 507, and specific manuscript judgment means 508 which are different from those of the embodiment A1.

Figure 21:
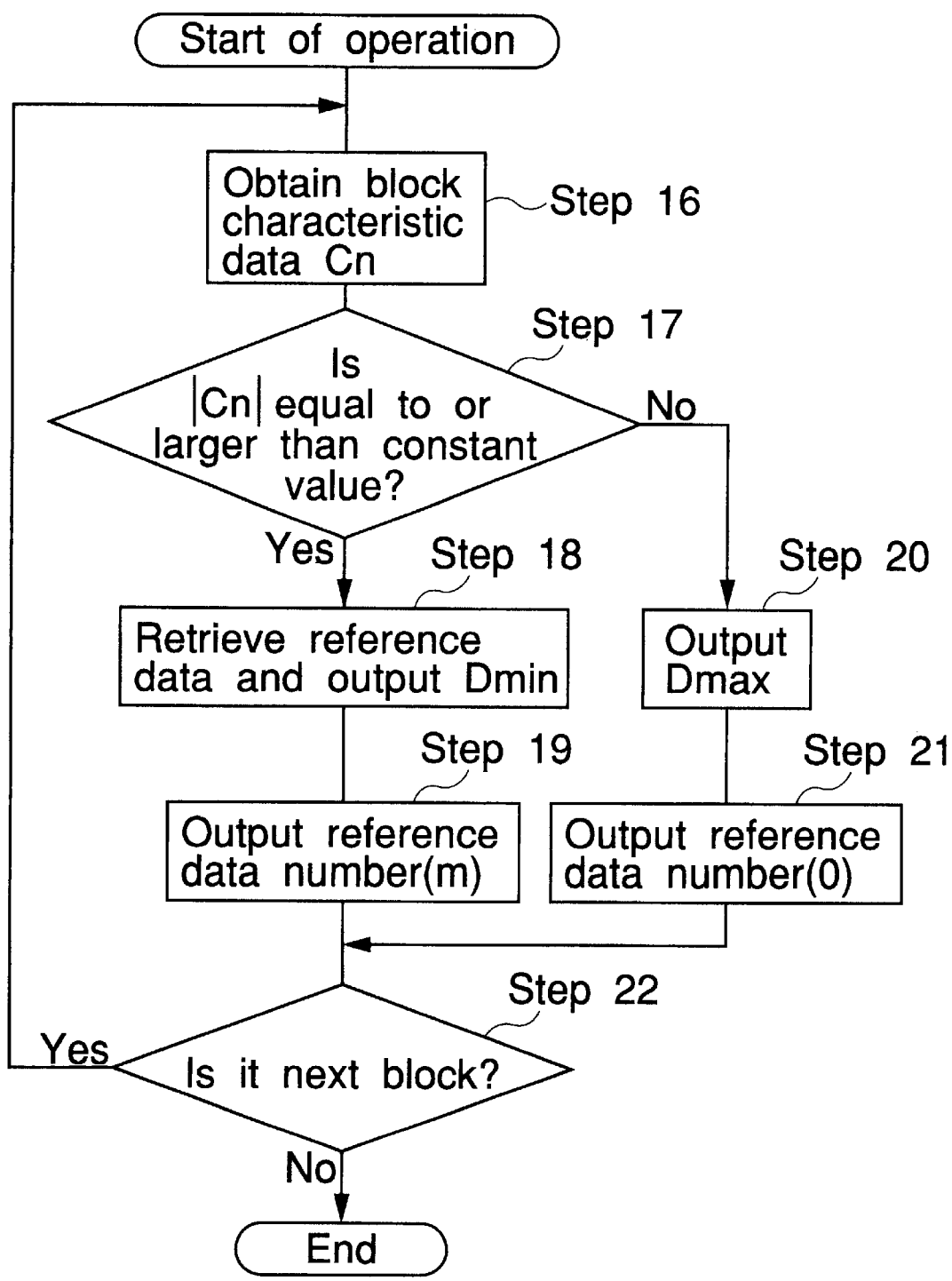
FIG. 21 is a flow chart showing the CPU operation of the characteristic data comparison means of the embodiment A2 of the present invention.

FIG. 21 is a flow chart showing operations of the characteristic data comparison means 505 constituted with a CPU and a ROM. Steps 16 to 18 and step 20 are the same as steps 1 to 3 and step 4 in FIG. 14 used for description of the embodiment A1. Therefore, their descriptions are omitted. When the reference data of data is retrieved in step 18, a selected reference data number m ($1 \leq m \leq M$) is output (step 19). When Dmax is output in step 20 without retrieving data, 0 is output as a reference data number.

Figure 22:
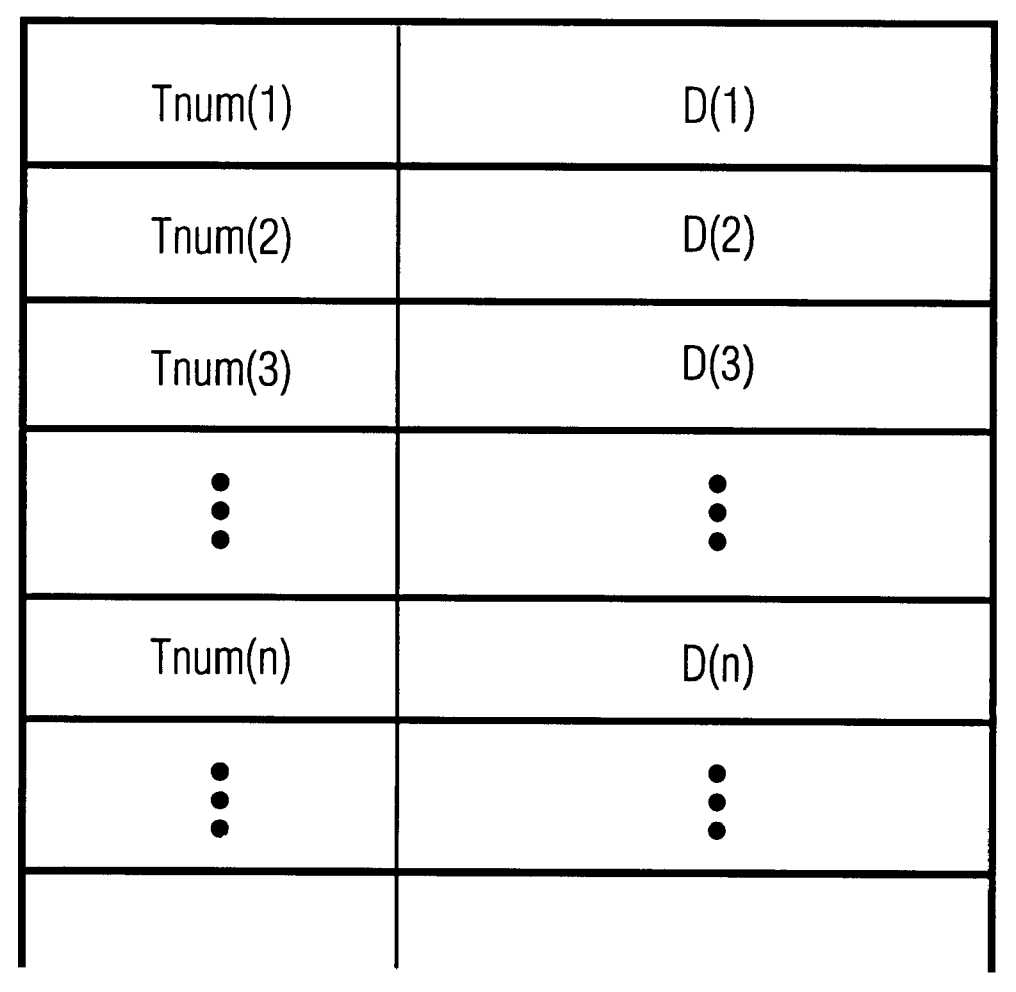

FIG. 22 shows the internal structure of the comparison result storage means 507. In FIG. 22, symbol Tnum(n) denotes a reference data number selected by the characteristic data comparison means 506 and D (n) denotes a distance Dmin from the nearest reference data obtained for each block or a maximum distance Dmax.

When reference data comparison result is stored in the comparison result storage means 507, the specific manuscript judgment means 508 judges the presence or absence of a specific image in accordance with the comparison result by the means 508 and a frame mask. The specific manuscript judgment means 508 is constituted with a CPU and a ROM. The specific manuscript judgment means 508 performs processings while applying a frame mask in frames.

Figure 23:
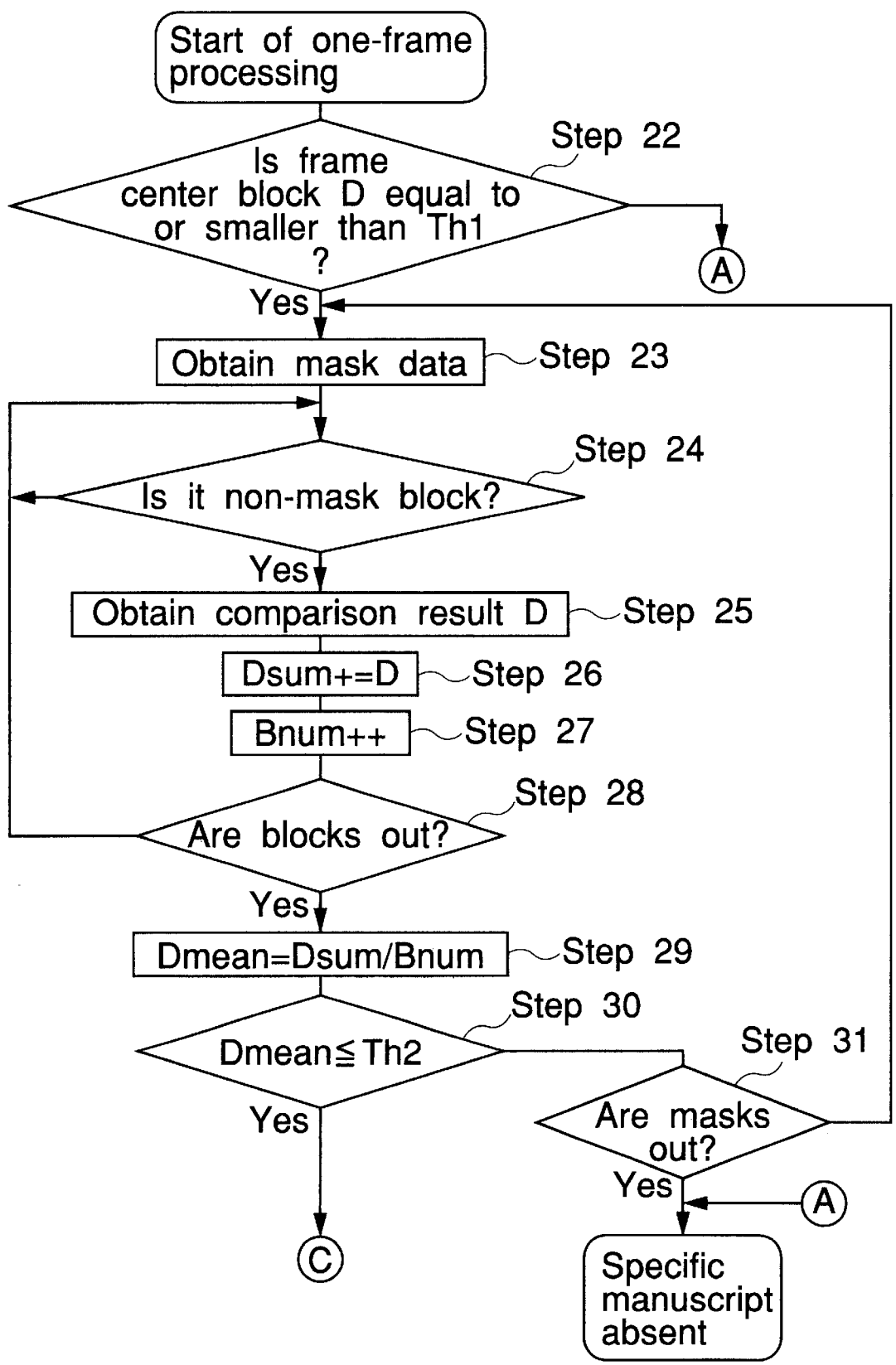
FIG. 23 is a flow chart for explaining the processing for one frame of the specific manuscript judgment means of the embodiment A2 of the present invention.
Figure 24:
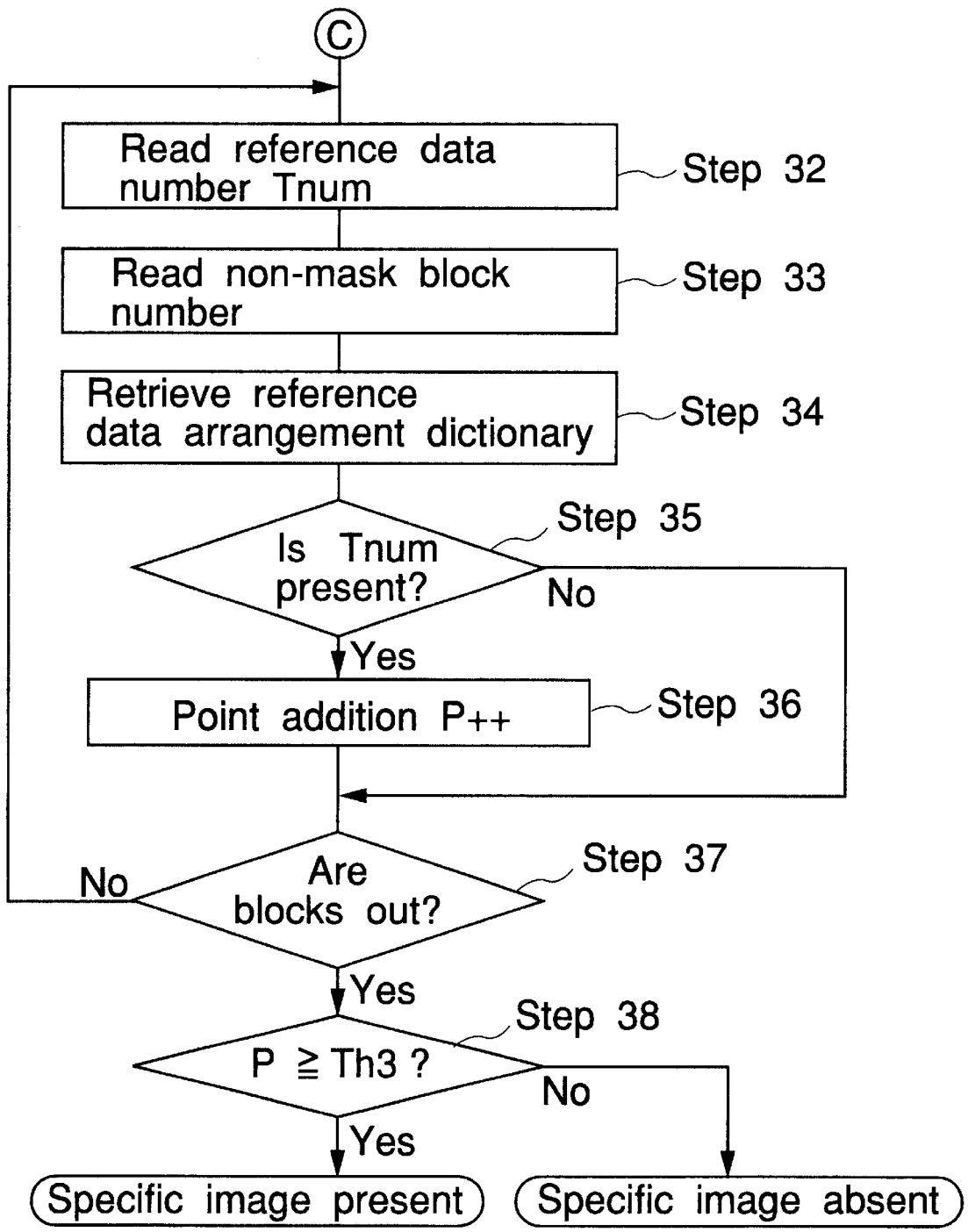
FIG. 24 is a flow chart for explaining the processing for one frame of the specific manuscript judgment means of the embodiment A2 of the present invention.

FIGS. 23 and 24 are flow charts for explaining processing contents for one frame of the specific manuscript judgment means 508.

First, the reference data comparison result at the center of a frame is read and compared with a threshold Th1. When the result is larger than the threshold Th1, it is judged that no specific image is present in the frame. When the result is equal to or less the threshold Th1, one frame mask is obtained from the ROM (steps 22 and 23). Obtained frame masks are checked one block by one block, the following processing is skipped for mask blocks, and reference comparison result values D(n) of blocks corresponding to non-mask blocks from the comparison result storage means (steps 24 and 25). The obtained reference comparison result values D(n) are sequentially added (step 26) and a counter value Bnum for counting the added number of blocks is incremented (step 27). Processings from step 22 to step 27 are performed until the blocks constituting one frame come to zero (step 28). An average value Dmean for one block is obtained from number-of-block counter value Bnum and reference result sum Dsum (step 29). When Dmean is larger than Th2, it is judged that no specific image is present (step 30) and the processings of steps 23 to 30 are repeated until no frame mask is left (step 31).

Figures 25A, 25B:
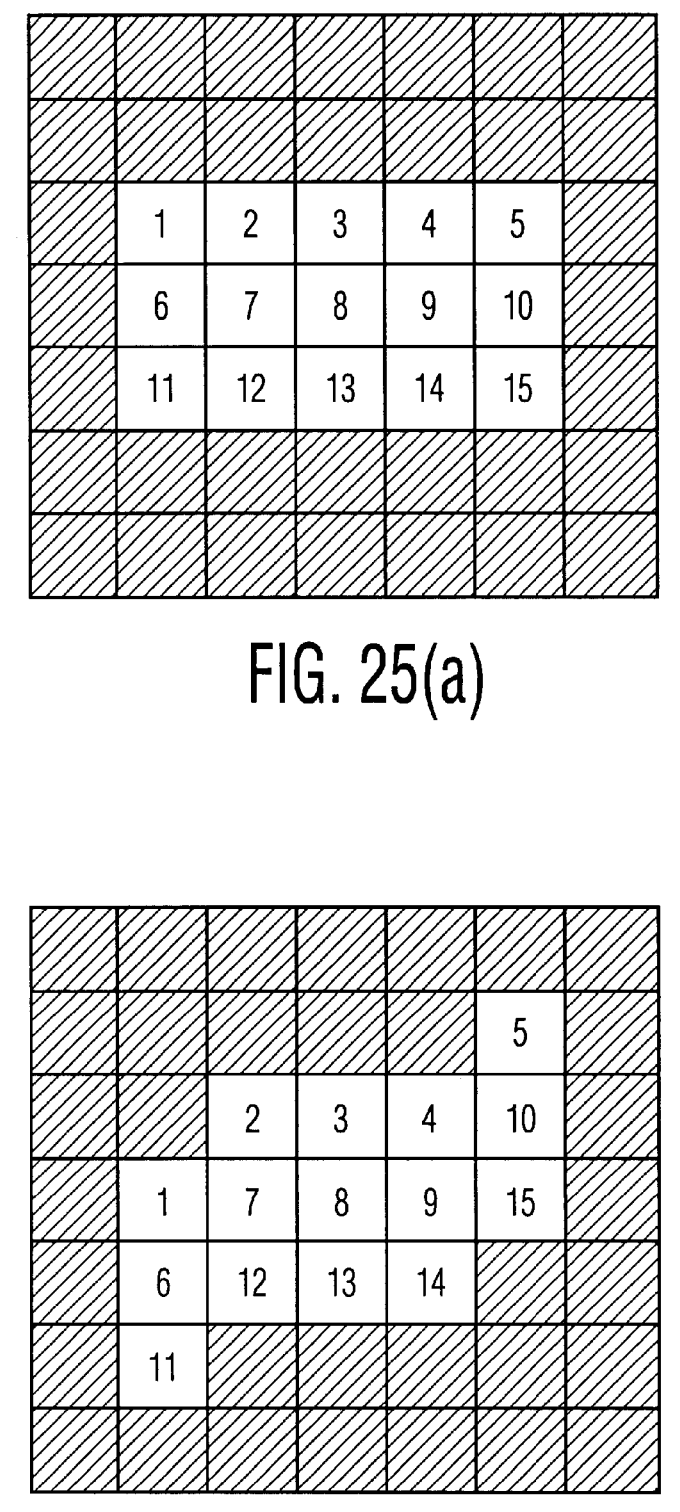

However, when Dmean is equal to or less than Th2, the reference data number Tnum(n) at a position corresponding to a non-mask block is read (step 32) and the non-mask block number of a frame mask used is read (step 33). In this case, the non-mask block number of a frame mask used is a number previously provided for each non-mask block as shown in FIG. 25. The non-mask block numbers of each frame mask are arranged so that they are brought to almost the same position when setting a non-mask block 1 so that it comes to the top left and a non-mask block 15 so that it comes to the bottom right.

Then, it is examined whether the read reference data number Tnum is the data in which a non-mask block number in the reference data arrangement dictionary is included (step 34). When matching of reference data number is found in dictionary data, a point is added. However, unless matching of reference data number is found in the dictionary data, a point is not added (steps 35 and 36).

By applying the above operations to all non-mask blocks of a frame mask used (step 37) and comparing the total number of points with a threshold Th3, the presence or absence of a specific image is judged (step 38).

As shown in FIG. 26, a reference data arrangement dictionary is obtained by previously checking a reference data number which may come to the position of a non-mask block number and recording it.

[Embodiment A3]

An embodiment of an image processing apparatus of the present invention is described below.

Figure 27:
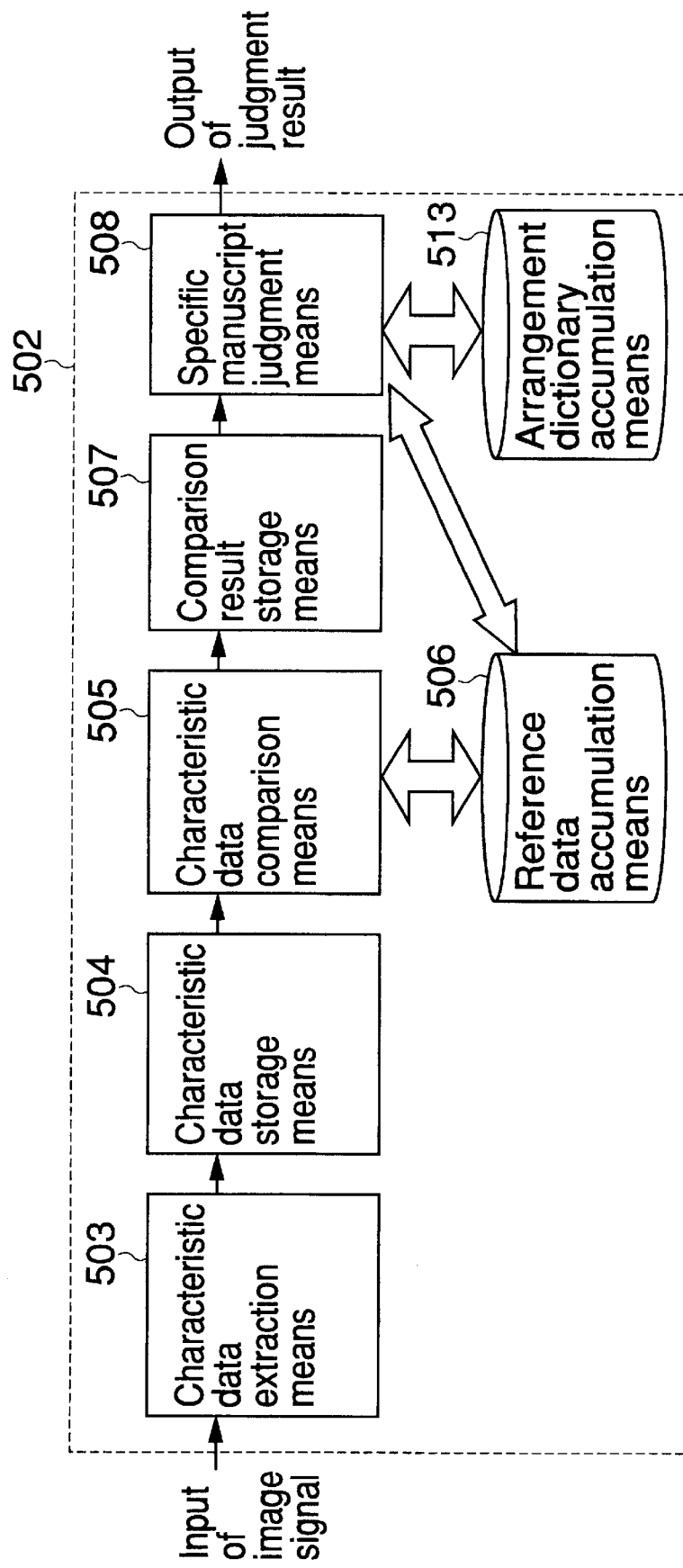
FIG. 27 is a schematic block diagram of the specific image detection apparatus of embodiment A3 of the present invention.

FIG. 27 is a schematic block diagram of the specific image detection apparatus 502 of the embodiment A3.

In FIG. 27, structures and operations of the characteristic extraction means 503 for detecting a specific color from RGB signals serving as inputs, characteristic data storage means 504 for temporarily storing block characteristic data, and characteristic data comparison means 505 for comparing the block characteristic data in blocks stored in the characteristic data storage means 504 with the reference data in the reference data accumulation means 506 are the same as those of the specific image detection apparatus 502 of the embodiment A2. Therefore, their descriptions are omitted.

However, the specific image detection apparatus 502 of the embodiment A3 is different from that of the embodiment A2 in that the apparatus of the embodiment A3 is constituted and operated so as to detect the presence or absence of a specific image in accordance with the fact that, when the specific manuscript judgment means 508 judges the presence or absence of a specific image in accordance with the similarity for each block, selected reference data number, and characteristic data arrangement dictionary, the apparatus of the embodiment A3 accesses the reference data accumulation means 506 to judge the presence or absence of the specific image in accordance with the result of comparing the reference data reproduced from the selected reference data number with the reference data reproduced from the reference data number stored in the characteristic data arrangement dictionary of the arrangement dictionary accumulation means 513.

In the case of operations of the specific image detection apparatus 502 of this embodiment thus constituted, operations of the specific manuscript judgment means 508 different from that of the embodiment A2 are described below. The specific manuscript judgment means 508 is constituted with a CPU and a ROM to progress processing in frames.

Figure 28:
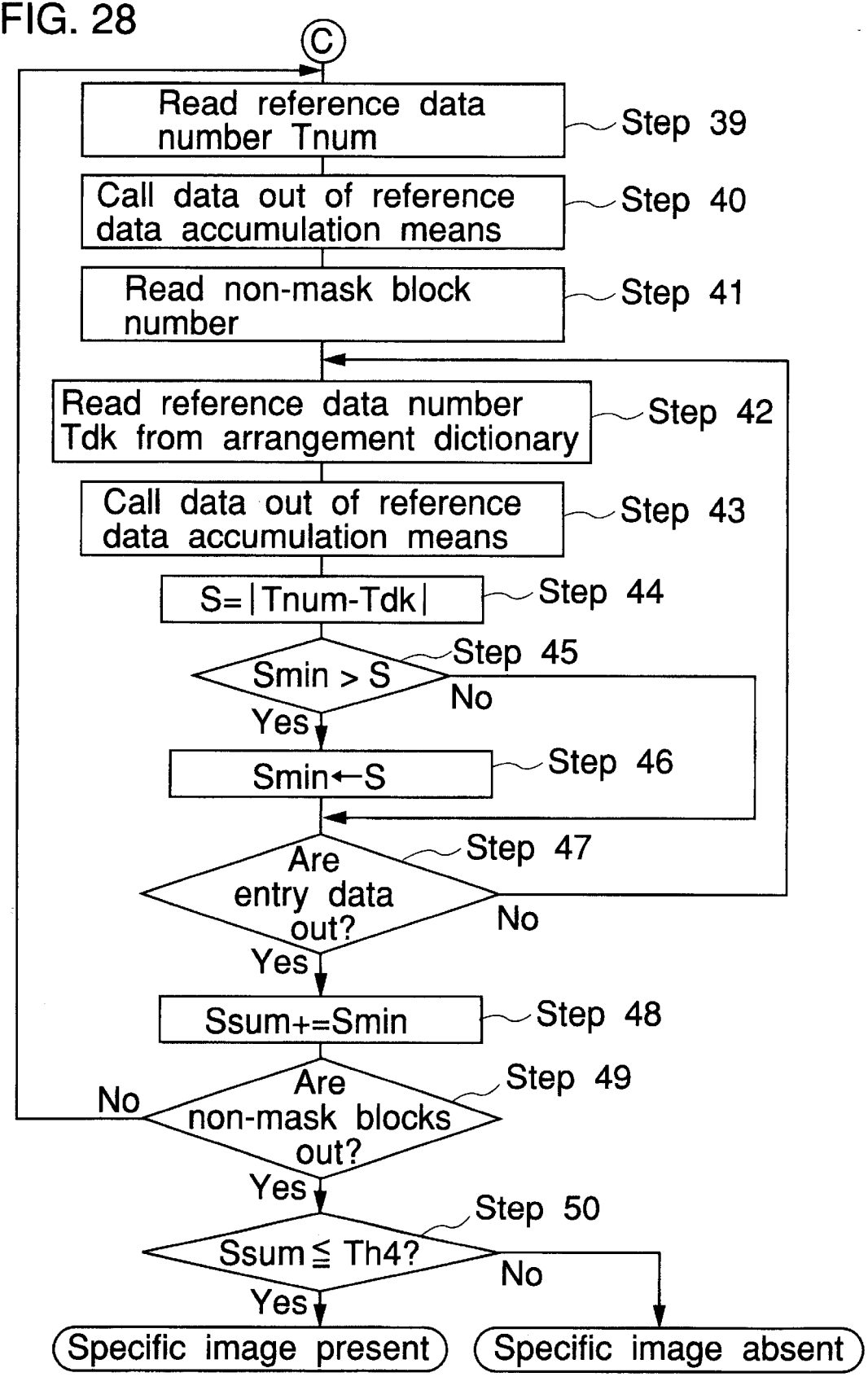
FIG. 28 is a flow chart for explaining the processing for one frame of the specific manuscript judgment means of the embodiment A3 of the present invention.

FIGS. 23 and 28 are flow charts for explaining the processing contents for one frame of the specific manuscript judgment means 508. FIG. 23 is the same as the case of the embodiment A2 and the process (steps 22 to 31) in which it is judged that no specific manuscript is present when the average value Dmean for one block exceeds the threshold Th2 is the same as the case of the embodiment A2. Therefore, the description is omitted.

FIG. 28 shows the processing in the case the average value Dmean for one block is equal to or less than the threshold Th2 in step 30.

First, the reference data number Tnum corresponding to a non-mask block is read (step 39) and the data in the reference data accumulation means is called in accordance with the reference data number Tnum to obtain the reference data Tnum=(TCnum0, TCnum1, and TCnum2) (step 40). Then, the non-mask block number of a frame mask used is read (step 41). The non-mask block number of the frame mask used is the same as that described for the embodiment A2. Then, reference data numbers corresponding to block numbers in the reference data arrangement dictionary are successively read (step 42) and the data in the reference data accumulation means are called by using the reference data numbers to obtain the reference data Tdk=(TC0(d, k), TC1(d, k), and TC2(d, k)) (d denotes a block number and k denotes a reference data number belonging to a block number d) (step 43). The difference S between the reference data Tnum and the reference data Tdk is obtained (step 44) and the above operations are applied to every reference data belonging to the block number d to obtain the minimum difference Smin (steps 45, 46, and 47). Until non-mask blocks come to zero, Smin is sequentially added to obtain the sum Ssum (steps 48 and 49). The sum Ssum of the minimum differences is compared with the threshold Th4 to detect that a specific image is present for Ssum$\leq$Th4 and that no specific image is present for Ssum>Th4 (step 50).

[Embodiment A4]

An embodiment of an image processing apparatus of the present invention is described below.

Figure 29:
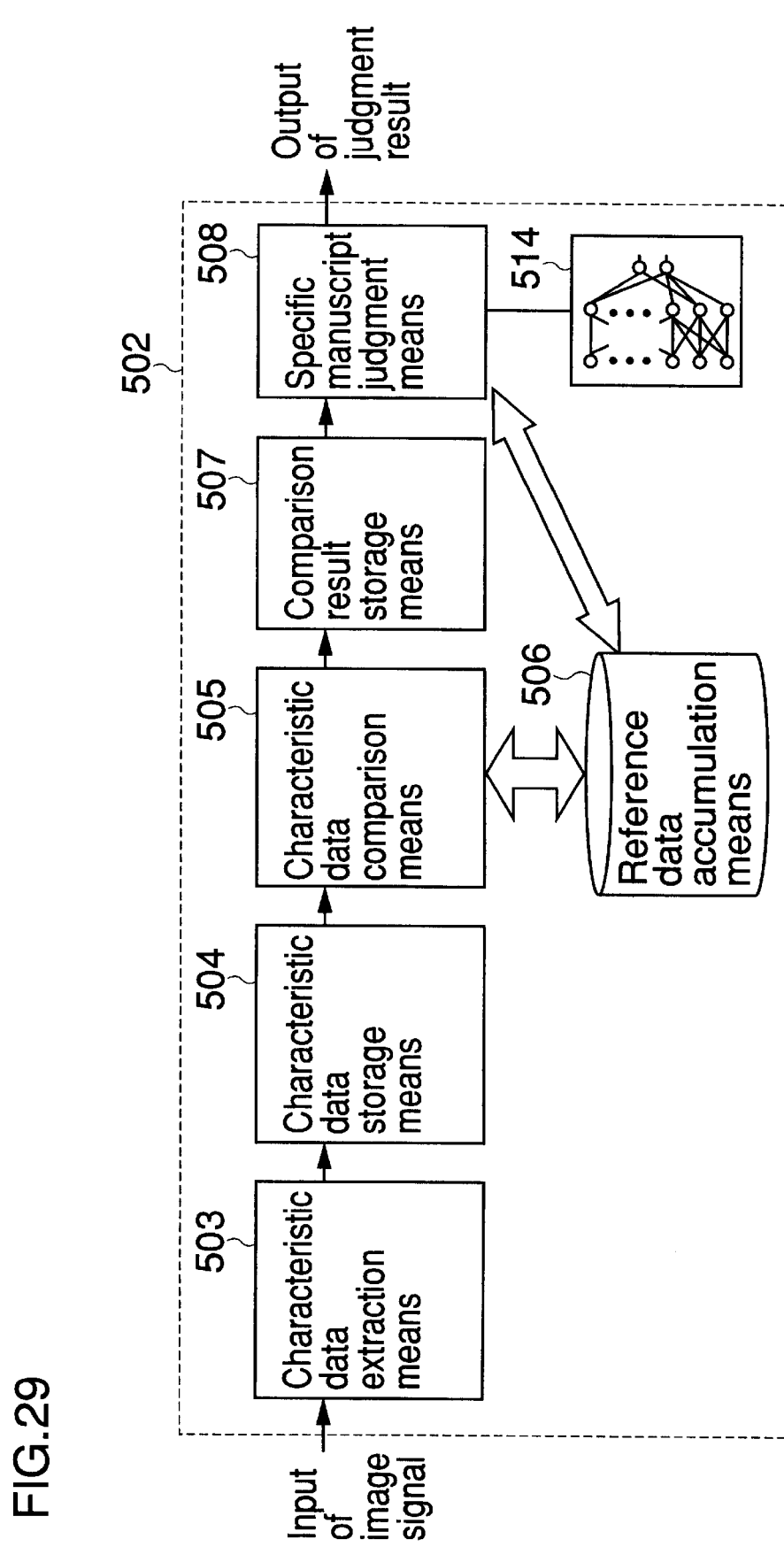
FIG. 29 is a schematic block diagram of the specific image detection apparatus of embodiment A4 of the present invention.

FIG. 29 is a schematic block diagram of the specific image detection apparatus 502 of the embodiment A4.

In FIG. 29, structures and operations of characteristic extraction means 503 for detecting a specific color from RGB signals serving as inputs, characteristic data storage means 504 for temporarily storing block characteristic data, characteristic data comparison means 505 for comparing the block characteristic data in blocks recorded in the characteristic data storage means 504 with the reference data in the reference data accumulation means 506, and comparison result storage means 507 for storing comparison results are the same as those of the specific image detection apparatus 502 of the embodiment A3. Therefore, their descriptions are omitted.

However, the embodiment A4 is different from the embodiment A3 in that the specific manuscript judgment means 508 is constituted so as to take out a regularly-arranged block by using the similarity stored in the comparison result storage means 507 and thereafter, input selected reference data obtained by reproducing reference data from a selected reference data number to a neural network, and-judge the presence or absence of a specific manuscript in accordance with the output of the neural network.

In the case of operations of the specific image detection apparatus of this embodiment thus constituted, operations of the specific manuscript judgment means different from that of the embodiment A3 are described below.

Figure 30:
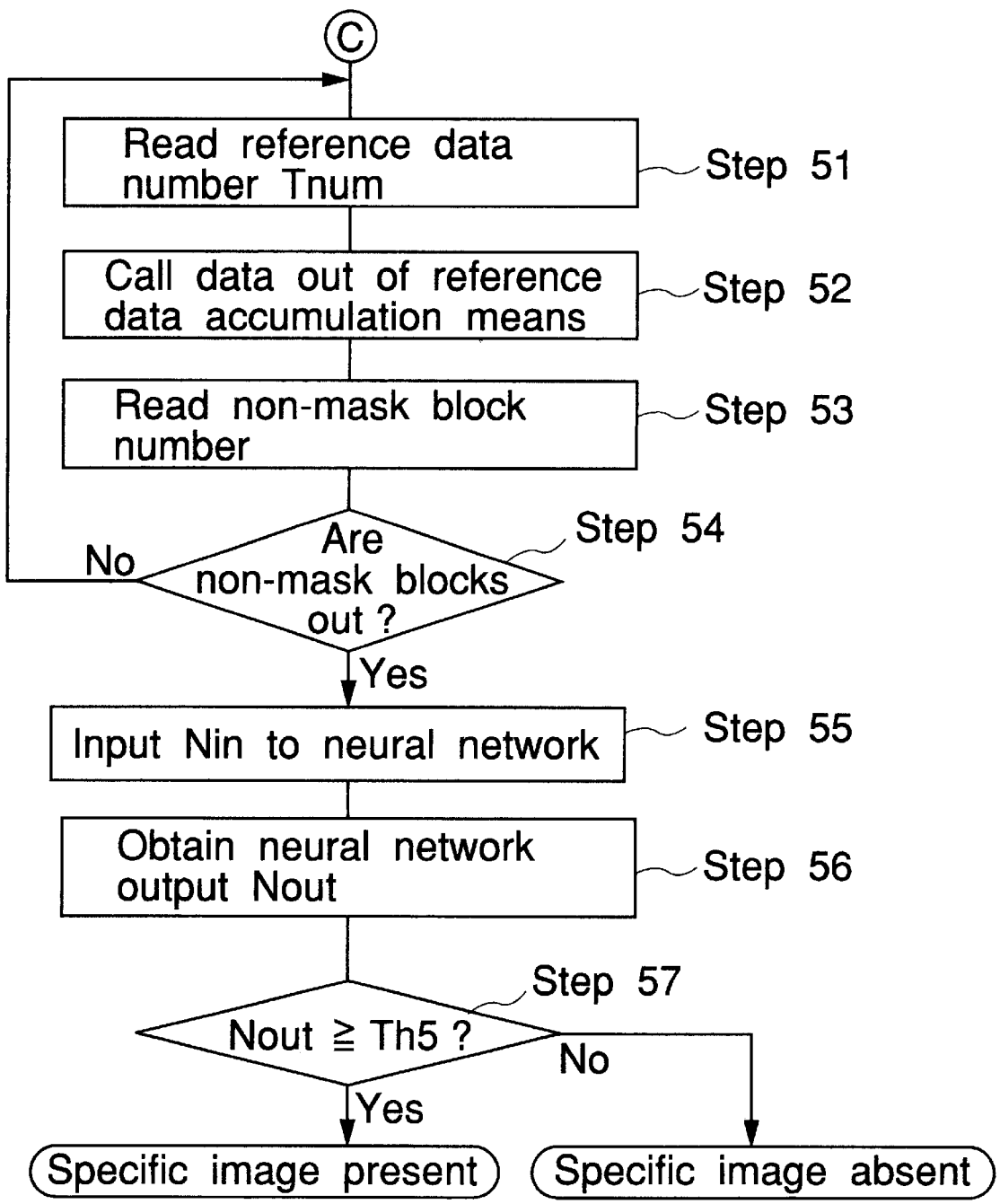
FIG. 30 is a flow chart for explaining the processing for one frame of the specific manuscript judgment means of the embodiment A4 of the present invention.

The specific manuscript judgment means 508 is constituted with a CPU, a RAM, and a neural network 514 to progress processing in frames. FIGS. 23 and 30 are flow charts for explaining the processing contents for one frame of the specific manuscript judgment means 508. FIG. 23 is the same as the case of the embodiment A2 and the process (steps 22 to 31) for judging that no specific manuscript is present when the average value Dmean for one block exceeds the threshold Th2 is the same as the case of the embodiment A2. Therefore, the description is omitted. FIG. 30 shows the processing when the average value Dmean for one block is equal to or less than the threshold Th2.

First, the reference data number Tnum(n) at the position corresponding to a non-mask block is read (step 51) and the data in the reference data accumulation means is called in accordance with the reference data number Tnum to obtain the reference data Tnum=(TC0num, TC1num, and TC2num) (step 52). The above operations are applied to the reference data corresponding to every non-mask block (step 54). When Tnum has three elements and the number of data values for a non-mask block is BN, a total of (BN×3)-dimensional data values are obtained. The (BN×3)-dimensional data values are input to a neural network having (BN×3) input units as inputs Nin (step 55). The neural network is previously learned with the data obtained by using the input of the data for a specific image and has outputs showing specific manuscript and non-specific manuscript. An output Nout from the neural network is received (step 56) and compared with a threshold Th5 to judge the presence or absence of a specific manuscript.

In the case of this embodiment, the characteristic data extraction means 503 uses a comparator 509 and a counter 10. However, it is also possible to extract characteristic data by using a CPU, ROM, or RAM. Moreover, though a structure using a CPU and a ROM is applied to the characteristic data comparison means 505 and specific manuscript judgment means 508. However, it is also possible to assemble an exclusive circuit by using the comparator and various gate circuits and realize operations of the exclusive circuit.

Moreover, when using a CPU and a ROM for the characteristic data extraction means 503, characteristic data comparison means 505, and specific manuscript judgment means 508, it is unnecessary to realize them with an independent CPU. It is possible to realize them with one CPU.

Furthermore, though a RAM is used for the characteristic data storage means 504 and comparison result storage means 507, it is unnecessary to use as an independent RAM for them. It is possible to use divided areas on the same RAM or replace data for the same area. Furthermore, as long as they are media into and from which information can be written or read, it is not always necessary to use a RAM.

Though the reference data accumulation means 506 and the arrangement dictionary accumulation means 513 respectively use a ROM, it is not always necessary to use a ROM as long as a device used can store data for a long time and allows random access for read of information. It is also possible to use a magnetic medium or the like.

Moreover, though the embodiment A4 of the present invention uses a neural network, it is possible to use hardware in which neuro elements are arranged or realize the neural network as a network for driving a CPU by software. Moreover, the structure and the learning method of the network are not specified.

Furthermore, though the number of specific color pixels obtained from RGB signals are used as characteristic values of an image, it is possible to use the number of specific color pixels obtained from other color space such as YMCK as characteristic values and further, use the number of pixels of brightness values kept in a specific range for each block, and still further use the information according to density change of an image as characteristic values or mix these characteristic values.

Furthermore, in the case of the embodiments of the present invention, it is described to detect the presence or absence of a specific manuscript from signal input from a scanner. However, an image input unit is not specified or the processing for a detection result is not specified. When the image processing apparatus 502 of the present invention is used for a path for temporarily sending data to a printer through a computer or a unit instead of the computer from the scanner, it is possible to set the image processing apparatus 502 of the present invention to the printer side or control printer operations in accordance with the detection result or return the information to the computer side.

An information recording medium of the present invention uses a medium which stores a program for realizing all or some of the means of the present invention and whose program can be read by an FD or optical disk of a computer.

As described above, it is possible to detect the presence or absence of a specific image whose position and direction is unknown from an input image even if the image has a similar tone or only locally similar tone without erroneous detection.

As described above, according to the present invention, it is judged whether a specific image is included or not in an image signal by measuring similarities with a plurality of characteristic values in a specific manuscript in blocks and then judging the similarity between the arrangement of a plurality of blocks and the arrangement of the blocks of the specific manuscript. As a result, it is possible to securely judge whether a specific manuscript is included or not in an input image.

Therefore, by using an image processing apparatus of the present invention for a unit having a copying function, it is possible to automatically stop capture of an image or output of a copy when copying a bill or securities whose copying is inhibited with a color copying machine. Therefore, it is possible to prevent an offense such as forgery of these manuscripts and moreover, while normal copying which has a general image including no specific image can be performed because there is no erroneous detection.

The structure and operations of an embodiment of an image processing apparatus of the. present invention are described below by referring to the accompanying drawing.

[Embodiment B1]

Figure 31:
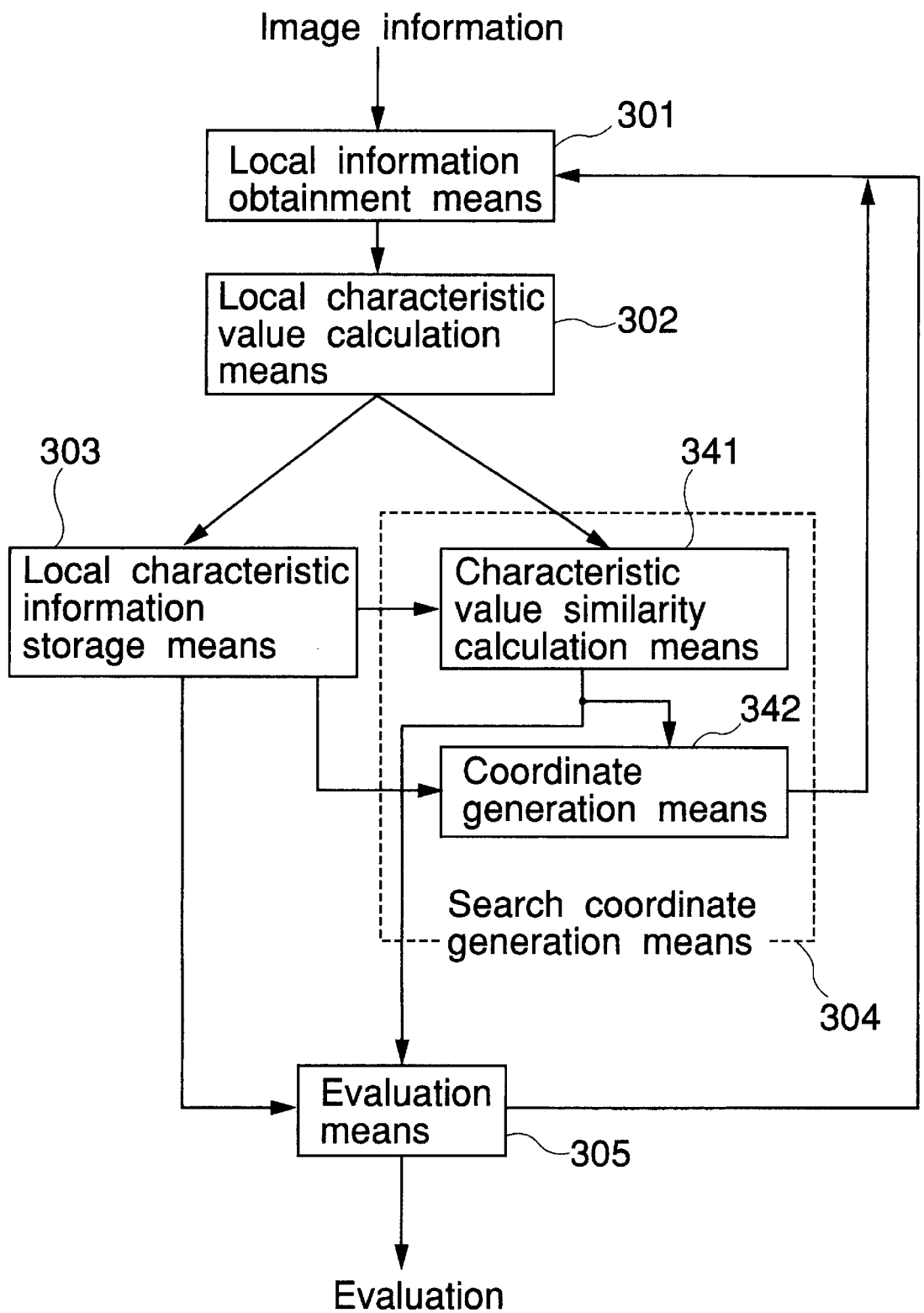
FIG. 31 is a block diagram showing embodiment B1 of an image processing apparatus of the present invention.
Figure 32A:
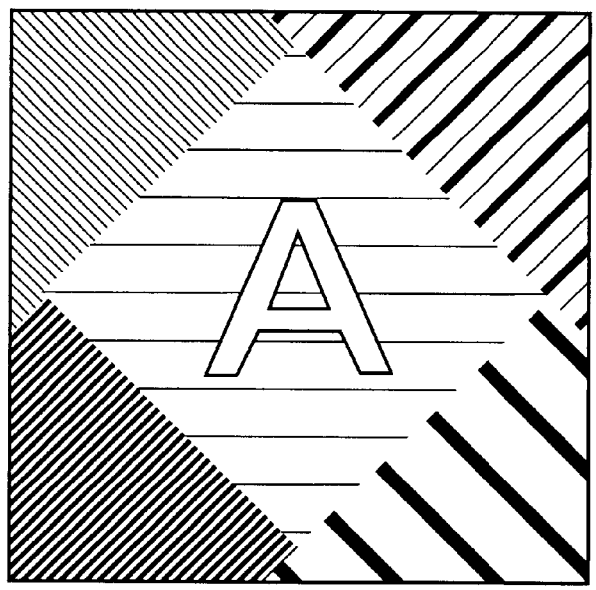
FIGS. 32(a), 32(b), and 32(c) are illustrations showing specific images.
Figure 33:
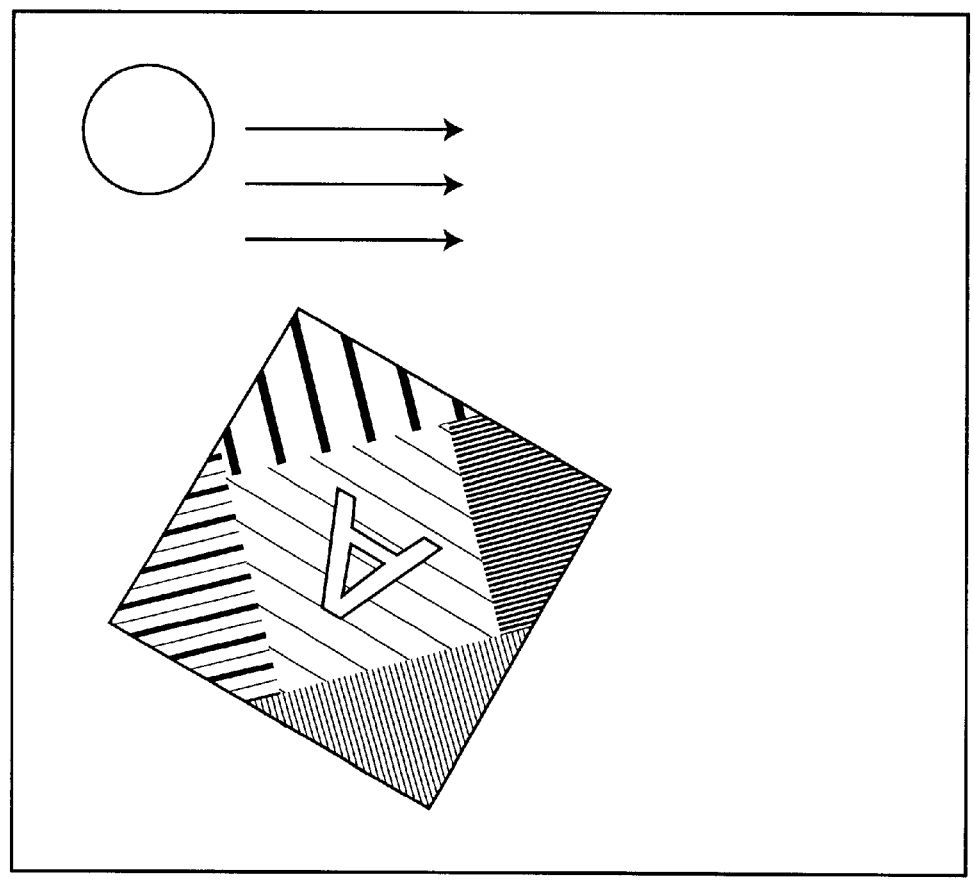
FIG. 33 is an illustration showing an image including a specific image.

FIG. 31 shows a block diagram of the image processing apparatus of the embodiment B1. In FIG. 31, symbol 301 denotes local information obtainment means, 302 denotes local characteristic value calculation means, 303 denotes local characteristic information storage means, 304 denotes search coordinate generation means, 341 denotes characteristic value similarity calculation means, 342 denotes coordinate generation means, and 305 denotes evaluation means. FIG. 32(a) shows a target special image. FIG. 33 is a color image including the above special image. The image in FIG. 33 is assumed as an input image. In this case, a target image of the present invention corresponds to the above special image. A search region of the present invention corresponds to the region in the quadrangular frame shown in FIG. 33.

Operations of this embodiment are described below while describing an embodiment of an image processing method of the present invention.

The local information obtainment means 301 uses the image in FIG. 33 as an input and obtains the image information in the circular local region (shown by a circle) out of the above image. To input an image, it is possible to use a memory, camera, scanner, or communication channel. A characteristic value corresponding to a first characteristic value of the present invention is extracted from the information for the above local region image. In this case, the local characteristic value calculation means 302 calculates a rotation invariant characteristic value as described below.

Figure 34:
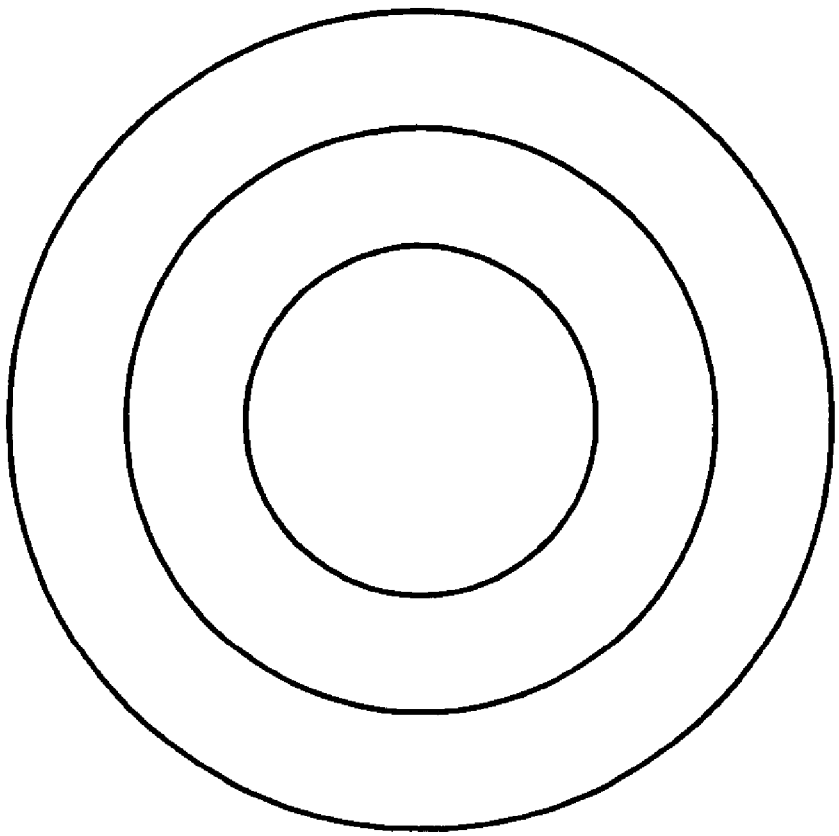
FIG. 34 is an illustration showing divided circular regions.

The following can be used as a characteristic value invariant to rotation: digitized distribution of colors for each ring obtained by dividing a circle into a plurality of concentric rings (e.g. sum of pixels included in each of two rings and a small circle obtained by dividing a circle into two rings and a small circle as shown in FIG. 34), the number of specific color pixels among pixels constituting a circle (e.g. number of pixels of blue, orange, and purple), sum of differential values on the whole circle obtained by performing differentiation for each element (e.g. for each RGB) in a color space on pixels constituting a circle, Fourier coefficient obtained by Fourier-transforming the change of pixel values obtained by scanning the circumference of a circle concentric with a purposed circular region and included in the circular region, or Zernike moment.

In this case, a characteristic value corresponding to a second characteristic value of the present invention obtained from a special image to be previously detected by using the local characteristic value calculation means 302 and the position obtaining the characteristic value store in the local characteristic information storage means 303.

Figure 32B:
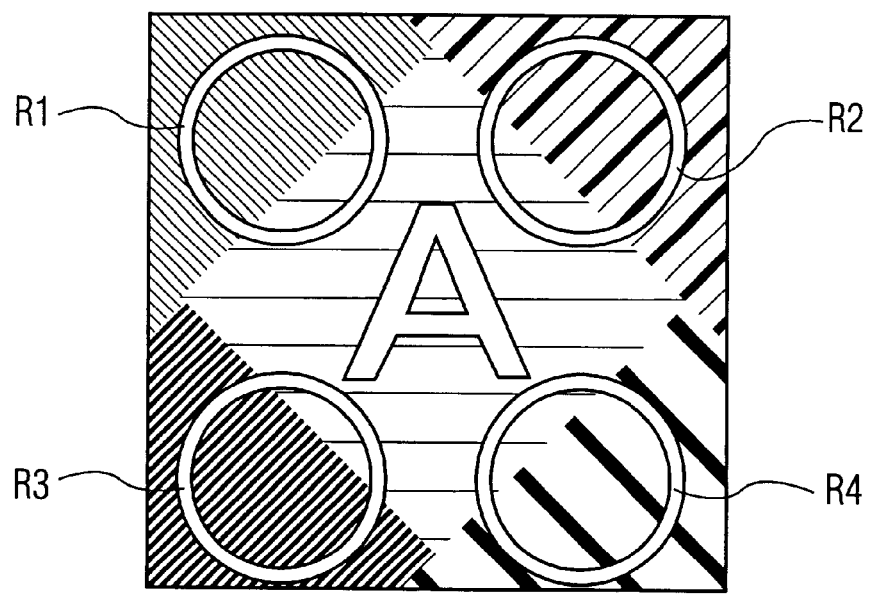

That is, to detect the special image shown in FIG. 32(a), characteristic values are obtained from four circular regions as shown in FIG. 32(b) (four regions of R1 to R4 respectively enclosed by a white circle) to store the regions in the local characteristic information storage means 303 together with the central position of each region. The circular regions can be overlapped each other or the number of circular regions can be increased. FIG. 35 is an embodiment showing characteristic values and positions to be stored in the local characteristic information storage means 303. In FIG. 35, a characteristic value uses a three-dimensional characteristic value (e.g. sum of pixel values for each RGB in a circular region) and x-coordinate and y-coordinate show the central position coordinates of respective a circular region. The number of dimensions of a characteristic value can use a value other than 3. In this case, it is assumed that the central coordinates of R1 is used as an origin, the value of x-coordinate increases as it moves rightward in FIG. 35, and the value of y-coordinate increases as it moves downward in FIG. 35. Moreover, it is unnecessary to arrange the central coordinates of respective circular regions R1 to R4 so as to form four apexes of a square but it is possible to set them to optional positions as long as they are kept in the region of a specific manuscript.

After the above preparation, actual search of a special image is performed as shown below.

The search coordinate generation means 304 calculates the similarity between a characteristic value and its position obtained by the characteristic value similarity calculation means 341 through the local characteristic value calculation means 302 on one hand and a characteristic value of a circular region previously stored in the local characteristic information storage means 303. The distance between vectors of characteristic values is used to calculate the similarity.

That is, when characteristic values obtained by the characteristic value calculation means 302 are (characteristic value 1, characteristic value 2, and characteristic value 3)=(155, 11, and 101), the characteristic values are compared respectively with the characteristic values to be stored in the local characteristic information storage means 303 (region names R1 to R4 in FIG. 35) to judge that the characteristic values are similar to the region name R4. Whether the characteristic values are similar to the region name R4 is determined by comparing the distance between vectors and a predetermined reference value. In the case of calculation of a similarity, it is possible to use an output obtained when inputting a newly obtained characteristic value to learning and recognition means such as a neural network or fuzzy inference after learning as the similarity by previously learning the relation between the circular-region numbers (in the case of FIG. 32(b), R1 to R4) to be stored in the local characteristic information storage mean 303 and the characteristic values obtained from the circular regions by the learning and recognition means.

When no similar region is present, it is judged that no similar region is present. When it is judged that no similar region is present, the coordinate generation means 342 newly sets position coordinates different from the position of a circular region having been obtained so far by the local information obtainment means 301 and the local information obtainment means 301 obtains the information for a circular local region again in accordance with the position coordinates. In this case, the position of the circular region obtained by the local information obtainment means 301 moves so as to scan a purposed image as shown by the arrows in FIG. 33.

Figure 36:
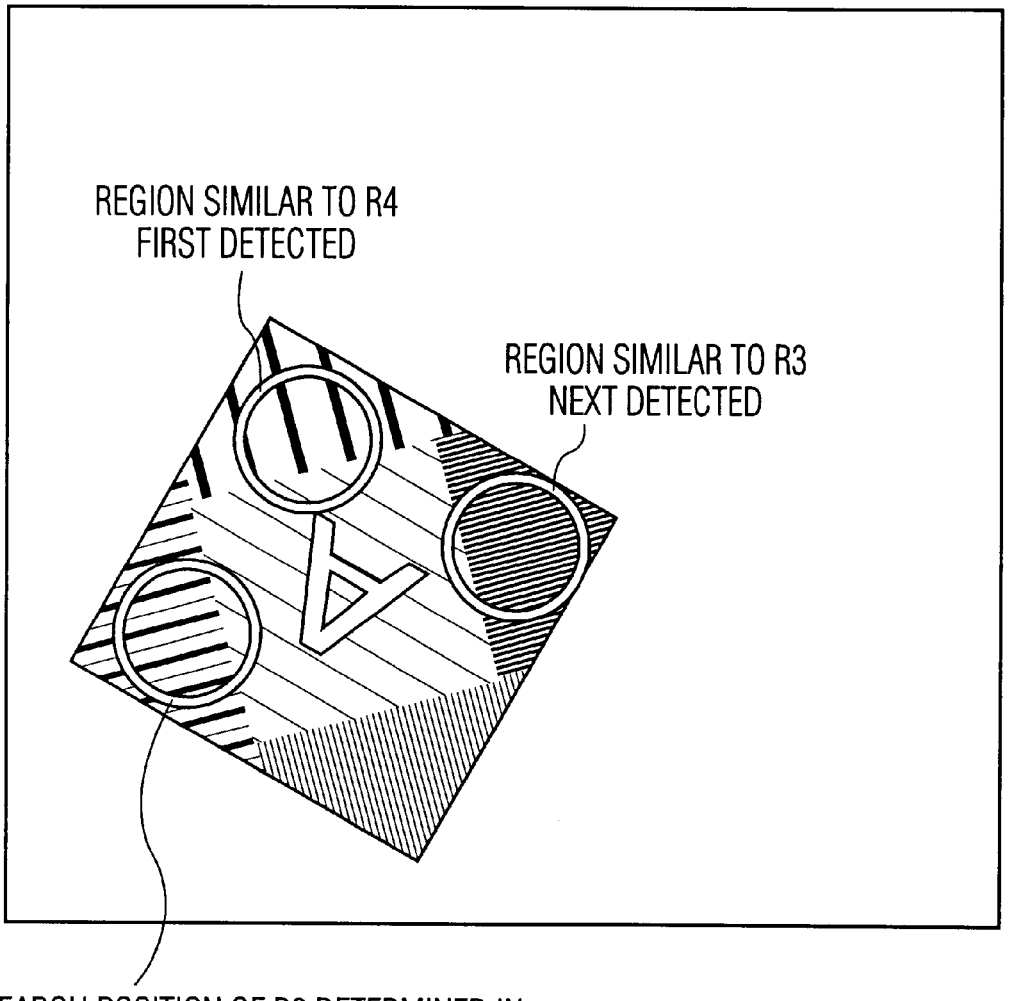
FIG. 36 is an illustration showing a detection process of a specific image.

When the characteristic value similarity calculation means 341 judges that the characteristic value obtained by the local characteristic value calculation means 302 is similar to the region name R4, coordinate generation means 342 generates coordinates in which the region R3 can be present as a region other than the region R4 as new search coordinates by assuming that the region obtained by the local information obtainment means 301 almost matches with the previously entered region R4 in a special image as shown in FIG. 36. In the case of coordinates where the region R3 can be present, the distance between the region R3 [position(x, y)=(5, 115)] and the region R4 [position(x, y)=(122, 110)] is 117.1 [=Root{(5−122)·(5−122)+(115−110)·(115−110): Root (x) represents the square root of x] in accordance with the information stored in the local characteristic information storage means 303. Therefore, the local information obtainment means 301 successively generates coordinates at a distance of 117.1 separate from the coordinates from which the information of circular regions is obtained and not having obtained any circular region so far. In this case, the means 301 successively generates coordinates-nearby the distance of 117.1 by considering an error such as a positional displacement to obtain characteristic values. In this case, when a region similar to the region R3 cannot be obtained from circular regions about successively generated coordinates, search of a region similar to the region R3 is terminated and the coordinate generation means 342 newly sets position coordinates different from the position of a circular region having been obtained so far by the local information obtainment means 301 and the local information obtainment means 301 continuously obtains the information for circular local regions in accordance with the above position coordinates.

When a region similar to the region R3 is obtained while searching the region R3, the coordinate generation means 342 generates coordinates where the regions R1 and R2 can be present and coordinates nearby the above coordinates as regions other than the regions R4 and R3. In the case of the coordinates where the regions R1 and R2 can be present in accordance with an information stored in the local characteristic information storage means 303, the relative positional relation between the region R1 [position(x, y)=(0, 0)], region R2 [position(x, y)=(120, 10)], region R3 [position(x, y)=(5, 115)], and region R4 [position(x, y)=(122, 110)] is already known and the coordinates of two regions (the coordinate of a region similar to R4 and the coordinate of a region similar to R3) are already detected. Therefore, it is possible to specify coordinates where the remaining regions R1 and R2 can be present.

After the positions of and the similarity between regions similar to all the previously-entered regions (R1 to R4) are obtained, the evaluation means 5 performs over all evaluation by using the similarity and positional error for each region. For example, when every similarity is equal to or exceeds a predetermined reference value and the relative positional error between regions is equal to or less than a predetermined reference value, the evaluation means 5 judges that the special image shown in FIG. 32(*a*) is present in the target image shown in FIG. 33. In this case, when the evaluation means performs evaluation, it is possible that the evaluation means newly calculates different types of characteristic values in accordance with regions similar to R1 to R4 and performs evaluation by using the characteristic values. In this case, different characteristic values previously obtained from a special image are also entered in the local characteristic information storage means 303. By using different characteristic values under search and evaluation, it is possible to improve the evaluation accuracy according to necessity.

It is also possible that the sequence of regions to be searched differs from the above sequence. When it is possible to roughly estimate the appearance frequency of the regions R1 to R4 in a general image, it is efficient to search the regions R1 to R4 starting with one having the least appearance frequency. It is possible to previously measure the appearance frequencies of regions similar to the regions R1 to R4 on a plurality of general images and store the frequencies in the local characteristic information storage means 303. Moreover, it is possible to omit the recalculation of characteristic values by storing the value and the position of which characteristic values are once obtained in the local characteristic information storage means 303.

Figure 32C:
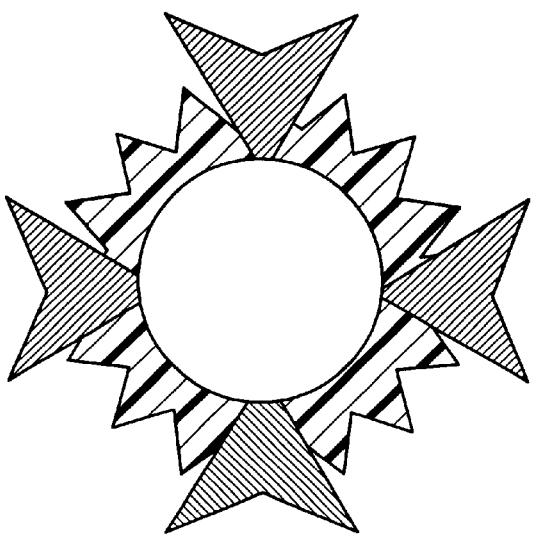

To select regions in an image, four circular regions are obtained from a special image and arranged as shown in FIG. 32(*b*) in the case of the above embodiment. However, it is also possible to use more circular regions or less circular regions and freely set the arrangement of them. Therefore, it is unnecessary that a special image is the square or rectangular as shown in FIG. 32(*a*). Even in the case of the special image having a complex shape (see FIG. 32(*c*)), it is possible to detect the image similarly to the case of the above embodiment by arranging a plurality of circular regions having a size which can be included in the shape. Moreover, by increasing the number of circular regions set in a special image, it is possible to improve the accuracy for detecting the special image. Furthermore, by decreasing the size of each circular region, it is possible to decrease the load for calculation of characteristic values and similarities every time.

Moreover, it is possible to combine the above embodiment with the embodiments 1 to 3.

That is, it is possible to use a plurality of groups of circular regions having the same center and different only in radius as circular regions to be set in a special image. The above mentions is more specifically described below by referring to FIG. 32(*b*). That is, not only a group of the circular regions R1 to R4 shown in FIG. 32(*b*) but also a group of circular regions r1 and r2 having the same center as circles and a smaller radius are set and characteristic values in a total of eight regions are previously calculated. Then, when it is judged that a special image is almost exactly present in a search region in accordance with the similarity calculated by first searching a circular region corresponding to a circular region having a smaller radius, the central position is left as it is and characteristic values of a circular region having a larger radius and the similarity between the characteristic values are calculated to finally decide whether a special image is present or not. Thereby, it is possible to improve the accuracy for detecting a special image without increasing the number of circular regions for retrieving and moreover, decrease the load for calculation of characteristic values and similarities every time.

Moreover, it is possible to combine circular regions of different sizes. By using circular regions of different sizes, it is also possible to set circular regions which efficiently fill the inside of a special image.

[Embodiment B2]

Figure 37:
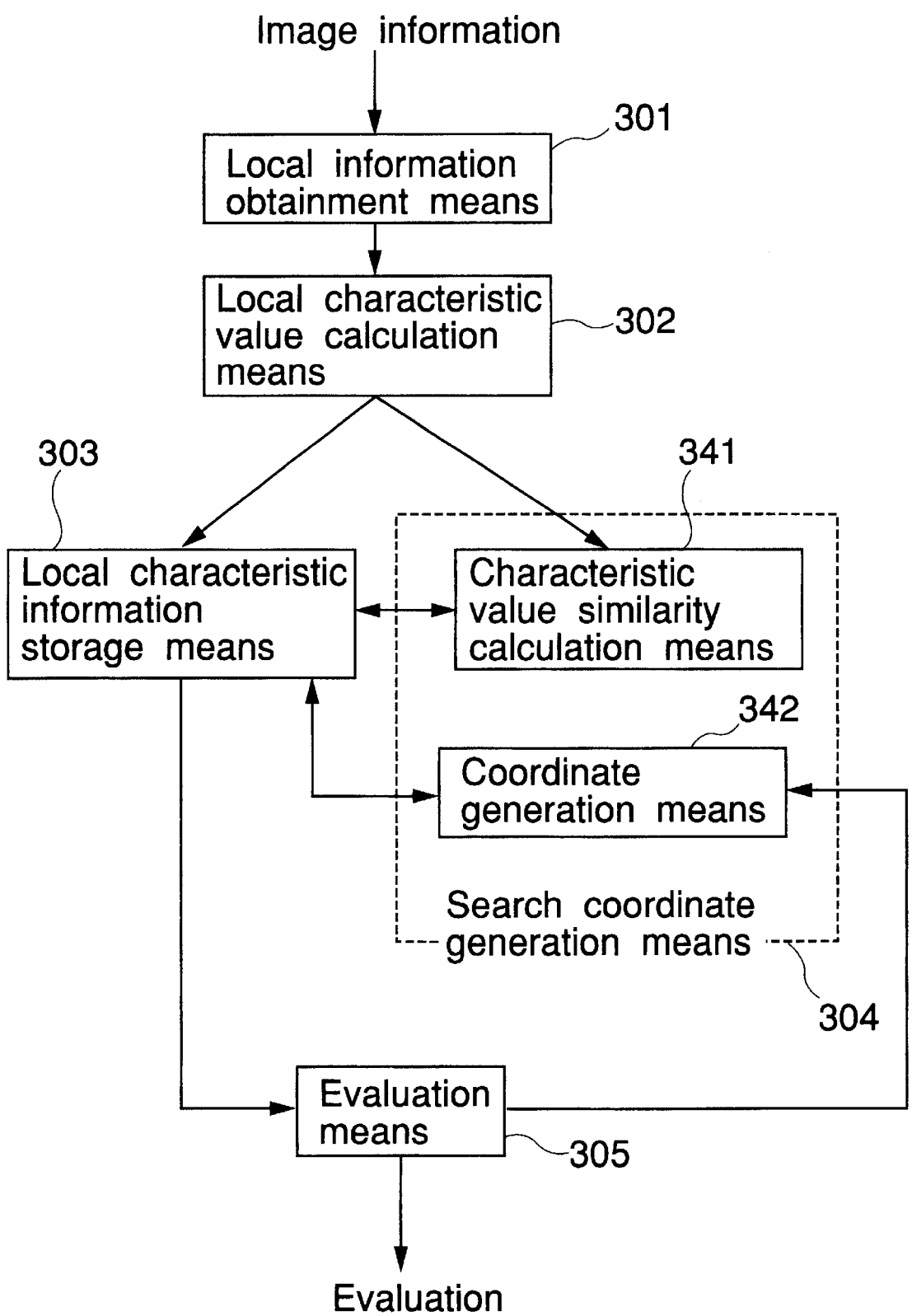
FIG. 37 is a block diagram showing the embodiment B1 of an image processing apparatus of the present invention.
Figure 38:
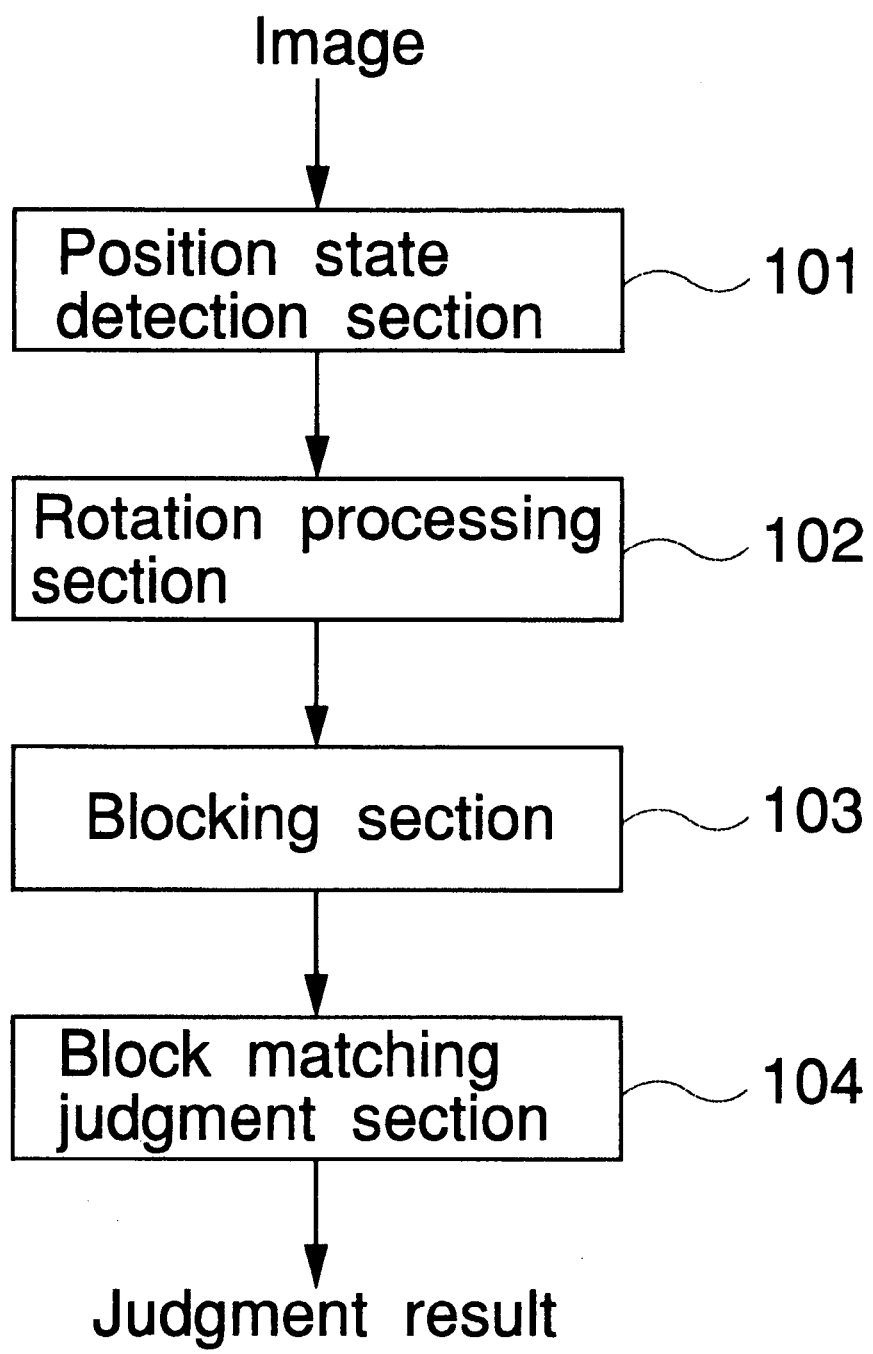
FIG. 38 is a block diagram showing a conventional technique.
Figure 39:
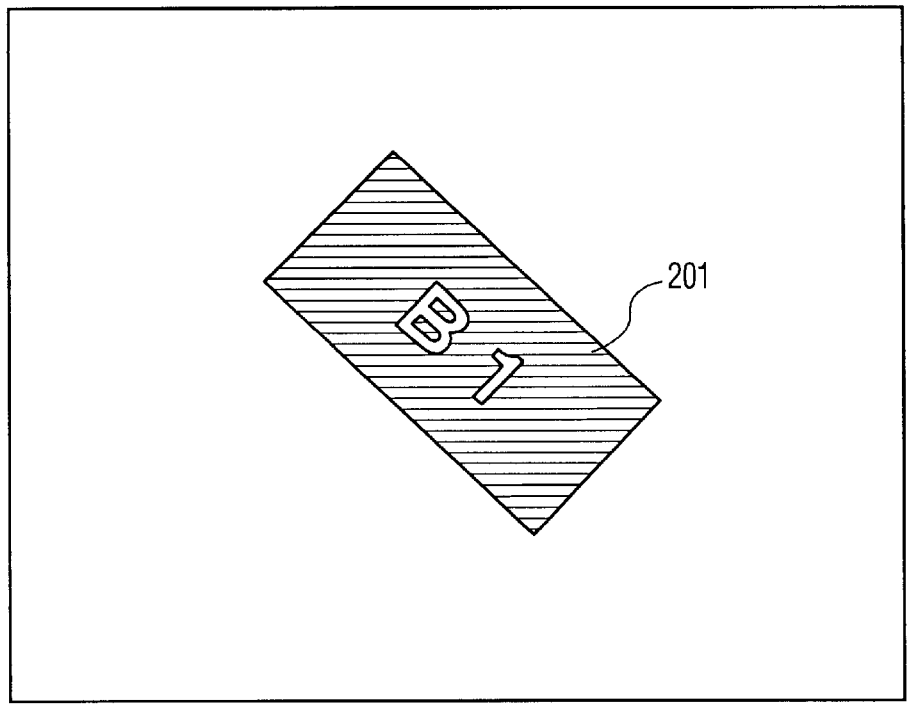
FIG. 39 is an illustration showing an image including a specific image.
Figure 40:
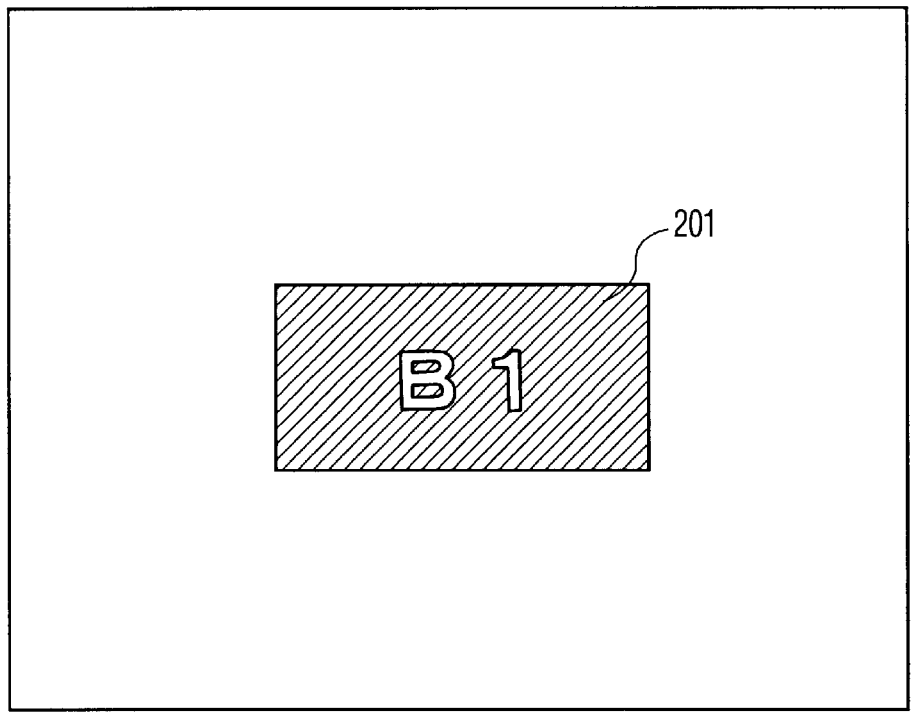
FIG. 40 is an illustration showing an image after rotating a specific image.

FIG. 37 shows a block diagram of the image processing apparatus of the embodiment B2.

In FIG. 37, each block is the same as that of in FIG. 31. Operations of the embodiment B2 are basically the same as those of the embodiment B1 except that local information obtainment means 301 successively obtains local images from every position in a target image and local characteristic value calculation means 302 calculates the characteristic value of every local image successively obtained by the local information obtainment means 301. Local characteristic information storage means 303 previously stores the characteristic value of a circular region in a special image and the position obtaining the characteristic value similarly to the case of the embodiment B1. Characteristic value similarity calculation means 341 calculates the similarity between the characteristic value obtained from the circular region at every position in a target image obtained by the local characteristic value calculation means 302 and the characteristic value of the special image stored in the local characteristic information storage means 303. In this case, the local characteristic information storage means 303 stores the positions and characteristic values of circular regions in the target image judged to be close to regions R1 to R4 in a special image stored in the local characteristic information storage means 303. After storing the information for regions in the target image judged to be close to R1 to R4 in the local characteristic information storage means 303, coordinate generation means 342 successively reads the information for the regions judged to be close to R1 to R4 and compares the relative positional relations between the above regions and the information for regions constituting an already-entered special image. For example, when the region R2 and R1 matching up to the information for the regions constituting the special image are or is detected, position coordinates of the remaining regions R3 and R4 to be searched are generated to judge whether the position coordinates match up to the characteristic values and positions of the regions stored in the local characteristic information storage means 303. When regions matching up to or similar to R1 to R4 are obtained from the information stored in the local characteristic information storage means 303, evaluation means 5 compares the characteristic values of prospective regions R1 to R4 and the relative positional relation with the information for a previously-entered special image. When the characteristic values and the relative positional relation meet predetermined criteria, the evaluation means 5 judges that a special image is present in a target image.

As described above, the embodiment B2 previously extracts the information for only regions related to a special image from the entire region of a target image and thereafter, judges the presence or absence of a special image. Therefore, it is unnecessary to hold the information for every target image and it is possible to reduce the number of memories for constituting an apparatus.

Thereby, it is possible to efficiently detect a special image pattern without depending on the shape, position, or direction of the special image and moreover without depending on a specific color mark.

That is, the present invention has the characteristic values of a plurality of local regions in a special image and the relative positional relation between the local regions and when detecting regions similar to some of the local regions from a target image, efficiently detects a special image by searching coordinates close to the positions of the remaining local regions by using the relative positional relation. Because the evaluation means detects a special image, it is possible to effectively use the detection result for classification, decision, recognition, and retrieval of images or for control of units and information in accordance with the recognition and decision of an image.

As described above, because the present invention enters a special image as a combination of local regions, it is unnecessary that a special image has a specific shape such as a rectangle or circle. Moreover, because the present invention enters the relative positional relation between a plurality of local regions as the information for a special image, it is possible to detect the special image independently of the position or tilt of the special image. Furthermore, because it is enough that a way of selecting a local region is included in a special image, it is unnecessary that a special image to be detected includes a specific shape or specific color mark.

Furthermore, it is easy to change accuracies as required by changing ways of selecting a local region in a special image.

Furthermore, by obtaining every characteristic value in a local-region image and storing only the information for regions having a high similarity, it is unnecessary to store all pieces of information for a target image in a memory at the same time while detecting a special image and therefore, it is possible to reduce the cost of an apparatus.

For the above embodiment, a case is described in which the characteristic value of a special image and the positional information for a local region image of the special image are previously obtained from the image processing apparatus before detecting the special image and stored in local characteristic information storage means. However, the present invention is not restricted to the above case. For example, it is possible to obtain the characteristic value of a special image formed by an external apparatus other than the above image processing apparatus and the positional information of the local region image of the special image and store the characteristic value and the positional information in local characteristic information storage means.

Moreover, it is possible to realize each of the above embodiments by using hardware or using software in a computer.

As described above, the present invention has an advantage that a target image can be more efficiently detected compared to a conventional case.

Moreover, it is possible to manufacture a magnetic recording medium or optical recording medium as a medium recording a program for making a computer execute the functions of all or some of the above-described embodiments and thereby, execute the same operations as the above. Thus, it is possible to obtain the same advantages as the above.

Furthermore, by setting the above program in or attaching it to a copying machine or scanner, it is possible to detect a special image or use the copying machine or scanner to prevent a bill or securities from being forged.

Furthermore, it is possible to execute the same operations as the above by supplying the above program to each of the above various apparatuses or a computer through a network and using the program thus supplied. Furthermore, it is possible to supply the program to each of the above apparatuses in the form of the above recording medium.

As described above, the present invention makes it possible to more efficiently process data when detecting a special image and prevent the detection accuracy from deteriorating.

What is claimed is:

1. An image processing apparatus comprising extraction means of obtaining a characteristic value of in an input image block, storage means of storing said characteristic value, accumulation means of accumulating a plurality of previously-obtained reference characteristic values corresponding to a plurality of target blocks, comparison means of comparing said characteristic value of said input image block with said reference characteristic values to obtain a similarity between them, storage means of storing said similarity, and judgment means of judging the presence or absence of a target image in an input image in accordance with said similarity over a plurality of adjacent blocks, wherein each characteristic value is a vector, each dimension of the vector corresponding to a number of pixels of a predetermined color in a block, and said comparison means compares the vector of the characteristic value of the input image block with the vector of each characteristic value of the target blocks.

2. The image processing apparatus according to claim 1, wherein said judgment means judges presence or absence of a target image in the input image by comparing an average similarity or accumulated similarity of arranged blocks with a threshold of them.

3. The image processing apparatus according to claim 1, wherein storage means of storing an arrangement of reference data for the target image is included, and said judgment means judges the presence or absence of the target image in the input image by comparing an arrangement of reference data for arranged blocks with an arrangement of reference data for said target image stored in said storage means.

4. The image processing apparatus according to claim 3, wherein said storage means storing the arrangement of the reference data for said target image stores an arrangement of reference data numbers.

5. The image processing apparatus according to claim 3, wherein said storage means storing the arrangement of reference data for said target image stores an arrangement of characteristic value data.

6. The image processing apparatus according to claim 1, wherein
storage means of storing an arrangement of reference data for the target image is included, and
said judgment means (1) searches an arrangement of blocks having high similarities out of a plurality of arrangements of blocks, and (2) judges presence or absence of the target image in the input image by comparing an arrangement of reference data for the blocks which are disposed in said arrangement with an arrangement of reference data to said target image stored in said storage means.

7. The image processing apparatus according to claim 6, wherein said storage means storing the arrangement of the reference data for said special image stores the arrangement of reference data numbers.

8. The image processing apparatus according to claim 6, wherein said storage means storing the arrangement of reference data for said target image stores an arrangement of characteristic value data.

9. The image processing apparatus according to claim 1, wherein said judgment means inputs an arrangement of blocks to a neural network, learns an arrangement of blocks of the target image and detects the target image in accordance with an output of said neural network.

10. The image processing apparatus according to claim 1, wherein said comparison means compares said characteristic value of said image block with said reference characteristic values when said characteristics value meets a predetermined condition.

11. The image processing apparatus according to claim 1, wherein said judgment means specifies an arrangement of blocks by using a mask pattern and said mask pattern is a pattern for masking at least one block in a frame to be processed.

12. The image processing apparatus according to claim 1, wherein said extraction means of obtaining said characteristic value extracts a number of pixels in a color range of at least one color.

13. The image processing apparatus according to claim 1, wherein said extraction means of obtaining said characteristic value uses information for density change in a block.

14. The image processing apparatus according to claim 1, wherein said extraction means of obtaining said characteristic value extracts a number of pixels in a color range of at least one color and information for density change in a block.

15. The image processing apparatus according to claim 1, wherein said target image is an image on a bill or securities.

16. An information recording medium wherein a program for realizing all or some functions of the means of claim 1 is stored.

17. The image processing apparatus of claim 1, wherein said vector is multi-dimensional vector, and each dimension of the vector corresponds to number of pixels of each color in a block.

18. An image processing method comprising the steps of:
calculating a first characteristic value in accordance with a local image in a first local region at a predetermined position in a search region;
comparing each second characteristic value previously obtained in accordance with each local image in a plurality of second local regions at a predetermined position in the region of a target image to be detected with said calculated first characteristic value;
checking whether a second characteristic value meeting a predetermined relation with said first characteristic value is present in said second characteristic values on basis of the result of the comparison;
obtaining a new position in said search region on the basis of positional information for whole or part of said second local regions when a second characteristic value meeting said relation is present and calculating a new first characteristic value in accordance with the local image in a first local region at said new position;
judging whether said calculated new first characteristic value meets a predetermined relation with a predetermined second characteristic value among said second characteristic values; and
determining whether said target image is present in said search region on basis of the judgment result.

19. The image processing method according to claim 18, wherein
a similarity between each of the second characteristic values in the region of said target image with said first characteristic value is calculated in accordance with said comparison,
meeting a predetermined relation with said first characteristic value represents that said obtained similarity exceeds a predetermined criterion, and
when judging whether said calculated new first characteristic value meets a predetermined relation with said predetermined second characteristic value, a similarity between the new first characteristic value and said predetermined second characteristic value is obtained and it is checked whether the obtained similarity exceeds said predetermined criterion.

20. The image processing method according to claim 18, wherein a predetermined second characteristic value in said second characteristic values is a second characteristic value obtained from a local image in a local region other than the second local region from which the second characteristic values meeting said relation are obtained among said second local regions.

21. The image processing method according to claim 18, wherein said characteristic values are substantially invariant to rotational movement of said local image.

22. A medium wherein a program for making a computer execute all or some of functions of each processing of claim 18 is recorded.

23. An image processing method comprising the steps of:
calculating each first characteristic value in accordance with each local image in a plurality of first local regions in a search region;
comparing each second characteristic value previously obtained from each local image in a plurality of second local regions at a predetermined position in the region of a target image to be detected with each of said calculated first characteristic values;
searching a first characteristic value meeting a predetermined relation with said second characteristic values out of said calculated first characteristic values on basis of a result of the comparison and storing the searched first characteristic value and positional information for the local region; and
detecting a target image on basis of said previously obtained second characteristic values and relative positional relation between local regions of the second characteristic values by using the stored first characteristic value and the positional information for its local region as processing objects.

24. The image processing method according to claim 23, wherein a similarity between each of said previously obtained second characteristic values and each of said calculated first characteristic values is obtained, and meeting a predetermined relation with said second characteristic values represents that said obtained similarity exceeds a predetermined criterion.

25. The image processing method according to claim 24, wherein to detect a target image including said stored predetermined first characteristic values, a positional information for a local region to be newly searched is calculated by using the relative positional relation between the local region of the second characteristic value whose similarity with said predetermined first characteristic value exceeds said predetermined criterion and other local region among a plurality of local regions in the region of the target image, and determining whether the characteristic value of a local region corresponding to the calculated positional information is included in said stored predetermined first characteristic values.

26. The image processing method according to claim 23, wherein said characteristic values are substantially invariant to rotational movement of said local image.

27. A medium wherein a program for making a computer execute all or some of functions of each processing of claim 23 is recorded.

28. A method for processing an input image comprising the steps of:
 (a) dividing the input image into blocks of pixels;
 (b) calculating a characteristic value for each block formed by step (a);
 (c) storing characteristic values of a reference image;
 (d) comparing a characteristic value calculated in step (b) with a characteristic value stored in step (c); and
 (e) recognizing the input image as the reference image based on the comparing of step (d);
 whereby calculating the characteristic value in step (b) includes the steps of:
  (i) summing pixels of at least one color in a block to form an intensity value of the color; and
  (ii) forming a vector, at least one dimension of the vector corresponding to the intensity value of the color in the block.

* * * * *